(12) United States Patent
Lappas et al.

(10) Patent No.: US 9,870,271 B1
(45) Date of Patent: *Jan. 16, 2018

(54) SYSTEM AND METHOD FOR DEPLOYING VIRTUAL SERVERS IN A HOSTING SYSTEM

(71) Applicant: GOGRID, LLC, San Francisco, CA (US)

(72) Inventors: Paul Lappas, San Francisco, CA (US); John M. Keagy, San Francisco, CA (US); Justin Kitagawa, Lafayette, CA (US)

(73) Assignee: GoGrid, LLC, Jersey City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/362,483

(22) Filed: Nov. 28, 2016

Related U.S. Application Data

(63) Continuation of application No. 14/088,294, filed on Nov. 22, 2013, now Pat. No. 9,507,542, which is a
(Continued)

(51) Int. Cl.
| | | |
|---|---|---|
| *G06F 3/06* | (2006.01) | |
| *G06F 9/50* | (2006.01) | |
| *G06F 9/455* | (2006.01) | |

(52) U.S. Cl.
CPC .......... *G06F 9/5077* (2013.01); *G06F 3/065* (2013.01); *G06F 3/067* (2013.01); *G06F 3/0619* (2013.01);
(Continued)

(58) Field of Classification Search
CPC .......... G06F 9/45533; G06F 2201/815; G06F 11/3051; G06F 11/3604; G06F 15/177;
(Continued)

(56) References Cited

U.S. PATENT DOCUMENTS

| | | |
|---|---|---|
| 6,269,390 B1 | 7/2001 | Boland |
| 6,868,444 B1 | 3/2005 | Kim et al. |

(Continued)

OTHER PUBLICATIONS

Author Unknown, "Press Release: 3Tera adds Application Monitoring and Multi-CPU Scalability to AppLogic Utility Computing Platform for SaaS and Web 2.0 Customers," May 24, 2007, http://www.3tera.com/News/Press-Releases/Archive/3Tera-adds-Application-Monitoringand-Multi-CPU-Scalability-to-Applogic.php 3TERA., Inc., Aliso Viejo, California, USA.
(Continued)

*Primary Examiner* — Zhuo Li
(74) *Attorney, Agent, or Firm* — Sterne, Kessler, Goldstein & Fox P.L.L.C.

(57) ABSTRACT

Some embodiments provide a method for creating an image of a virtual machine. The method identifies a particular computer system operating as a virtual machine with a particular configuration on a hardware resource of a hosting system that includes several hardware resources. The method captures data representing the particular computer system. Capturing the data includes copying a particular section of the data, computing a checksum for the particular section of the data, and streaming the particular section with the computed checksum to a storage.

21 Claims, 35 Drawing Sheets

Related U.S. Application Data continuation of application No. 12/841,150, filed on Jul. 21, 2010, now Pat. No. 8,601,226.

(60) Provisional application No. 61/346,871, filed on May 20, 2010.

(52) U.S. Cl.
CPC ............... G06F 9/45558 (2013.01); *G06F 2009/45562* (2013.01)

(58) Field of Classification Search
CPC ...... G06F 17/30; G06F 3/0631; G06F 3/0686; G06F 9/5027; G06F 11/1438; G06F 11/1484; G06F 12/0871; G06F 3/0611; G06F 3/0659; G06F 3/067; G06F 9/44505
See application file for complete search history.

(56) References Cited

U.S. PATENT DOCUMENTS

| | | | |
|---|---|---|---|
| 6,888,836 B1 | 5/2005 | Cherkasova | |
| 6,985,937 B1 | 1/2006 | Keshav et al. | |
| 7,010,493 B2 | 3/2006 | Yamamoto et al. | |
| 7,080,378 B1 | 7/2006 | Noland et al. | |
| 7,158,972 B2 | 1/2007 | Marsland | |
| 7,257,811 B2 | 8/2007 | Hunt et al. | |
| 7,321,893 B1 | 1/2008 | Rambacher et al. | |
| 7,383,327 B1 | 6/2008 | Tormasov et al. | |
| 7,392,403 B1 | 6/2008 | Munetoh | |
| 7,398,471 B1 | 7/2008 | Rambacher et al. | |
| 7,421,533 B2 | 9/2008 | Zimmer et al. | |
| 7,512,815 B1 | 3/2009 | Munetoh | |
| 7,519,696 B2 | 4/2009 | Biumenau et al. | |
| 7,536,541 B2 | 5/2009 | Isaacson | |
| 7,577,722 B1 | 8/2009 | Khandekar et al. | |
| 7,587,492 B2 | 9/2009 | Dyck et al. | |
| 7,640,292 B1 | 12/2009 | Smoot | |
| 7,694,082 B2 | 4/2010 | Golding et al. | |
| 7,702,843 B1 | 4/2010 | Chen et al. | |
| 7,716,446 B1 | 5/2010 | Chen et al. | |
| 7,730,486 B2 | 6/2010 | Herington | |
| 7,743,107 B2 | 6/2010 | Kovacs et al. | |
| 7,752,301 B1 | 7/2010 | Maiocco et al. | |
| 7,757,231 B2 | 7/2010 | Anderson et al. | |
| 7,783,856 B2 | 8/2010 | Hashimoto et al. | |
| 7,802,000 B1 | 9/2010 | Huang et al. | |
| 7,802,251 B2 | 9/2010 | Kitamura | |
| 7,814,495 B1 | 10/2010 | Lim et al. | |
| 7,827,294 B2 | 11/2010 | Merkow et al. | |
| 7,840,964 B2 | 11/2010 | Schoenberg et al. | |
| 7,843,821 B2 | 11/2010 | Kunhappan et al. | |
| 7,856,549 B2 | 12/2010 | Wheeler | |
| 7,865,575 B2 | 1/2011 | Leitheiser | |
| 7,865,893 B1 | 1/2011 | Omelyanchuk et al. | |
| 7,912,955 B1 | 3/2011 | Machiraju et al. | |
| 7,925,850 B1 | 4/2011 | Waldspurger et al. | |
| 7,941,470 B2 | 5/2011 | Le et al. | |
| 7,962,496 B2 | 6/2011 | Gu et al. | |
| 7,970,917 B2 | 6/2011 | Nakano et al. | |
| 7,979,863 B2 | 7/2011 | Esfahany et al. | |
| 7,996,835 B2 | 8/2011 | Griffith et al. | |
| 8,006,079 B2 | 8/2011 | Goodson et al. | |
| 8,009,682 B2 | 8/2011 | Gopinath | |
| 8,032,899 B2 | 10/2011 | Archer et al. | |
| 8,037,016 B2 | 10/2011 | Odulinski et al. | |
| 8,037,280 B2 | 10/2011 | Pandey et al. | |
| 8,046,694 B1 | 10/2011 | Lappas et al. | |
| 8,091,086 B1 | 1/2012 | Ershov et al. | |
| 8,095,662 B1 | 1/2012 | Lappas et al. | |
| 8,095,931 B1 | 1/2012 | Chen et al. | |
| 8,117,495 B2 | 2/2012 | Graham et al. | |
| 8,127,290 B2 | 2/2012 | Suit | |
| 8,146,079 B2 | 3/2012 | Gupta et al. | |
| 8,161,479 B2 | 4/2012 | Sedukhin et al. | |
| 8,171,115 B2 | 5/2012 | Hamilton et al. | |
| 8,171,485 B2 | 5/2012 | Muller | |
| 8,184,631 B2 | 5/2012 | Kunhappan et al. | |
| 8,195,866 B2 | 6/2012 | Ginzton | |
| 8,201,167 B2 | 6/2012 | Anderson et al. | |
| 8,209,684 B2 | 6/2012 | Kannan et al. | |
| 8,219,653 B1 | 7/2012 | Keagy et al. | |
| 8,275,885 B2 | 9/2012 | Hu et al. | |
| 8,280,790 B2 | 10/2012 | Lappas et al. | |
| 8,327,353 B2 | 12/2012 | Traut et al. | |
| 8,352,608 B1 | 1/2013 | Keagy et al. | |
| 8,359,451 B2 | 1/2013 | Chen et al. | |
| 8,364,802 B1 | 1/2013 | Keagy et al. | |
| 8,374,929 B1 | 2/2013 | Lappas et al. | |
| 8,418,176 B1 | 4/2013 | Keagy et al. | |
| 8,443,077 B1 | 5/2013 | Lappas et al. | |
| 8,453,144 B1 | 5/2013 | Keagy et al. | |
| 8,458,717 B1 | 6/2013 | Keagy et al. | |
| 8,464,535 B2 | 6/2013 | Keagy et al. | |
| 8,473,587 B1 | 6/2013 | Lappas et al. | |
| 8,495,512 B1 | 7/2013 | Lappas et al. | |
| 8,533,305 B1 | 9/2013 | Keagy et al. | |
| 8,601,226 B1 * | 12/2013 | Lappas | G06F 9/5077 709/203 |
| 8,656,018 B1 | 2/2014 | Keagy et al. | |
| 8,671,405 B2 | 3/2014 | Nicholas et al. | |
| 9,507,542 B1 * | 11/2016 | Lappas | G06F 9/5077 |
| 2003/0159028 A1 | 8/2003 | Mackin et al. | |
| 2004/0143664 A1 | 7/2004 | Usa et al. | |
| 2004/0267897 A1 | 12/2004 | Hill et al. | |
| 2005/0038834 A1 | 2/2005 | Souder et al. | |
| 2005/0120160 A1 | 6/2005 | Plouffe et al. | |
| 2005/0216920 A1 | 9/2005 | Tewari et al. | |
| 2006/0089995 A1 | 4/2006 | Kerr et al. | |
| 2006/0136761 A1 | 6/2006 | Frasier et al. | |
| 2006/0155735 A1 | 7/2006 | Traut et al. | |
| 2006/0168224 A1 | 7/2006 | Midgley | |
| 2006/0174087 A1 | 8/2006 | Hashimoto et al. | |
| 2006/0184653 A1 | 8/2006 | van Riel | |
| 2006/0195715 A1 | 8/2006 | Herington | |
| 2006/0218544 A1 | 9/2006 | Chakraborty et al. | |
| 2006/0277542 A1 | 12/2006 | Wipfel | |
| 2007/0028239 A1 | 2/2007 | Dyck et al. | |
| 2007/0043860 A1 | 2/2007 | Pabari | |
| 2007/0050763 A1 | 3/2007 | Kagan et al. | |
| 2007/0074208 A1 | 3/2007 | Ling et al. | |
| 2007/0136402 A1 | 6/2007 | Grose et al. | |
| 2007/0174429 A1 | 7/2007 | Mazzaferri et al. | |
| 2007/0233838 A1 | 10/2007 | Takamoto et al. | |
| 2007/0234302 A1 | 10/2007 | Suzuki et al. | |
| 2007/0240160 A1 | 10/2007 | Paterson-Jones et al. | |
| 2007/0250608 A1 | 10/2007 | Watt | |
| 2007/0260721 A1 | 11/2007 | Bose et al. | |
| 2007/0266433 A1 | 11/2007 | Moore | |
| 2007/0271560 A1 | 11/2007 | Wahlert et al. | |
| 2007/0283348 A1 | 12/2007 | White | |
| 2007/0297428 A1 | 12/2007 | Bose et al. | |
| 2008/0028410 A1 | 1/2008 | Cherkasova et al. | |
| 2008/0033902 A1 | 2/2008 | Glaizel et al. | |
| 2008/0049786 A1 | 2/2008 | Ram et al. | |
| 2008/0059556 A1 | 3/2008 | Greenspan et al. | |
| 2008/0065854 A1 | 3/2008 | Schoenberg et al. | |
| 2008/0086726 A1 | 4/2008 | Griffith et al. | |
| 2008/0104608 A1 | 5/2008 | Hyser et al. | |
| 2008/0163210 A1 | 7/2008 | Bowman et al. | |
| 2008/0201414 A1 | 8/2008 | Amir Husein et al. | |
| 2008/0244600 A1 | 10/2008 | Wong et al. | |
| 2008/0301674 A1 | 12/2008 | Faus | |
| 2009/0016220 A1 | 1/2009 | Uysal et al. | |
| 2009/0024994 A1 | 1/2009 | Kannan et al. | |
| 2009/0037680 A1 | 2/2009 | Colbert et al. | |
| 2009/0049453 A1 | 2/2009 | Baran et al. | |
| 2009/0063750 A1 | 3/2009 | Dow et al. | |
| 2009/0089781 A1 | 4/2009 | Shingai et al. | |
| 2009/0164990 A1 | 6/2009 | Ben-Yehuda et al. | |
| 2009/0172662 A1 | 7/2009 | Liu | |
| 2009/0182605 A1 | 7/2009 | Lappas et al. | |
| 2009/0228883 A1 | 9/2009 | Gebhart et al. | |

(56) References Cited

U.S. PATENT DOCUMENTS

| | | |
|---|---|---|
| 2009/0235067 A1 | 9/2009 | Miller et al. |
| 2009/0265707 A1 | 10/2009 | Goodman et al. |
| 2009/0300210 A1 | 12/2009 | Ferris |
| 2009/0300660 A1 | 12/2009 | Solomon et al. |
| 2009/0328030 A1 | 12/2009 | Fries |
| 2010/0011178 A1 | 1/2010 | Feathergill |
| 2010/0058106 A1 | 3/2010 | Srinivasan et al. |
| 2010/0070970 A1 | 3/2010 | Hu et al. |
| 2010/0070978 A1 | 3/2010 | Chawla et al. |
| 2010/0082799 A1 | 4/2010 | DeHaan et al. |
| 2010/0114825 A1 | 5/2010 | Siddegowda |
| 2010/0138828 A1 | 6/2010 | Hanquez et al. |
| 2010/0235831 A1 | 9/2010 | Dittmer |
| 2010/0332658 A1 | 12/2010 | Elyashev |
| 2011/0004676 A1 | 1/2011 | Kawato |
| 2011/0055714 A1 | 3/2011 | Vemulapalli et al. |
| 2011/0066597 A1 | 3/2011 | Mashtizadeh et al. |
| 2011/0099267 A1 | 4/2011 | Suri et al. |
| 2011/0106949 A1 | 5/2011 | Patel et al. |
| 2011/0107406 A1 | 5/2011 | Frost et al. |
| 2011/0145517 A1 | 6/2011 | Bish et al. |
| 2011/0145816 A1 | 6/2011 | Glikson et al. |
| 2011/0148895 A1 | 6/2011 | Burckart et al. |
| 2011/0153697 A1 | 6/2011 | Nickolov et al. |
| 2012/0023077 A1 | 1/2012 | Kann et al. |
| 2012/0185852 A1 | 7/2012 | Scales et al. |

OTHER PUBLICATIONS

Author Unknown, "Amazon Elastic Compute Cloud (Amazon EC2)—Limited Beta," Jul. 2007 (web page archive date from web,archive.org), http://web.archive.org/web/20070705164650rn_2/www.amazon.com/b?ie=UTF8&node=201590011, Amazon.Com, Inc.

Author Unknown, "Amazon Elastic Compute Cloud (Amazon EC2)—Limited Beta FAQs," Jul. 2007 (web page archive date from web.archive.org, http://web.archive.org/web/20070626055456/www.amazon.com/b?ie=UTF8&node=201591011, Amazon.Com, Inc.

Author Unknown, "Amazon EC2: Developer Guide (API Version Jun. 26, 2006)," 2006 (Month NA), Amazon.Com, Inc., Seattle, Washington, USA.

Author Unknown, "Amazon EC2: Developer Guide (API Version Oct. 1, 2006)," 2006 (Month NA), Amazon.Com, Inc., Seattle, Washington, USA.

Author Unknown, "Amazon EC2: Developer Guide (API Version Jan. 3, 2007)," 2007 (Month NA), Amazon.Com, Inc., Seattle, Washington, USA.

Author Unknown, "Amazon EC2: Developer Guide (API Version Jan. 19, 2007)," 2006 (Month NA), Amazon.Com, Inc., Seattle, Washington, USA.

Author Unknown , "Amazon EC2: Developer Guide (API Version Mar. 1, 2007)," 2007 (Month NA), Amazon.Com, Inc., Seattle, Washington, USA.

Author Unknown, "Amazon EC2: Developer Guide (API Version Aug. 29, 2007), " 2007 (Month NA), Amazon.Com, Inc., Seattle, Washington, USA.

Author Unknown, "AppLogic 2.0—What's new," Jul. 2007 (web page archive date from web.archive.org), http://web.archive.org/web/20070701162502/www.3tera.com/applogic20.html, 3TERA, Inc.

Author Unknown, "AppLogic Overview," Jul. 2007 (web page archive date from web.archive.org), http://web.archive.org/web/20070701161932/www.3 tera.com/applogic.html, 3TERA, Inc.

Author Unknown, "AppLogic Usage," Jul. 2007 (web page archive date from web.archive.org ), http://web.archive.org/web/20070712042731/www.3tera.com/applogicusaQe.html, 3TERA, Inc.

Author Unknown, "AppLogic User Interface," Jul. 2007 (web page archive date from web.archive.org), http://web.archive.org/web/20070704235539/www.3tera.com/applogicui.html, 3TERA, Inc.

Author Unknown, "AppLogic Hardware Configuration," Jul. 2007 (web page archive date from web.archive.org), http://web.archive.org/web/20070707062814/www.3tera.com/applogichw.html, 3TERA, Inc.

Author Unknown, "AppLogic Features," Jul. 2007 (web page archive date from web.archive.org ), http://web.archive.org/web/20070630051607/www.3tera.coni/applogicfeatures.html, 3TERA, Inc.

Author Unknown, "AppLogic—Application Monitoring," Jul. 2007 (web page archive date from web.archive.org), http://web.archive.org/web/20070629035849/www.3tera.com/applogicmonitor.html, 3TERA, Inc.

Author Unknown, "AppLogic Users," Jul. 2007 (web page archive date from web.archive.org), http://web.archive.org/web/20070630061258/www.3tera.com/applogicusers.html, 3TERA. Inc.

Author Unknown, "AppLogic 2.0 Beta Program," Jul. 2007 (web page archive date from web.archive.org), http://web.archive.org/web/20070701162528/www.3tera.com/applogic20beta.html, 3TERA, Inc.

Author Unknown, "Introduction to VMware Infrastructure: ESX Server 3.5, ESX Server 3i version 3.5, VirtualCenter 2.5," Dec. 2007, pp. 1-46, Revision: 20071213, VMware, Inc., Palo Alto, California, USA.

Author Unknown, "Parallels Server Transporter Guide," 2008 (Month NA), pp. 1-101, Parallels Software International Inc.

Author Unknown, "iSCSI SAN Configuration Guide: ESX Server 3.5, ESX Server 3i version 3.5, VirtualCenter 2.5," Nov. 2007, pp. 1-134, Revision: 20071129, VMware, Inc., Palo Alto, California, USA.

Author Unknown, "The first grid operating system that runs and scales existing web applications," Jun. 2006 (web page archive date from web.archive.org), http://web.archive.org/web/20060627045727/www.3tera.com/, 3TERA, Inc.

Author Unknown. "Utility Computing—the easy way to run and scale online applications," Jul. 2007 (web page archive date from web.archive.org), http://web.archive.org/web/20070718011012/www.3tera.com/ 3TERA, Inc.

Author Unknown, "VMware Infrastructure 3 Primer: ESX Server 3.5, ESX Server 3i version 3.5, VirtualCenter 2.5," Nov. 2007, Revision: 20071129, VMware, Inc., Palo Alto, California, USA.

Author Unknown, "Virtual Machine Mobility Planning Guide", Oct. 2007, Revision 20071018, VMware, Inc., Palo Alto, CA.

Author Unknown, "Virtual Machine Backup Guide: ESX Server 3.5, ESX Server 3i version 3.5, VirtualCenter 2.5", Nov. 2007, Revision 20071129, VMware, Inc., Palo Alto, CA.

Author Unknown, "Vmware Introduces New Release of Its Powerful Desktop Virtualization Software," Sep. 12, 2005, 3 pages, PR Newswire Association LLC, New York, USA.

Viswanathan, Vivek, "Load Balancing Web Applications," Sep. 28, 2011, 6 pages, http://onjava.com/pub/onjava/2001/09/26/load.html, O'Reilly Media Inc.

U.S. Appl. No. 11/834,722, filed Aug. 7, 2007, entitled "Automated System for Receiving and Provisioning Servers".

U.S. Appl. No. 11/834,732, filed Aug. 7, 2007, entitled "Automated System for Hosting Servers".

U.S. Appl. No. 11/834,768, filed Aug. 7, 2007, entitled "User Interface for Monitoring Hosted Services".

U.S. Appl. No. 12/421,604, filed Apr. 9, 2009, entitled "Automated System and Method to Customize and Install Virtual Machine Configurations for Hosting in a Hosting Environment".

U.S. Appl. No. 12/421,608, filed Apr. 9, 2009, entitled "Automated System and Method for Managing Hosting Resources".

U.S. Appl. No. 12/421,612, filed Apr. 9, 2009 entitled "Automated System and Method for Extracting and Adapting System Configurations".

U.S. Appl. No. 12/421,614, filed Apr. 9. 2009, entitled "System and Method for Identifying Adaptations to a System Configuration That Facilitate Hosting of the System Configuration".

U.S. Appl. No. 12/652,730, filed Jan. 5, 2010, entitled "Multi-Server Control Panel".

U.S. Appl. No. 12/841,151, filed Jul. 21, 2010, entitled "System and Method For Preparing Virtual Servers for Storage in a Hosting System".

(56) References Cited

OTHER PUBLICATIONS

U.S. Appl. No. 12/841,156, filed Jul. 21, 2010, entitled "System and Method for Deploying Virtual Servers in a Hosting System".

U.S. Appl. No. 12/841,164, filed Jul. 21, 2010, entitled "System and Method for Adapting a System Configuration of a Virtualized Computer System for Hosting as an Non-Virtualized Computer System".

U.S. Appl. No. 12/982,487, filed Dec. 30, 2010, entitled "System and Method for Billing for Hosted Services".

U.S. Appl. No. 13/225,372, filed Sep. 2, 2011, entitled "Multi-Server Control Panel".

U.S. Appl. No. 13/316,431, filed Dec. 9, 2011, entitled "Automated Scheduling of Virtual Machines Across Hosting Servers".

U.S. Appl. No. 13/607,642, filed Sep. 7, 2012, entitled "System and Method for Billing for Hosted Services".

Non-Final Rejection dated Dec. 31, 2012 for Appl. No. 12/841,150, filed Jul. 21, 2010; 8 pages.

Notice of Allowance dated Jul. 19, 2013 for U.S. Appl. No. 12/841,150, filed Jul. 21, 2010; 8 pages.

Non-final Rejection dated Sep. 12, 2012 for U.S. Appl. No. 12/841,151, filed Jul. 21, 2010; 15 pages.

Non-Final Rejection dated Sep. 18, 2012 for U.S. Appl. No. 12/841,158, filed Jul. 21, 2010; 7 pages.

Notice of Allowance dated Jan. 28, 2013 for U.S. Appl. No. 12/841,158, filed Jul. 21, 2010; 5 pages.

Non-Final Rejection dated Apr. 24, 2012 for U.S. Appl. No. 12/841,161, filed Jul. 21, 2010; 9 pages.

Non-Final Rejection dated Nov. 5, 2012 for U.S. Appl. No. 12/841,161, filed Jul. 21, 2010; 8 pages.

Notice of Allowance dated Mar. 15, 2013 for U.S. Appl. No. 12/841,161, filed Jul. 21, 2010; 5 pages.

Non-Final Rejection dated Aug. 27, 2012 for U.S. Appl. No. 12/841,162, filed Jul. 21, 2010; 20 pages.

Notice of Allowance dated Dec. 14, 2012 for U.S. Appl. No. 12/841,162, filed Jul. 21, 2010; 6 pages.

Notice of Allowance dated Jan. 3, 2013 for U.S. Appl. No. 12/841,162, filed Jul. 21, 2010; 2 pages.

Non-Final Rejection dated Sep. 24, 2015 for U.S. Appl. No. 14/088,294, filed Nov. 22, 2013; 11 pages.

Final Rejection dated May 17, 2016 for U.S. Appl. No. 14/088,294, filed Nov. 22, 2013; 7 pages.

Notice of Allowance dated Jul. 27, 2016 for U.S. Appl. No. 14/088,294, filed Nov. 22, 2013; 5 pages.

* cited by examiner

SYSTEM AND METHOD FOR DEPLOYING VIRTUAL SERVERS IN A HOSTING SYSTEM

CLAIM OF BENEFIT TO PRIOR APPLICATIONS

This application is a continuation application of U.S. patent application Ser. No. 14/088,294 filed Nov. 22, 2013, which is a continuation application of U.S. patent application Ser. No. 12/841,150 filed Jul. 21, 2010, which claims the benefit of U.S. Provisional Patent Application No. 61/346,871, entitled "System and Method for Storing and Deploying Server Images in a Hosting System," filed May 20, 2010, all of which are incorporated herein by reference in their entireties.

FIELD OF THE INVENTION

The present invention relates to the storage and deployment of images of virtual machines operating on a hardware resource of a hosting system.

BACKGROUND OF THE INVENTION

Hosting services provide a means whereby multiple users can implement custom server configurations without the overhead costs associated with purchasing, upgrading, and maintaining equipment needed to implement the configuration. Instead, a hosting service provider maintains and provisions a grid of hardware nodes that are shared amongst the multiple users. More specifically, resources of a single node can be partitioned and each of these partitions can be allocated to host a virtual server configuration of a different user.

Each hardware node in the grid includes one or more processing units (e.g., a CPU, multiple CPUs, CPUs with multiple processing cores, ASICs, graphics processing units, etc.), memory, block devices (e.g., disk storage devices), networking capabilities, and other such computing resources that often exceed the computing resources required by any single user's server configuration. By partitioning the resources of a hardware node amongst multiple server configurations, a hosting service provider minimizes the amount of hardware needed to host all such server configurations, while maximizing the usage of the available hardware.

Virtualization provides the means for partitioning the hardware resources amongst the multiple server configurations. Virtualization creates the façade that each server configuration is individually hosted on dedicated equipment with a particular set of resources. Two or more server configurations are provided non-conflicting sets of resources of the same hardware node such that a guaranteed amount of processing resources is available to each such configuration. In other words, a single physical resource is partitioned to operate as multiple logical resources.

As shown in FIG. 1, virtualization allows a single computing device 110 the ability to function as two or more different computing devices with each device having distinct sets of hardware resources and software resources. For instance, configuration 120 may be allocated 40% of the memory and 80% of the processor cycles of the device 110 and configuration 130 may be allocated the remaining 60% of the memory and 20% of the processor cycles of the device 110. Additionally, the configuration 120 may operate using a first operating system with a first set of configuration parameters and the configuration 130 may operate using a second operating system with a second set of configuration parameters.

An added benefit of virtualization is that a failure in one configuration does not disrupt the operation of the other configurations, even though all such configurations operate over physical resources of a single device. With reference to FIG. 1, should the configuration 120 crash due to an improper configuration of the operating system, the configuration 130 will continue operating unhindered as the resources used by each configuration 120 or configuration 130 operate independent of one another.

At the core of each virtualization solution is the hypervisor. The hypervisor, also referred to as the virtual machine monitor, manages a logical partitioning of a physical set of hardware resources of a physical device or node between different virtualized guests. Each virtualized guest implements one or more virtual machines over a logical partition. The hypervisor partitions underlying hardware resources such that each virtual machine is provided what logically appears as a distinct and unshared set of hardware resources. However, the hypervisor maps the virtual machine hardware calls to a corresponding subset of physical hardware resources that are actually shared by all virtual machines operating on a particular hardware node.

The hypervisor is thus responsible for mapping the hardware resources of a node to a set of virtual resources. The set of virtual resources can then be distributed independently to one or more operating systems or applications that together form the one or more virtual machines. In this manner, each virtual machine effectively is provided its own resources (e.g., a processor, memory, disk storage, networking, etc.), and the operating system of each virtual machine operates with little to no change over the provided set of resources.

Different vendors implement hypervisors differently (e.g., Xen®, Parallels®, VMware®, Kernel Virtual Machine® ("KVM"), etc.). Specifically, two prominent hypervisor types are defined as "type 1" hypervisors and "type 2" hypervisors, which are further described with reference to FIG. 2.

FIG. 2 illustrates several different platforms (both virtual and physical) on which a system configuration can operate. FIG. 2 shows a computer system 200 having a system configuration 205 and a platform 210. The system configuration 205 includes a kernel layer 235 and operating system and application layers 240. The system configuration 205 may include a set of device drivers that allow hardware devices of the platform 210 to communicate with the kernel 235, the operating system, and/or the applications of the system configuration 205.

FIG. 2 also illustrates three different types of platforms 210 in three exploded views 250a-c. The first exploded view 250a illustrates a platform 210a of a "traditional" computer system (i.e., a computer system with no hypervisors). This platform 210a includes only the physical hardware 215 of the computer system. Thus, the configuration 205 directly interfaces with the physical hardware 215 of the computer system 200.

The second exploded view 250b illustrates a platform 210b of a computer system in which a type 1 hypervisor 255 is present. The type 1 hypervisor 255 interfaces with the physical hardware of the computer, and provides a set of virtual hardware to the system configuration 205. Thus, the system configuration 205 interfaces with the virtual hardware provided by the type 1 hypervisor 255, which itself directly accesses the physical hardware 215 of the computer system 200.

The third exploded view 250c illustrates a platform 210c of a computer system in which a type 2 hypervisor 230 is present. The platform 210 includes a "host" kernel layer 220 on top of the physical hardware 215 and a "host" operating system 225 on top of the host kernel layer 220. This platform 210 also includes an application layer (not shown) on top of the operating system layer. Additionally, the platform 210 includes a type 2 hypervisor 230, which interfaces with the host operating system 225. This type 2 hypervisor 230 may be one of the applications in the application layer (not shown) on top of the host operating system 225. The type 2 hypervisor 230 is allocated a set of the physical resources 215 by the host operating system 225. Accordingly, the system configuration 205 interfaces with virtual hardware provided by the type 2 hypervisor 230, which itself receives a set of hardware resources from the host operating system 225.

The computer system shown in the exploded view 250c may be considered a "traditional" computer system (e.g., a traditional computer system as shown in the exploded view 250a) with the type 2 hypervisor 230 as one of the applications in the application layer. In other words, the computer system of this exploded view 250c may be considered a traditional computer system with system configurations "stacked" on one another.

Hosting services allow users to implement their system configurations (e.g., system configuration 205) on remote computer systems without the pitfalls associated with owning and maintaining the hardware platforms on which the system configurations run. These pitfalls include overhead costs associated with purchasing, upgrading, and/or maintaining equipment and software needed to implement the system configuration. Instead of a user burdening him or herself with these headaches, a hosting service provider maintains and provisions a grid of hardware nodes that are shared amongst multiple users. More specifically, resources of a single node can be partitioned and each of these partitions can be allocated to a virtual server configuration of a different user.

In order to host a system configuration, some hosting systems allow a user to set up the system configuration "from scratch." In other words, the user selects one operating system from various different operating systems, and can then configure the operating system by changing parameters, installing other applications to run on top of the operating system, etc. However, users may wish to have multiple servers that are all the same without having to go through the hassle of configuring every one of the servers separately. Users may also wish to stop using a server for an extended amount of time and then bring the server back up later on without having to pay for the usage of hardware space during the downtime. Furthermore, users may wish to take a configuration of one of their virtual servers and use this configuration in another hosting system or on their own physical machine. Therefore, there is a need in the art for a method of storing a system configuration of a computer system in order to re-use the system configuration at a later time without a user being required to reconfigure a new system.

SUMMARY OF THE INVENTION

Some embodiments provide a server hosting and storage system for (1) storing images of virtual machines that are hosted on the system and (2) deploying virtual machines on the hosting system from the stored images. A user of the hosting and storage system has the ability to store an image of any of the user's virtual machines that are hosted on the system. These images are stored in a permanent storage of the hosting and storage system. The user also has the ability to deploy any such stored images automatedly as a virtual machine on the hosting system such that the deployed virtual machine will have the same system configuration as the saved virtual machine. The system configuration, as used in this sense, includes the operating system of the virtual machine and applications running on top of the operating system, as well as any user-definable settings for the operating system and applications.

The hosting and storage system of some embodiments includes (1) a front-end user interface and/or application programming interface for receiving instructions from a user regarding the saving and deployment of virtual machines, (2) a system management module for managing a grid of hardware nodes on which the virtual machines are hosted, (3) a grid of hardware nodes for hosting the virtual machines, (4) a permanent storage network for storing the images, and (5) a caching network for segregating the permanent storage network from the hardware grid and for temporarily storing the images. In some embodiments, one or more of the hardware nodes includes a hypervisor for managing the sharing of the resources of the hardware node between one or more virtual machines running on the node and a utility management module for managing the image storing and deployment processes on the hardware node.

The image storing process of some embodiments extracts the virtual machine data off of the hard disk of the hardware node and stores this data as a single file. In order for the image storing process to be performed, the virtual machine operating on the node must first be prepared. In some embodiments, prep scripts operating on the virtual machine remove paravirtualization drivers (drivers that enable to the virtual machine to access hardware resources of the node through a hypervisor) and various system-specific information that may vary between operating systems.

Once prep scripts for the virtual machine have run, the utility management module can perform the image storage process. In some embodiments, the utility management module extracts the data representing the system configuration of the virtual machine from a hard disk partition allocated to the virtual machine. Some embodiments extract the data in units having a particular size and calculate a checksum for each unit of system configuration data. The units of data, along with their checksums, can be stored as a single file. This file is stored in a compressed format in some embodiments.

The utility management module of some embodiments streams each unit of data and the checksum for the unit to an external storage. The data is streamed through a caching network to a permanent storage network (e.g., a network of cloud storage clusters). In some embodiments, the caching network amalgamates the units of data into a single file and compresses the file. The amalgamation and compression may also be performed by the utility management module or the permanent storage network in some other embodiments.

The images stored in the permanent storage may be used to deploy a new virtual machine having the same system configuration as the virtual machine from which the image was created. The image file is decompressed and streamed through the caching network to the utility management module of the node on which the new virtual machine is to be deployed. Some embodiments will first check the caching network to determine whether the image file is already loaded onto one of the cache server in the caching network. When the image file is already on a cache server, the file in the permanent storage network is not accessed and the copy loaded on the cache server is used.

To deploy the new virtual machine, the utility management module recalculates the checksum for each unit of data in the image file and matches this against the checksum stored in the file. Once verified, the data is laid down on a disk volume on the node allocated to the new virtual machine. If any of the checksums do not match, then the image data has been corrupted and the image file is re-retrieved from the permanent storage network.

When the entirety of the image file data has been verified and laid down on the disk volume, the utility management module oversees the installation of the paravirtualization drivers and various system-specific information onto the new virtual machine. In some cases, the utility management module directly installs this information on the virtual machine, while in other cases the utility management module lays the information down on the disk such that the information is installed automatically upon the initial boot of the virtual machine.

As mentioned, an image file requested by the utility management module might already be on the caching network. When an image is transferred from the permanent storage network to a node, the image is loaded onto a cache server in the caching network. In some embodiments, each cache server maintains a queue of images, with the most recently deployed images at the top (entry point) of the queue. Thus, when a utility management module sends a request for an image file, that image will already be stored on one of the cache servers if the image was recently deployed.

In order to speed up the process of searching through the multiple cache servers on the caching network, some embodiments use affinity scoring to assign image files to cache servers and identify cache servers most likely to be storing image files. When an image is loaded into the caching network from permanent storage, a score is calculated for each of the cache servers. For a particular image file and cache server, the score is a function (e.g., a hash function) of the image file name and the cache server name in some embodiments. The image file is preferentially loaded onto the cache server with the highest score for that image file. When a utility management module requests the image, the cache server with the highest score is checked first for the image file.

Some embodiments have additional features to speed up the process of deploying a virtual machine. In some embodiments, a number of pre-built disk volumes of one or more sizes (e.g., 20 Gb, 50 Gb, 100 Gb, etc.) are maintained on the hardware nodes. When a user requests a virtual machine having one of the pre-defined sizes, no time need be spent creating a partition on the hard disk of the node. Going further, some embodiments maintain a number of pre-deployed virtual machines from popular image files. In some embodiments, some images are publicly available, and the most popular of these publicly available system configurations are maintained on the nodes. These pre-deployed virtual machines are not configured for use by a particular user, but all of the data in the image file has been laid down on a disk volume. When the image is requested by a user, the virtual machine need only be configured for use by that user, thereby cutting down on the time from the user request to an operational virtual machine.

In addition to files storing single images, some embodiments enable a user to store a configuration of multiple connected virtual machines. Such a configuration could include several types of virtual machines, such as load balancers, web servers, database servers, etc. In some embodiments, when a user initiates a save of such a multi-server configuration, an image is created and stored for each of the virtual machines in the configuration. The multi-server configuration is then defined in a separate file that contains references to each of the images as well as the connections between the different images. A user can request such a saved configuration, and the different images will be deployed on one or more hardware nodes in the hosting system and connected according to the references in the multi-server configuration file.

While the above discussion describes the use of image files for virtual machines in a hosting and storage network, the image files may also be used outside of the hosting environment in some embodiments. For instance, a user may download an image file for a particular system configuration and then deploy that system configuration as a virtual machine on a different hosting system in some embodiments, so long as the second hosting system has the functionality to read the image file. The user can also deploy the system configuration as a physical machine on their own device without a hypervisor in some embodiments by using an application (e.g., on another device) that can read the image file and install device drivers rather than paravirtualization drivers. In similar fashion, if a user has an application that can mimic the processes on the utility management module for creating an image file, the user can create an image of the system configuration of their physical machine and then deploy a virtual machine on the hosting system using the image file.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
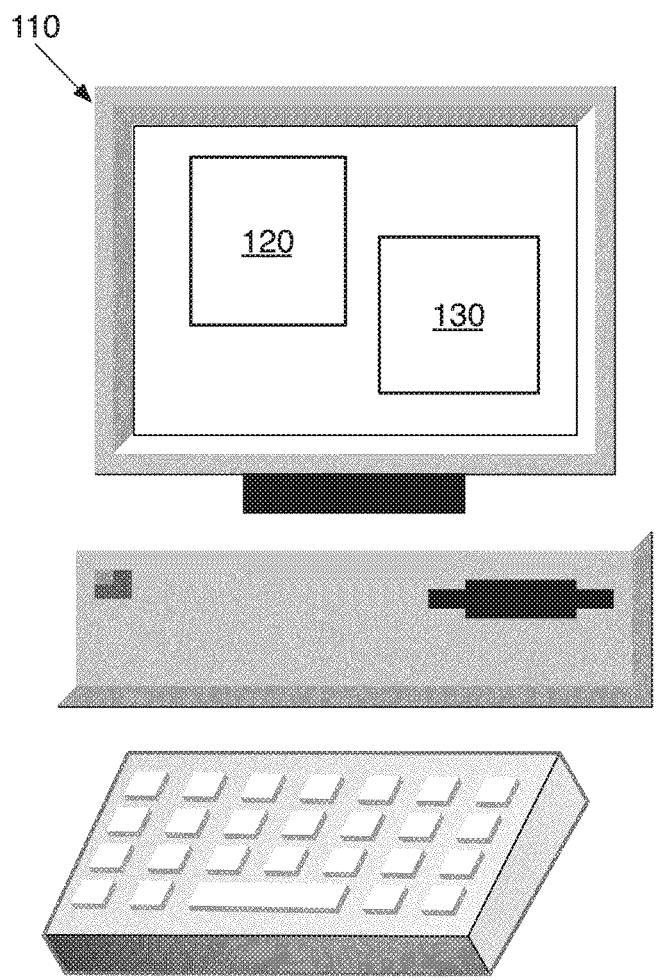
FIG. 1 illustrates a computer system that runs two different system configurations simultaneously.
Figure 2:
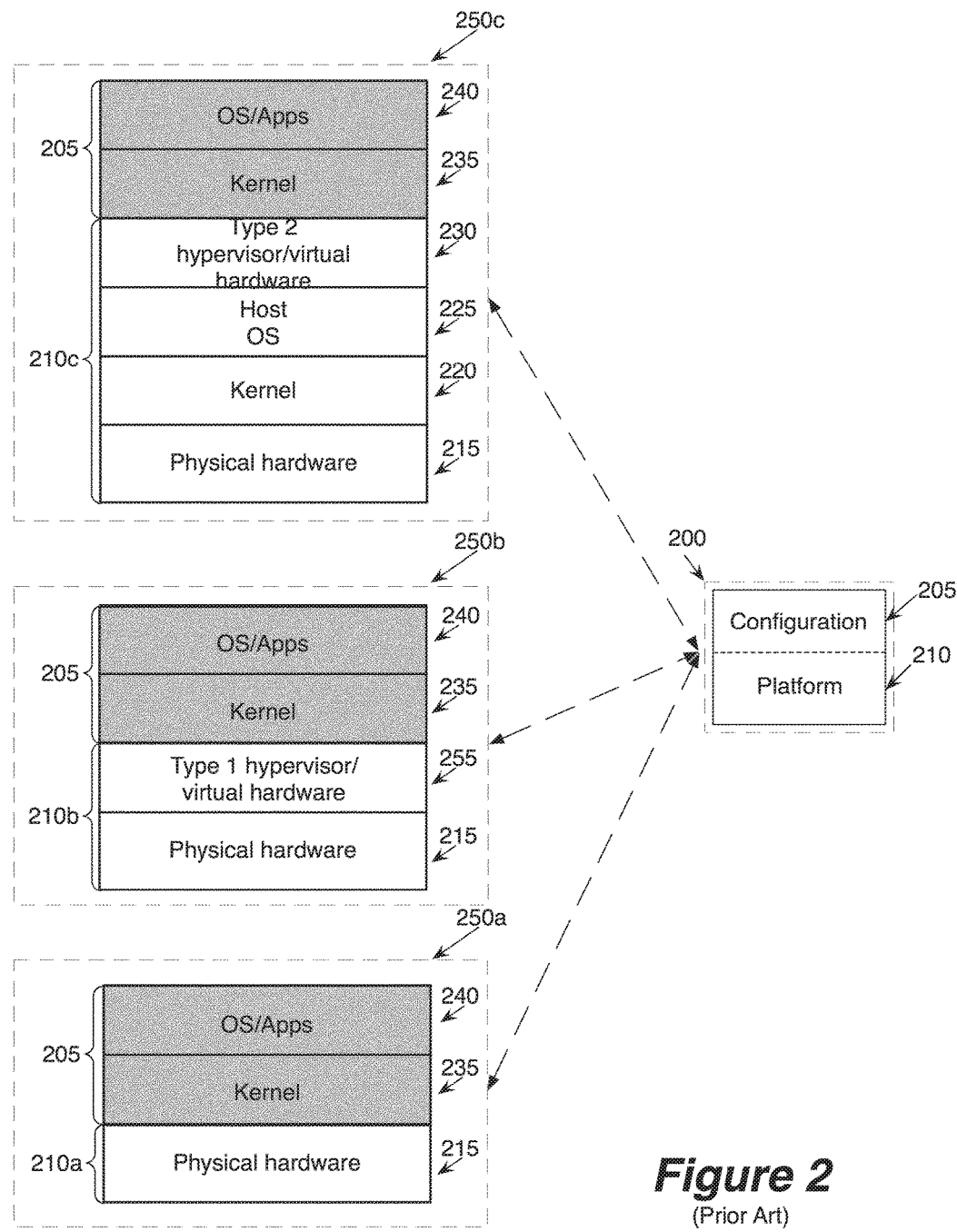
FIG. 2 illustrates different examples of platforms that may be present on a computer system.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a server hosting and storage system for (1) storing images of virtual machines that are hosted on the system and (2) deploying virtual machines on the hosting system from the stored images. In some embodiments, the virtual machines include system virtual machines. A system virtual machine is a particular configuration of a computer system platform with its own file system and operating system. The computer system platform may also include various application programs that are installed on the file system and that are compiled to directly execute on the operating system platform. A system virtual machine is therefore a complete configuration that is independently operable on a hardware node within the hosting system.

On a particular hardware node of the hosting system that hosts multiple virtual machines, a system virtual machine operates independent of the other operating systems of the other virtual machines operating on the particular hardware node. In this manner, multiple operating system environments (e.g., Microsoft® Windows®, Linux®, etc.) co-exist on a node without mutually interfering with each other's operations. In other words, a hardware node of some embodiments concurrently executes virtual machines of different computer system configurations for one or more users using a single set of hardware resources of the node.

System virtual machines are different than process virtual machines. Unlike system virtual machines, a process virtual machine does not include its own operating system. Rather, a process virtual machine runs as an application on a host operating system. The process virtual machine provides a platform independent programming environment for application programs that interface with the process virtual machine in order to run on the host operating system. The application programs therefore cannot run on the host operating system without the process virtual machine. Similarly, the process virtual machine cannot run the application programs without the host operating system.

In some embodiments, a node is a particular physical machine such as a server or other computer device/machine that includes processing resources, memory resources, block/disk storage resources, network resources, etc. that implement and execute the one or more computer system configurations of the virtual machines. The node also includes a hypervisor that operates at a lower level than the virtual machines on the node. The hypervisor manages the access of the virtual machines on a node to the underlying hardware resources of the node.

A user of the hosting and storage system has the ability to store an image of any of the user's virtual machines that are hosted on the system. In some embodiments, an image of a virtual machine is a file or files that stores the state of the virtual machine (e.g., by copying the contents of the virtual machine's storage). These images are stored in a permanent storage of the hosting and storage system. The user also has the ability to deploy any such stored images automatedly as a virtual machine on the hosting system such that the deployed virtual machine will have the same system configuration as the saved virtual machine. The system configuration, in some embodiments, includes the operating system of the virtual machine and applications running on top of the operating system, as well as any user-definable settings for the operating system and applications.

Such a hosting and storage system of some embodiments includes (1) a front-end user interface and/or application programming interface for receiving instructions from a user regarding the saving and deployment of virtual machines, (2) a system management module for managing a grid of hardware nodes on which the virtual machines are hosted, (3) a grid of hardware nodes for hosting the virtual machines, (4) a permanent storage network for storing the images, and (5) a caching network for segregating the permanent storage network from the hardware grid and for temporarily storing the images. In some embodiments, one or more of the hardware nodes includes a hypervisor for managing the sharing of the resources of the hardware node between one or more virtual machines running on the node and a utility management module for managing the image storing and deployment processes on the hardware node.

Figure 3:
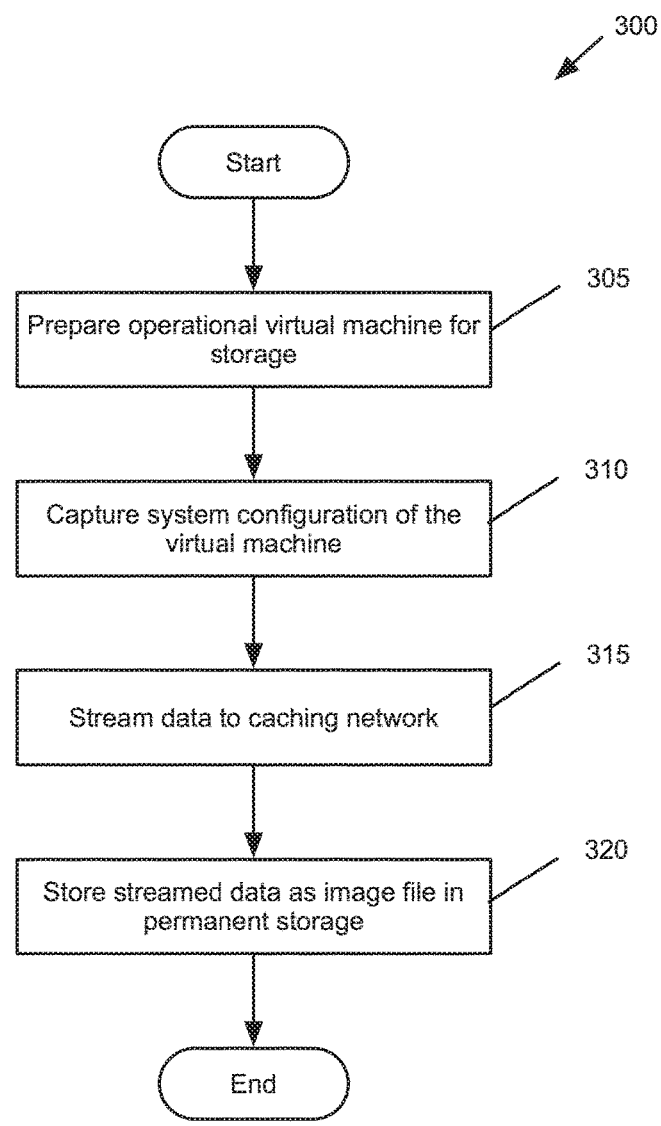
FIG. 3 conceptually illustrates a process of some embodiments performed by a hosting and storage system to create and store an image.

The image storing process of some embodiments extracts the virtual machine data off of the portion of the hard disk (and, in some cases, other storages) of the hardware node allocated to the virtual machine and stores this data as a single file. FIG. 3 conceptually illustrates a process 300 of some embodiments performed by the hosting and storage system to create and store such an image.

As shown, process 300 begins by preparing (at 305) an operational virtual machine for storage. In some embodiments, instructions are sent to the virtual machine to launch prep scripts that must be run on the virtual machine before the machine can be saved. These prep scripts are pre-installed on some or all virtual machines operating in the hosting system in some embodiments. When run, the prep scripts of some embodiments remove drivers (e.g., paravirtualization drivers) and various system-specific information. Paravirtualization drivers are drivers that enable the virtual machine to interface with the hypervisor to access hardware resources rather than accessing the resources directly with standard device drivers. The system-specific information may vary between operating systems, and is information that is specific to the particular instantiation of the system configuration (e.g., system identifiers, log and history files, etc.). In some embodiments, the prep scripts place the virtual machine in a non-operational state. That is, once the prep scripts are launched, the virtual machine is no longer operating as a functional server.

Process 300 next captures (at 310) the system configuration of the virtual machine. In some embodiments, the capture operation is performed by the utility management module running on the hardware node with the virtual machine. In some embodiments, the utility management module is a software module (e.g., a specialized virtual machine) operating within each node that has input/output interfaces for communicating with the system management module of the hosting system, the hypervisor on the node, the hardware resources on the node, other virtual machines on the node, and the caching network of the hosting system. The utility management module of some embodiments performs the processes to extract and store a system configuration of a virtual machine as well as to deploy and configure a new virtual machine.

To capture the system configuration of the virtual machine, some embodiments extract the data from the block storage (e.g., disk storage) allocated to the virtual machine. Some embodiments extract the data in units of a particular size and calculate a checksum for each unit of the system configuration data. These data units, along with their checksums, are eventually appended together as a single image file. The checksums are used for data integrity verification when deploying a new virtual machine using the image file. In some embodiments, the file is stored in a compressed format (e.g., using zip compression).

Next, process 300 streams (at 315) the captured data to a caching network. As mentioned, the utility management module of some embodiments has an input/output interface for communicating with the caching network of the hosting system. In some embodiments, the utility management module streams each unit of data and the checksum for the unit once the checksum is calculated. The caching network of some embodiments segregates the hardware nodes from the permanent storage network, avoiding an input/output bottleneck.

Finally, process 300 stores (at 320) the streamed data as an image file in permanent storage. As mentioned, the numerous units of data are stored as one image file. Some embodiments amalgamate the units of data into one file within the caching network. In other embodiments, the utility management module or the permanent storage network amalgamates the data into one image file. Once the data is all in one image file, the image can be compressed for storage. This file can be retrieved later in order to deploy a virtual machine with the same system configuration as the virtual machine that was extracted to create the image.

Figure 4:
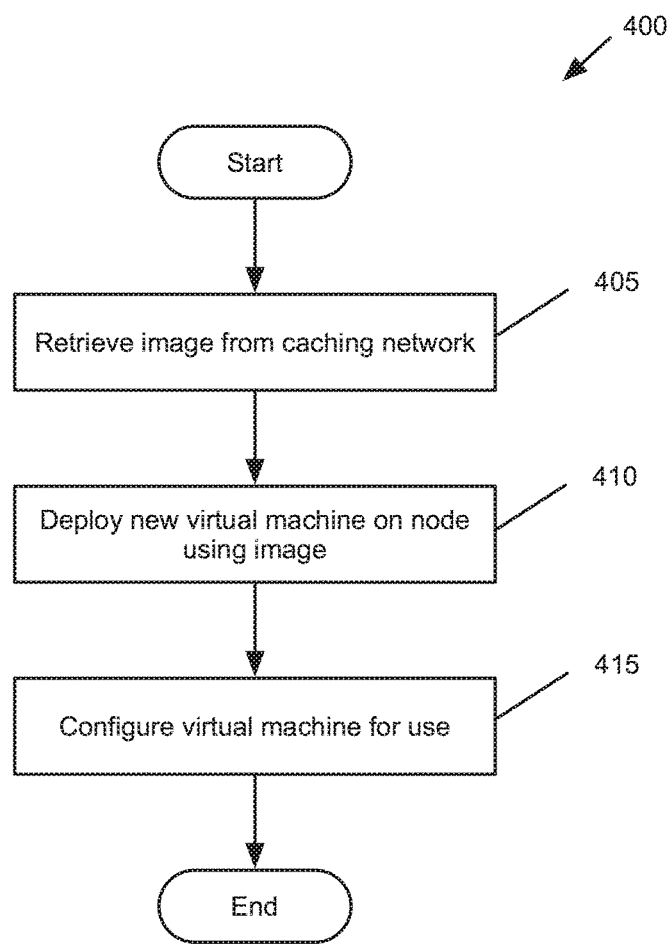
FIG. 4 conceptually illustrates a process of some embodiments for deploying a virtual machine using an image file.

FIG. 4 conceptually illustrates such a process 400 of some embodiments for deploying a virtual machine using an image file. As shown, process 400 begins (at 405) by retrieving an image from the caching network. As described, the utility management module of a node communicates with the caching network. In some embodiments, the utility management module of the node on which the new virtual server will operate sends a request to the caching network for the desired image.

In some cases, the caching network will then retrieve the image from the permanent storage network. However, some embodiments first determine whether the image is already on a cache server in the caching network. When an image is transferred from the permanent storage network to a cache server for the purposes of then being streamed to the requesting utility management module of a node, the image is loaded into a queue of the cache server (e.g., in volatile memory of the cache server such as RAM). Each cache server keeps a queue of such recently used images, with the most recently deployed image at the top (entry point) of the queue. In this way, images that are regularly used will remain near the top of the queue. Thus, when a utility management module requests an image file that was recently deployed, the image file will already be loaded on one of the caching servers. In this case, the image need not be retrieved from the permanent storage network, thereby speeding up the retrieval process for the utility management module.

In order to further speed up the retrieval, some embodiments use an affinity scoring process to (1) assign images retrieved from the storage network to cache servers and (2) identify cache servers most likely to be storing requested images. When an image is loaded into the caching network from permanent storage, a score is calculated for each cache server in the network. For a particular image file and cache server, some embodiments calculate the score as a function (e.g., a hash function) of the image file name and the cache server name. The image file is preferentially loaded onto the cache server with the highest score for that image file. When a utility management module sends a request for the image, the queue of the cache server with the highest score is checked first for the image file. This will often enable the image file to be found within the first one or two cache servers checked, thereby enabling quicker image retrieval.

Returning to FIG. 4, process 400 next deploys (at 410) a new virtual machine on the node using the retrieved image. In some embodiments, the utility management module allocates a disk volume on the storage of the node, then verifies and copies the data from the image file to the disk volume. The retrieved image data is stored in memory of the utility management module. Each unit of data is verified by recalculating the checksum for the unit and comparing the newly calculated checksum to the checksum appended to the unit of data. If there is a difference between the checksums, this indicates that the data was corrupted at some point (e.g., while on the cache server) and the image is re-retrieved from the permanent storage network. By checking each unit, often data corruption will be detected before the entire image file needs to be loaded into memory and checked.

As each unit of data is verified, it is copied onto the disk volume of the node that has been allocated for the virtual machine. Once the virtual machine is deployed, the process configures (at 415) the virtual machine for use by the user that initially requested the deployment. In some embodiments, configuring the virtual machine includes installing drivers (e.g., paravirtualization drivers to enable the virtual machine to access hardware resources through the hypervisor) as well as installing various system-specific information. As described above, the system-specific information may vary between operating systems, and is information specific to the particular instantiation of the image (e.g., system identifiers, log and history files, etc.). Some embodiments also assign the virtual machine an IP address and perform other network configuration necessary to allow the virtual machine to communicate with the user's other virtual machines in the hosting system and, if required, devices outside the hosting system.

In some embodiments, the utility management module executes each of the data extraction, data streaming and retrieval, disk allocation, deployment, and configuration operations based on different scripts stored on a remote file system based on instructions from the system management module of the hosting system. However, in other embodiments, the scripts for performing these operations are stored locally on the file system of the utility management module. In some such embodiments, one instruction is sent from the system management module (e.g., to deploy a particular image) and the utility management module executes the scripts required to perform the instruction.

Some embodiments employ additional features that speed up the process of deploying a new virtual machine. In some embodiments, a number of pre-built disk volumes of one or more sizes (e.g., 20 Gb, 50 Gb, 100 Gb, etc.) are maintained on the hardware nodes. When a user requests a virtual machine having one of the pre-defined sizes, no time need be spent creating a partition on the disk storage of the node. Going further, some embodiments maintain a number of pre-deployed virtual machines from popular image files. In some embodiments, some images are publicly available, and the most popular of these publicly available system configurations are maintained on the nodes. These pre-deployed virtual machines are not configured for use by a particular user, but all of the data in the image file has been copied to a disk volume. When the image is requested by a user, the virtual machine need only be configured for use by that user, thereby cutting down on the time from the user request to an operational virtual machine.

In addition to files storing single images, some embodiments enable a user to store a configuration of multiple connected virtual machines. Such a configuration could include several types of virtual machines, such as load balancers, web servers, database servers, etc. In some embodiments, when a user initiates a save of such a multi-server configuration, an image is created and stored for each of the virtual machines in the configuration. The multi-server configuration is then defined in a separate file that contains references to each of the images as well as the connections between the different images. A user can request such a saved configuration, and the different images will be deployed on one or more hardware nodes in the hosting system and connected according to the references in the multi-server configuration file.

While the above discussion describes the use of image files for virtual machines in a hosting and storage network, the image files may also be used outside of the hosting environment in some embodiments. For instance, a user may download an image file for a particular system configuration and then deploy that system configuration as a virtual machine on a different hosting system in some embodiments, so long as the second hosting system has the functionality to read the image file. The user can also deploy the system configuration as a physical machine on their own device without a hypervisor in some embodiments by using an application (e.g., on another device) that can read the image file and install device drivers rather than paravirtualization drivers. In similar fashion, if a user has an application that can mimic the processes on the utility management module for creating an image file, the user can create an image of the system configuration of their physical machine and then deploy a virtual machine on the hosting system using the image file.

Several more detailed embodiments of the invention are described in the sections below. Section I provides a conceptual architecture diagram of the hosting and storage system of some embodiments. Next, Section II describes the process of creating and storing an image from a virtual machine operating on such a hosting system, while Section III describes the deployment of a virtual machine on the hosting system from such an image. Section IV describes the storage architecture and details of the operation of the caching network of some embodiments. Section V describes the storage of template files for multi-server configurations and the use of such template files. Next, Section VI describes the use of images of virtual machines outside of the hosting system. Section VII then describes pre-building disk volumes and pre-deploying virtual machines in the hosting system in order to speed up the deployment process. Finally, Section VIII describes a computer system which implements some embodiments of the invention.

I. System Architecture

Figure 5:
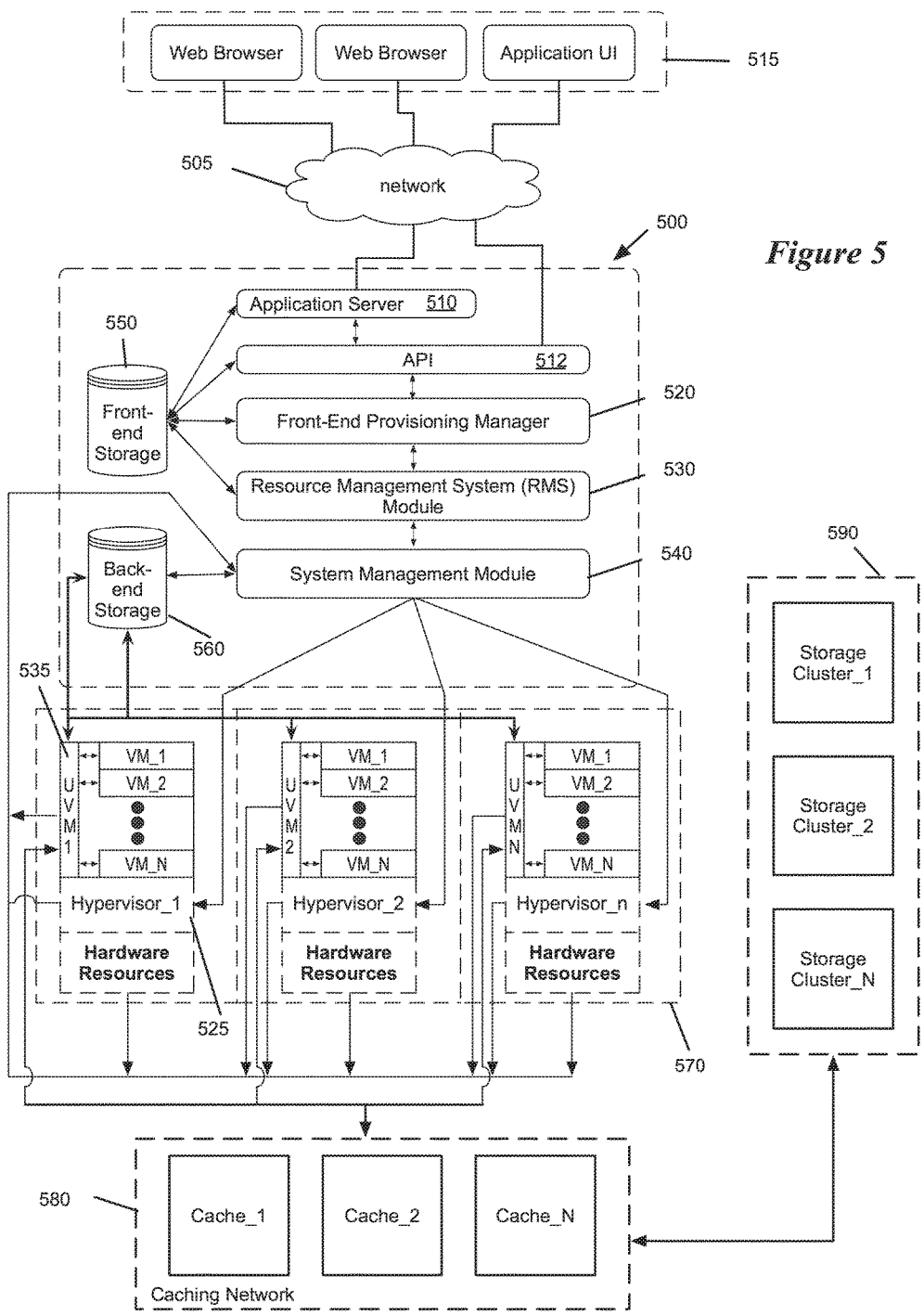
FIG. 5 illustrates a server hosting and storage system that implements some embodiments of the invention.

FIG. 5 illustrates a server hosting and storage system 500 that implements some embodiments of the invention. The system receives server configurations in an automated fashion through front-end logic (e.g., through a user interface ("UI") and/or application programming interface ("API")) and deploys the server configurations onto a grid of hardware nodes through automated back-end placement logic. In some embodiments, the hosting aspect of system 500 provides hosting services for multiple unrelated users over the shared grid of hardware nodes. The storage aspect of some embodiments of system 500 enables the multiple users to save server configurations in permanent storage and deploy these server configurations from the permanent storage directly onto the grid of hardware nodes.

As shown in FIG. 5, the hosting and storage system 500 includes (1) a service request server 510, (2) an API 512, (3) a front-end provisioning manager 520, (4) a resource management system module 530, (5) a system management module 540, (6) front-end storage 550, (7) back-end storage 560, (8) a grid of hardware nodes 570, (9) an image caching network 580, and (10) a permanent storage network 590. In some embodiments, front-end storage 550 and back-end storage 560 are all one single physical storage. In other embodiments, these storages are each a different physical storage, or may even be split into multiple storages (e.g., the back-end storage 560 might include a first storage for scheduling information and a second storage for storing image information).

The service request server 510 (1) provides a user interface to external users through a network 505, (2) receives communications (e.g., service requests) from the external users through the network 505, and (3) routes the communications to the front-end provisioning manager 520 through the API 512. In some embodiments, the service request server 510 is an application server that communicates with a user through a network 505. Specifically, in some such embodiments, a user accesses the hosting system 500 through a web browser, a downloadable client application, etc. 245 residing on the user's computer, personal digital assistant (PDA), mobile telephone, or other such electronic communication device. The network 505 may include a network of networks such as the Internet as well as other networks (e.g., GPRS, GSM, etc.). In this manner, users can access the hosting and storage system 500 while located anywhere throughout the world.

In addition to communicating with the front-end provisioning manager 520 through the server 510, a user can communicate directly with the API 512 in some embodiments. Rather than selecting items in a user interface which are translated into commands by the application server 510, the user directly issues the commands through the network 505 to the API 512 (e.g., through a computer language agnostic HTTP-based API or command line interface). These commands are passed by the API 512 to the front-end provisioning manager 520.

As mentioned, the API 512 routes user communications to the front-end provisioning manager 520. On an initial communication, the front-end provisioning manager 520 passes the user communication to a registration module (not shown) for user verification and authentication (e.g., username and password verification). In some embodiments, the registration module is a fully automated component of the hosting system 500 that performs the verification and authentication operations without human intervention.

If the user is not an existing customer, the registration module of some embodiments presents a graphical interface with editable fields through which the user enters additional identification information for creating a user account. The user-specified information is then stored within front-end data storage 550 for subsequent authentication and authorization of the user. If the user is an existing customer, the user's prior virtual machine configurations, usage information, and stored image information are retrieved from the data storage (i.e., database) 550. The information is passed to the front-end provisioning manager 520.

The front-end provisioning manager 520 generates a user interface (e.g., a graphical user interface (GUI)) through which users specify components of virtual machine configurations hosted by the hardware nodes in the grid 570. The user interface of some embodiments includes graphical representations of various types of components (e.g., load balancers, web servers, database servers, etc.) that each represent a component of the user's virtual machine configuration. Users may utilize these graphical representations to add servers to a configuration or to modify the setup (e.g., the connections) of a particular configuration. In various embodiments, users can click on the representations (e.g., via left-click, right-click, double-click, etc.) within the user interface and/or drag and drop the representations within the graphical display in order to add, modify, delete, etc. virtual machines within the configuration.

In some embodiments, the user interface also provides users the capability to modify the individual configuration of each of the virtual machines. Each virtual machine has one or more configurable parameters in some embodiments that are associated with configuring resources or characteristics of a virtual server running on a physical hardware resource in the grid of nodes represented by the graphical representation. For example, users can modify the memory of a web server, the storage capacity of a database server, etc.

In some embodiments, the specified configuration is scalable to increase or decrease allocated resources in response to demand through simple modification of the graphical representation. Accordingly, the resources for any previously deployed virtual machine configuration may be modified by a user at any time by simply modifying the graphical representations for the configuration. To facilitate the scaling of a server configuration, the front-end provisioning manager 520 of some embodiments acts as a user interface manager that provides a tiered hierarchical representation of the server configuration.

Some embodiments of the front-end manager 520 further provide users the ability to specify custom configuration parameters for each component of the configuration or for the configuration as a whole. For instance, the front-end manager 520 of some embodiments provides users the ability to specify a desired software configuration (e.g., operating system, anti-virus protection, anti-spam protection, other applications, etc.) to operate in conjunction with the specified hardware configuration. In some embodiments, however, users are not allowed to specify particular software configurations or add software to an operational component through the user interface. Instead, once a component is operational, users can log in directly to the component to install software. In addition to the software configuration, some embodiments enable users to further specify configuration settings within the operating system of a virtual machine, such as entering network addresses for load balancers and firewalls or specifying hostnames for web servers.

The front-end manager 520 of some embodiments also specifies to a user a library of stored virtual server images that the user may deploy. In some embodiments, the images in this library include one or both of (1) public server images configured by any of the unrelated users of the hosting system and (2) private server images configured and stored by the user themselves. In addition to a library of such server images, the user interface of some embodiments provides users the capability to select any of the virtual machines running in the user's virtual machine configurations and store the virtual machine as a deployable virtual server image.

In some embodiments, the deployable virtual server image includes the information (e.g., the bits) describing a virtual machine that was up and running in the hardware grid at a particular time. This information is extracted from the hardware resource on which the virtual machine was running, compressed, and saved for later deployment. Both the extraction/storage process and the subsequent deployment process will be described in detail in later Sections. The interfaces for initiating both the save and deploy processes will be described as well.

As mentioned above, in addition to accessing the above functionality through a user interface, some embodiments enable a user to perform the same functions and access the same information directly through the API 512. Through a command line interface, the user can request information (e.g., the library of stored server images) which is provided by the API 512. The user can also specify components of a configuration, modify a configuration, specify configuration parameters, etc. directly through API 512. When the user accesses the functionality through the user interface, the application server 510 translates the user interface interactions into calls to the API 512 so that the same interaction with front-end provisioning manager 520 is achieved.

When a user has finished specifying the virtual server configuration through the user interface or API, some embodiments of the front-end manager 520 automatically provide the configuration to the hosting system's back-end logic, which is formed by the resource management system (RMS) module 530 and the system management module 540. In some embodiments, the resource management system module 530 receives a specified configuration from the front-end manager 520 and performs a logical assignment (i.e., identifies a mapping) of the components (e.g., virtual machines) within the configuration to the grid of hardware nodes 570. Similarly, when a user specifies a virtual server image to deploy, the resource management system module 530 maps this virtual server to a hardware node. This logical assignment is stored in the front-end data storage 550 in some embodiments so that it can be later accessed by the components of the hosting and storage system 500.

In some embodiments, the system management module 540 receives the logical assignment from the RMS module 2130 or from the data storage 550. The system management module 540 then automatically deploys the logical assignment across one or more of the physical hardware nodes 570. The system management module 540 includes a deployment scheduler that identifies particular hardware resources within grid 570 on which to deploy the various virtual machines in a received configuration. In some embodiments, a constraint optimization process is performed by the scheduler to determine the optimal hardware node for each virtual machine. The system management module of some embodiments will virtualize one component across multiple different hardware nodes when applicable (e.g., when a database server requires a large disk space allocation, it may be distributed across multiple nodes). This automatic deployment is described in further detail in U.S. patent application Ser. No. 12/421,597, filed Apr. 9, 2009 and titled "System and Method for Automated Allocation of Hosting Resources Controlled by Different Hypervisors", which is incorporated herein by reference.

As is also described in the above-mentioned application Ser. No. 12/421,597, the system management module includes various interfaces for directly accessing and communicating with (1) the hardware resources in grid 570, (2) hypervisors running on the hardware resources, and (3) virtual machines, including utility management modules, running on the hardware resources. Through these interfaces, the system management module 520 is able to pass virtual machine configurations and messages directly to the node and pass various instructions to the hypervisor, the utility management module, or the virtual machines running on a node. These instructions can include instructions to save an image of a virtual machine operating on a node or to retrieve an image from permanent storage for deployment on the node. The system management module 520 of some embodiments also monitors the usage of the virtual machine configurations and scales the configurations automatically in accordance with instructions from the users.

The system management module 540 automatically deploys the logical assignment for a virtual machine configuration across nodes in the hardware grid 570 by interfacing with hypervisors 525 operating on the nodes to which the virtual machines in the configuration are allocated. A hypervisor 525 manages the allocation of the resources of a particular hardware node to the various virtual machines running on the node. The hypervisor 525 of each node allows for a non-conflicting provisioning of a node's resources to two or more virtual machines and the system management module 540 allows several such nodes with multiple virtual machines to operate seamlessly together.

Also operating on many or all of the nodes is a utility management module, or utility virtual machine ("UVM") 535. As further described in the above-mentioned U.S. application Ser. No. 12/421,597, the UVM is a hosting and storage system provider instantiated virtual machine that runs on each node. As such, the UVM 535 receives a partitioned set of hardware resources (e.g., processing resources, memory, block/storage, etc.) of the node on which it operates.

In some embodiments, the utility management module 535 includes an operating system and set of application modules (described in detail with reference to FIGS. 6 and 15 below) or remotely stored scripts that produce various physical transformations on the particular machine or node on which the utility management module 535 is located. Some such physical transformations include customizing the resources allocated to a user virtual machine by the system management module 540, deploying a virtual machine from a saved server image, and extracting a running virtual machine for storage as a server image. The UVM 535 creates the user virtual machine by configuring the allocated resources with a set of software that performs the operations of the user virtual machine. In this manner, the utility management module 535 alters the disk volume, or block device (by changing bits on the physical sectors of the block device), allocated to the user virtual machine. The result of such alterations is to make operational a specific machine implementation that includes the user's virtual machine from an otherwise non-configured set of hardware resources. As mentioned, the specific machine implementation is either specified by the user through the user interface or is that of a server image from storage.

The back-end storage 560 of some embodiments includes a database that stores one or more operating system software images and/or software images for applications to run in conjunction with the operating system of a virtual machine configuration. That is, when a user specifies a new virtual server configuration or adds software to an existing virtual server configuration, in some embodiments the software for the virtual server configuration is retrieved from the back-end storage 560 for deployment on one of the hardware resources 570. For instance, a user might specify a particular operating system and several commonly used applications that are configured to optimally operate within the particular operating system. In some embodiments, the back-end storage 560 is a part of the storage network 590, which is described below.

As mentioned above, the hosting and storage system 500 of some embodiments also includes an image caching network 580 and a permanent storage network 590. Both the image caching network 580 and the permanent storage network 590 are used by some embodiments to store ready-to-deploy pre-configured server images. In some embodiments, a user of the hosting and storage system 500 may save their virtual servers to a storage cluster in the permanent storage network 590. The user may also deploy virtual servers, that are stored in the storage network 590 and/or the caching network 580 to the hardware grid 570.

The result of such a deployment is similar to the result of deploying a virtual server by selecting an operating system, software applications, etc. as described above. However, deploying a virtual server using a preconfigured server image in storage is faster in some embodiments and allows the user skip the process of selecting all of the desired software applications for the virtual server. A user may deploy, from the storage network 590 and/or caching network 580, server images that the user has previously stored (e.g., in a portion of a storage cluster on the network 590 allocated to the user). Some embodiments also allow preconfigured server images to be shared such that a user may deploy an image that was previously configured and stored by another user (either for free, or for a fee). Some embodiments present the user with options of preconfigured server images to use through the user interface generated by the front-end provisioning manager 520 or in request to a call to the API 512 for such information. Information regarding the server images (though not the actual server images themselves) is stored in the front-end data storage 550 in some embodiments, so that the front-end provisioning manager 520 may provide the user with the information regarding the images.

When a user selects an option through the user interface to save a particular virtual server that is running on a hardware resource in the grid 570, or sends a save command directly to the API 512 the UVM 535 on the hardware resource performs a series of operations (described in detail below in Section II) to extract the bits defining the virtual server from the disk volume to which the virtual server is allocated. Some embodiments extract the virtual server in units of a particular size (e.g., 1 Mb) and attaches error detection information (e.g., a calculated checksum) to each of the extracted units. These units are then passed from the UVM 535 through the caching network 580 to the storage network 590 for permanent storage. The caching network 580 thus acts as a conduit that segregates the storage network 590 from the hardware grid 570.

When a user selects an option in the user interface to deploy a virtual server from a server image stored in the caching network 580 and/or storage cluster 590, or sends a deployment command directly to the API 512, the system management module 540 designates a hardware resource on which the virtual server is to be deployed. This is performed in some embodiments by the deployment scheduler of the system management module 540, similar to when a user specifies the configuration for a server to deploy.

The UVM 535 on the hardware resource designated for the virtual server performs a series of operations (described in detail below in Section III) to retrieve the specified server image and deploy the virtual server on a disk volume of the hardware resource. Some embodiments first determine whether the server image is stored on one of the caching servers in the caching network 580. When the server image is not stored in any of the caching servers, the image is retrieved from the permanent storage network 590 and loaded into the caching network 580. Once the server image is available on the caching network 580, the image is retrieved by the UVM 535, which validates and loads the units onto the disk volume of the hardware resource in a unit-by-unit manner in some embodiments.

One of ordinary skill in the art will recognize that the caching network 580 may have any number of caching servers that communicate together, as will be described in further detail below in Section IV. Similarly, the permanent storage network 590 may have any number of storage clusters. In some embodiments, each storage cluster may itself have multiple storage devices for storing information electronically. The caching network 580 and the permanent storage network 590 are located at the same site in some embodiments or at different sites in other embodiments. In addition, each of the networks 580 and 590 may be split among different sites. For instance, each storage cluster could be at a different site in some embodiments.

Furthermore, it should be apparent to one of ordinary skill in the art that the grid of hardware resources 570 of some embodiments includes several distinct physical servers or clusters of servers located in a single server farm or distributed across multiple server farms in multiple disparate locations. Accordingly, the grid of hardware nodes 570 represents a cloud of computing resources shareable by multiple users. One of ordinary skill will appreciate that servers in other embodiments encompass any standalone computational element that can process requests. In some embodiments, the grid of resources contains an inter-communication pathway by which each node shares data with other nodes of the array and the hypervisor management module. Through this pathway, physically separated nodes can operate together as a single functional unit.

Additionally, as mentioned above, the various physical resources of each node can be logically partitioned and allocated to one or more virtual machines. For instance, each node in the grid of hardware resources 570 of some embodiments includes at least one physical processing unit, and through the various partitioning, allocation, and deployment operations performed by the system management module, hypervisor, and/or utility management module, each physical processing unit is able to conceptually operate as multiple separate processing units for two or more virtual machines of the node. Other resources of a node (e.g., memory, disk space, network bandwidth, etc.) can also be logically split to be shared by multiple users.

It should be apparent to one of ordinary skill in the art that the architecture depicted in FIG. 5 does not encompass all embodiments of the invention. In some embodiments, the architecture may include other various functional components that work in conjunction with or instead of the enumerated components illustrated in FIG. 5. Additionally, some embodiments define the system management module 540 as a separate functional device than each of the utility management modules on each node. However, it should be apparent to one of ordinary skill in the art that in some embodiments the functionality of the utility management modules is integrated into the functionality of the system management module and the below described functionality for the system management module and the utility management modules is encompassed within a single device or functional entity. As such, the system management module of some embodiments performs the virtual machine resource allocation, but also performs the partitioning, formatting, configuring, modifying of the resources and the extraction, checksum computation and validation, and deployment operations described below.

II. Saving an Operational Virtual Machine

As mentioned, some embodiments provide users the capability to save an image of a presently-operational virtual server to a permanent storage such that the virtual server can be easily deployed at a later date. In some embodiments, much of the functionality for saving such a virtual server that is running on a hardware node resides on the utility management module ("UVM") of that hardware node.

Figure 6:
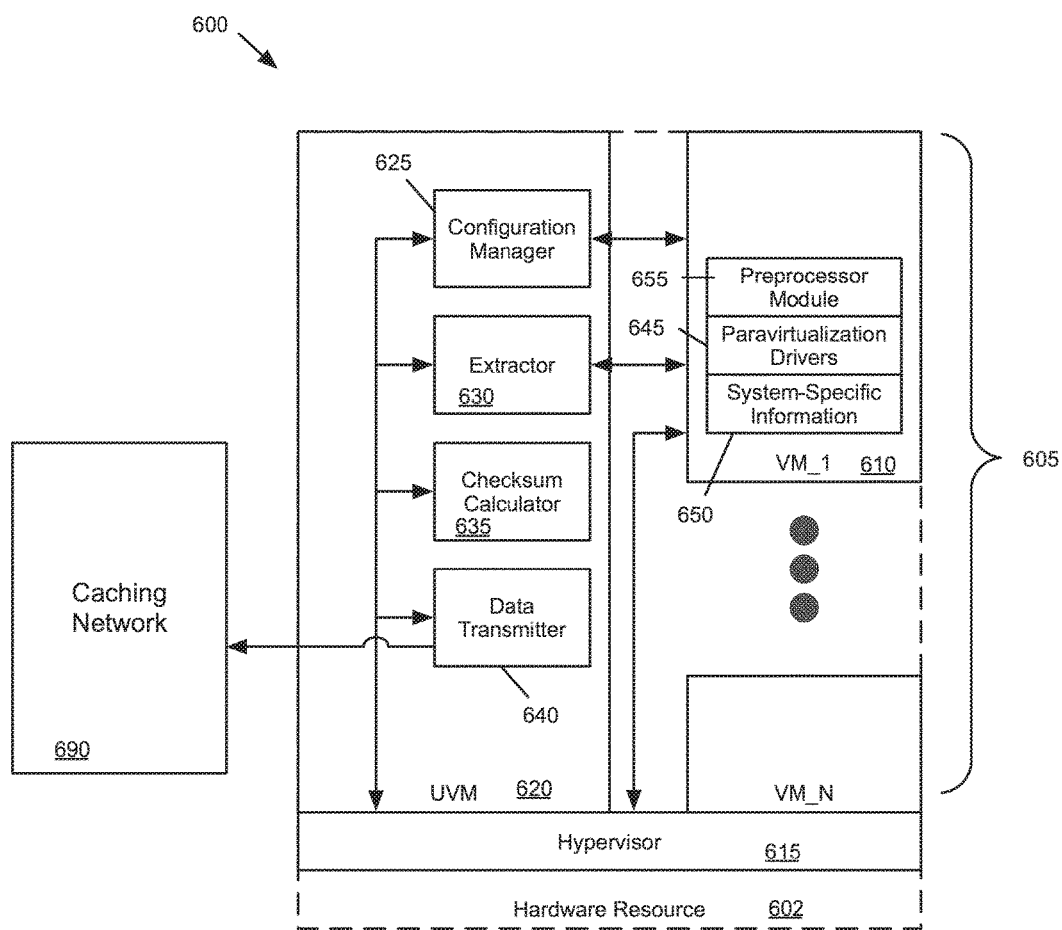
FIG. 6 illustrates the architecture of a node of some embodiments on which several virtual machines are operating.

FIG. 6 illustrates the architecture of a node 600 of some embodiments (in a grid such as grid 570) on which several virtual machines 605 are operating. The operating virtual machines include a particular virtual machine 610. The node includes hardware resources 602 (e.g., disk space, memory, processing, etc.). Also operating on the node 600 is a hypervisor 615 and a utility management module 620.

The hypervisor 615 manages the access of the virtual machines 605 on the node 600 to the underlying hardware resources 602 of the node. The hypervisor 615 manages the hardware resources of the node 600 by partitioning a set of hardware resources to each virtual machine 605 operating on the particular node. In some embodiments, the hypervisor 615 provides exclusive use of a partitioned set of the hardware resources to a particular virtual machine. For instance, virtual machine 610 has exclusive use of a partitioned set of hardware resources of node 600. In this manner, some embodiments guarantee that a specified amount of hardware resources is always available to each virtual machine.

This virtualization or mapping of the hardware resources by the hypervisor 615 occurs transparently to the operations of the virtual machine causing each virtual machine 605 to operate as though it is using a dedicated set of resources. Such transparent virtualization or mapping of resources prevents one virtual machine 605 from accessing or interfering with the resources allocated to another of the virtual machines 605. For instance, virtual machine 610 is prevented from accessing the file system or memory of any of the other virtual machines 605 operating on node 600.

The utility management module 620 is itself a virtual machine with an operating system that executes software processes running within the UVM's own virtualized set of the hardware resources 602 of node 600 in some embodiments. The software processes executed by the UVM in some embodiments are defined by a set of scripts located in a remote file system or in the file system of the UVM. Through various control and provisioning messages, an external module (e.g., the system management module 540 of FIG. 5, described above) directs the UVM to execute one or more of the scripts at specified instances in time. For instance, a system management module would identify one or more scripts for the UVM 620 to execute in order to extract and save an operating virtual machine such as virtual machine 610.

Utility management module 620 includes a configuration manager 625, an extractor 630, a checksum calculator 635, and a data transmitter 640. The configuration manager 625 of some embodiments controls the configuration of the hardware resources 602 allocated to each virtual machine. In some embodiments, the configuration manager also controls the operation of the other modules within the UVM 620. That is, the configuration manager 625 identifies when a user has requested that one of the virtual machines 605 on the node 600 be saved for later deployment, and identifies the scripts to be performed by the UVM 620 in order to perform this save operation.

The configuration manager 625 also communicates with the virtual machines 605 in some embodiments. For instance, the configuration manager performs formatting and configuration of the virtual machines 605 in some embodiments. In other embodiments, as described and illustrated in U.S. patent application Ser. No. 12/421,597, filed Apr. 9, 2009 and titled "System and Method for Automated Allocation of Hosting Resources Controlled by Different Hypervisors", which is incorporated herein by reference, the utility management module includes numerous separate modules that communicate with the virtual machines in order to format and configure the virtual machines. As described in Section III below, the configuration manager of some embodiments performs the function of laying down a previously-saved virtual machine on an allocated disk volume of the hardware node.

The extractor 630 performs the extraction of the bits of a virtual machine from the disk volume (a portion of the hard disk resources of the node 600) on which the virtual machine is running in order to save an image of the virtual machine. In some embodiments, the bits are extracted in regularly sized units (e.g., 1 Mb). The checksum calculator 635 calculates checksums for each of the extracted units and appends the checksum to the unit. The data transmitter 640 sends the extracted data and checksum to caching network 690. Further detail regarding the operation of these modules will be described below with respect to FIGS. 7-8. The caching network 690 is comparable to caching network 580 of FIG. 5, described above in Section I. Further details regarding the caching networks of some embodiments are described below in Section IV.

As shown in FIG. 6, virtual machine 610 includes drivers 645 (e.g., disk and network drivers), system-specific information 650, and preparation module 655. The virtual machine 610 also includes, of course, an operating system, software applications, etc., which are not shown independently in this figure. In some embodiments, as shown in the figure, the drivers are paravirtualization drivers. Paravirtualization drivers are drivers that are installed on a virtual machine to enable the virtual machine to properly interface with the hypervisor. Because the hardware resources 602 are accessed by virtual machine 610 through hypervisor 615, the correct paravirtualization drivers 645 must be installed on the virtual machine.

The system-specific information 650 is information about the particular instantiation of the virtual machine which is deleted before saving a server image for the virtual machine. In some embodiments, the system-specific information varies based on the operating system of the virtual machine. For instance, in some embodiments, when the virtual machine is a server running the Microsoft® Windows® operating system, the system-specific information includes the Windows Security Identifier (SID), network configurations, and desktop and administrator profiles. In some embodiments, when the virtual machine is a server running the Linux® operating system, the system-specific information includes any unique identifiers (e.g., a RHEL registration ID, etc.), log files, and history files. Different embodiments will include different information, both the above-listed information as well as other information that is not listed, in the system-specific information that is removed from a virtual server before it is saved as a server image.

Preparation module 655 is a module on the virtual machine 610 that, when launched, prepares the operational virtual machine so that it can be saved as a server image for later deployment. The preparation module 655 runs a set of scripts that remove the drivers 645 and the system-specific information 650 in some embodiments. The set of scripts also performs other processes in some embodiments such as resetting administrator or root passwords, etc. In some embodiments, the preparation module 655 is launched when user instructions are received by the virtual machine 610 to launch the module. These user instructions are sent from an external module such as system management module 540. In some embodiments, the system management module communicates with the virtual machine 610 through the utility management module 620 in order to give the user instructions to launch the preparation module 610.

Figure 7:
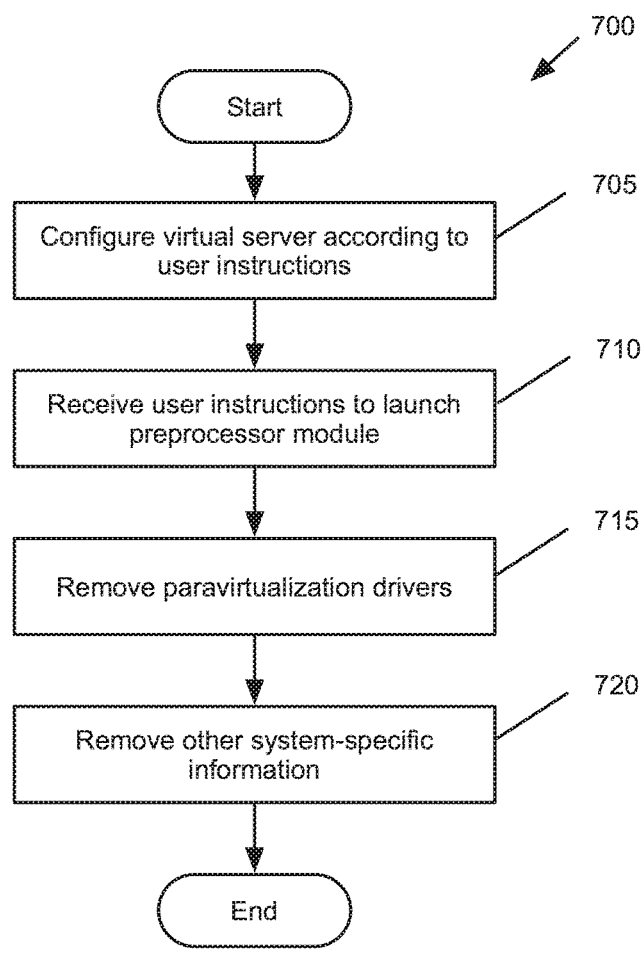
FIG. 7 conceptually illustrates a process of some embodiments for preparing an operational virtual server so that the virtual server can be saved as a server image for later deployment.

FIG. 7 conceptually illustrates a process 700 of some embodiments for preparing an operational virtual server (e.g., virtual machine 610) so that the virtual server can be saved as a server image for later deployment. In some embodiments, process 700 is performed on the virtual machine that is being prepared to be saved.

Figure 8:
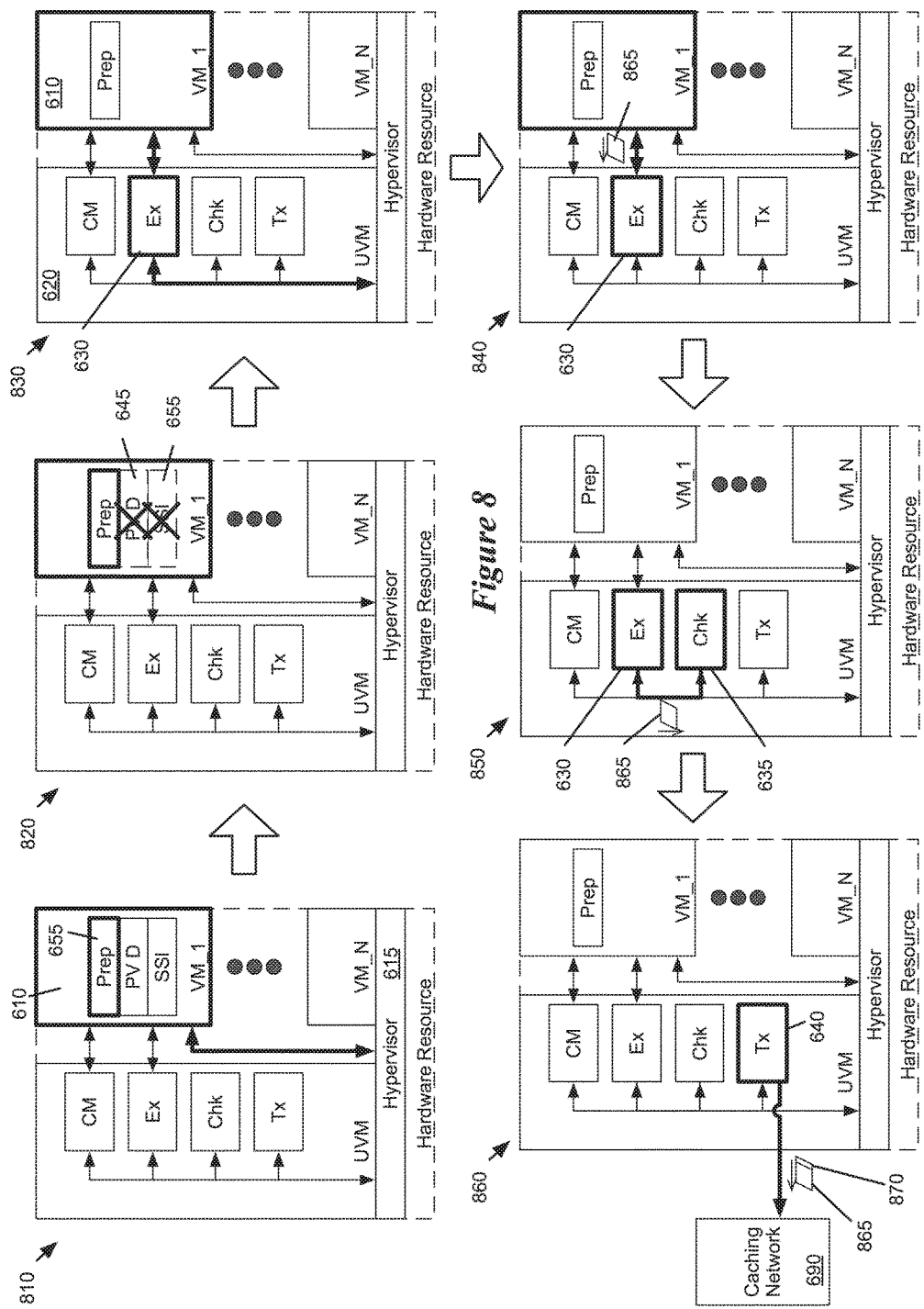
FIG. 8 illustrates the capture of the data of a virtual machine by a utility management module so that virtual machine can be saved is a server image.

Portions of FIG. 7 will be described by reference to portions of FIG. 8. FIG. 8 illustrates the capture of the data of virtual machine 610 by utility management module 620 so that virtual machine 610 can be saved is a server image. Specifically, FIG. 8 illustrates, in six stages 810-860, the launch of preparation module 655, the removal of paravirtualization drivers 645 and system-specific information 650, the extraction of a unit of data from virtual machine 610, the calculation of a checksum for the extracted unit of data, and the transmission of the extracted unit and checksum to caching network 690.

As shown in FIG. 7, process 700 begins by configuring (at 705) a virtual server according to user instructions. User instructions to configure a virtual server are sent from an external module such as system management module 540 to the utility management module on the node hosting the virtual server being configured. The system management module, in some embodiments, receives these instructions from front-end architecture such as front-end provisioning manager 520 and RMS module 530, which in turn receive the user instructions through a network based on the user's interactions with a user interface (e.g., graphical user interface, command line, etc.). The configuration manager of the utility management module then instructs the virtual server regarding the modifications. In some embodiments, though, the system management module (or equivalent external module) directly accesses the virtual server being configured, bypassing the utility management module. In some embodiments, the external module interfaces with the hypervisor to log into the virtual server. In some other embodiments, the user logs in directly to the virtual server in order to configure the server.

The user instructions to configure the virtual server could include the initial deployment of the server (selection of operating system and software applications, etc.), installation of any files or software applications, security or other updates, modifications to the profiles on the server, changing settings (e.g., firewall settings), etc.

Once the virtual server is in the configuration desired by the user, process 700 receives (at 710) user instructions to launch the preprocessor module on the virtual server. As illustrated in stage 810 of FIG. 8, the preprocessor module 655 is already on the virtual server 610. In some embodiments, all virtual servers in a hosting system such as system 500 are initially deployed with a preprocessor module. In other embodiments, only certain virtual servers are deployed with such a module. For instance, some embodiments only allow virtual servers having a particular size (i.e., disk volume size) to be saved as server images, and thus only these servers are deployed with the preprocessor module. Some embodiments offer several sizes of virtual servers to users, and only the smallest size may be saved as a server image. This allows any saved server image to be deployed at a later date to any size of server (e.g., a virtual server from a 20 Gb disk volume could later be deployed onto a 100 Gb disk volume, but not necessarily vice versa). In yet other systems, the virtual servers are never deployed with the preprocessor module initially, and a user initiates both the installation and launch of the module.

As illustrated in stage 810, the instructions to launch the preprocessor module 655 are received through the hypervisor 615 in some embodiments. This illustrates the situation in which the external system management module interfaces with the hypervisor to log directly into the virtual server and issues the commands to launch the preprocessor module. In this situation, the system management module acts like a remote agent on the virtual server, and the hypervisor is used as an interface to talk to the virtual server. In some other embodiments, the user logs directly into the virtual server in order to launch the preprocessor module.

When the preprocessor module is launched, process 700 removes (at 715) the paravirtualization drivers. In some embodiments, the preprocessor module uninstalls the drivers and then deletes the driver files from the virtual machine. When the server is redeployed from a later image, the removed drivers (or newer, updated drivers) will be reinstalled.

The process also removes (at 720) system-specific information from the virtual server. As described above, the system-specific information that is removed may vary depending on the operating system running on the virtual server. When the operating system is Microsoft® Windows®, the information that is removed in some embodiments includes the Windows Security Identifier, network configurations (e.g., IP address), and desktop and administrator profiles. When the operating system is Linux®, the information that is removed in some embodiments includes any unique identifiers (e.g., a RHEL registration ID), etc.), log files, and history files. Different embodiments will remove different information, both the above-listed information as well as other information that is not listed here. For other operating systems, different system-specific information will be removed. Although the removal of the paravirtualization drivers is illustrated in FIG. 7 as being performed before the removal of the system-specific information, some embodiments remove the system-specific information first, or intermix the removal of the drivers and the system-specific information (i.e., perform both of these tasks at the same time). The process then ends.

FIG. 8 illustrates (at stage 820) the removal of the paravirtualization drivers 645 and system-specific information 650. When the preparation module 645 is launched on virtual machine 610, the preparation module removes the drivers and the system-specific information from the virtual machine. The later stages of FIG. 8 illustrate that this information is no longer present on the virtual machine. The virtual machine is, of course, no longer an operational virtual machine at this point, but is instead in a state from which it can be saved as a server image.

Figure 9:
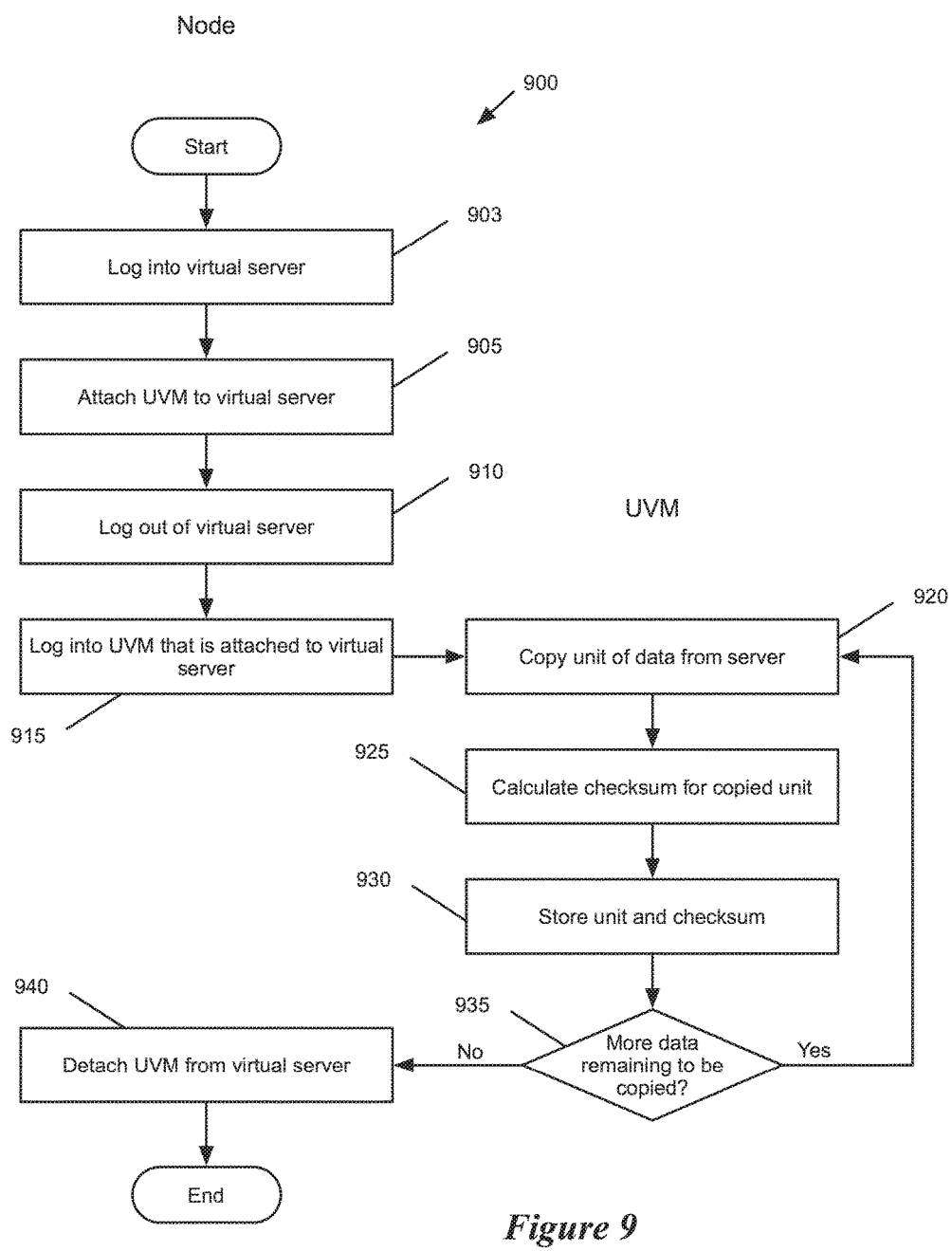
FIG. 9 illustrates a process of some embodiments that captures virtual server data from the disk volume of a hardware node.

FIG. 9 illustrates a process 900 of some embodiments that captures the virtual server data from the disk volume of the hardware node. In some embodiments, process 900 is performed after process 700 has prepared the virtual server for the capture process. As illustrated, portions of process 900 are performed at the level of the hardware node, while portions of the process are performed by the utility management module ("UVM"). Process 900 is described in part by reference to the later stages of FIG. 8, which illustrate the extraction of the virtual machine data for virtual machine 610 off the disk volume of the hardware node 600.

As shown, process 900 begins (at 903) by logging into the virtual server. The process then attaches (at 905) the utility management module to the virtual server. In some embodiments, an external module such as the system management module logs into the hardware node directly. Through a command-line interface for the node, the system management module issues commands to have the node log into the virtual server and then to have the node attach the UVM to the virtual server. In some embodiments, attaching the UVM to the virtual server entails attaching the UVM to the disk volume on which the virtual server data is stored. Stage 830 of FIG. 8 illustrates the attachment of the UVM 620 (specifically, extractor 630) to the virtual server 610.

In some embodiments, the process 900 is performed when a user issues a command through a graphical user interface or directly through an application programming interface to save a server. For instance, the front-end modules of some embodiments present a graphical user interface to a user that lists all of the user's virtual servers on a hosting system. The user can then select one of the servers and select an option to save the selected server. This instruction is sent through the front-end architecture to the system management module, which issues instructions to the hardware node on which the selected virtual server is running. In some embodiments, the user interface provides an indication as to which servers are in a savable state (i.e., on which virtual servers the preprocessor module has already run). In other embodiments, a user selection to save a virtual server causes the preprocessor module to run and immediately afterwards saves the virtual server (i.e., the performance of processes 700 and 900).

Figure 10:
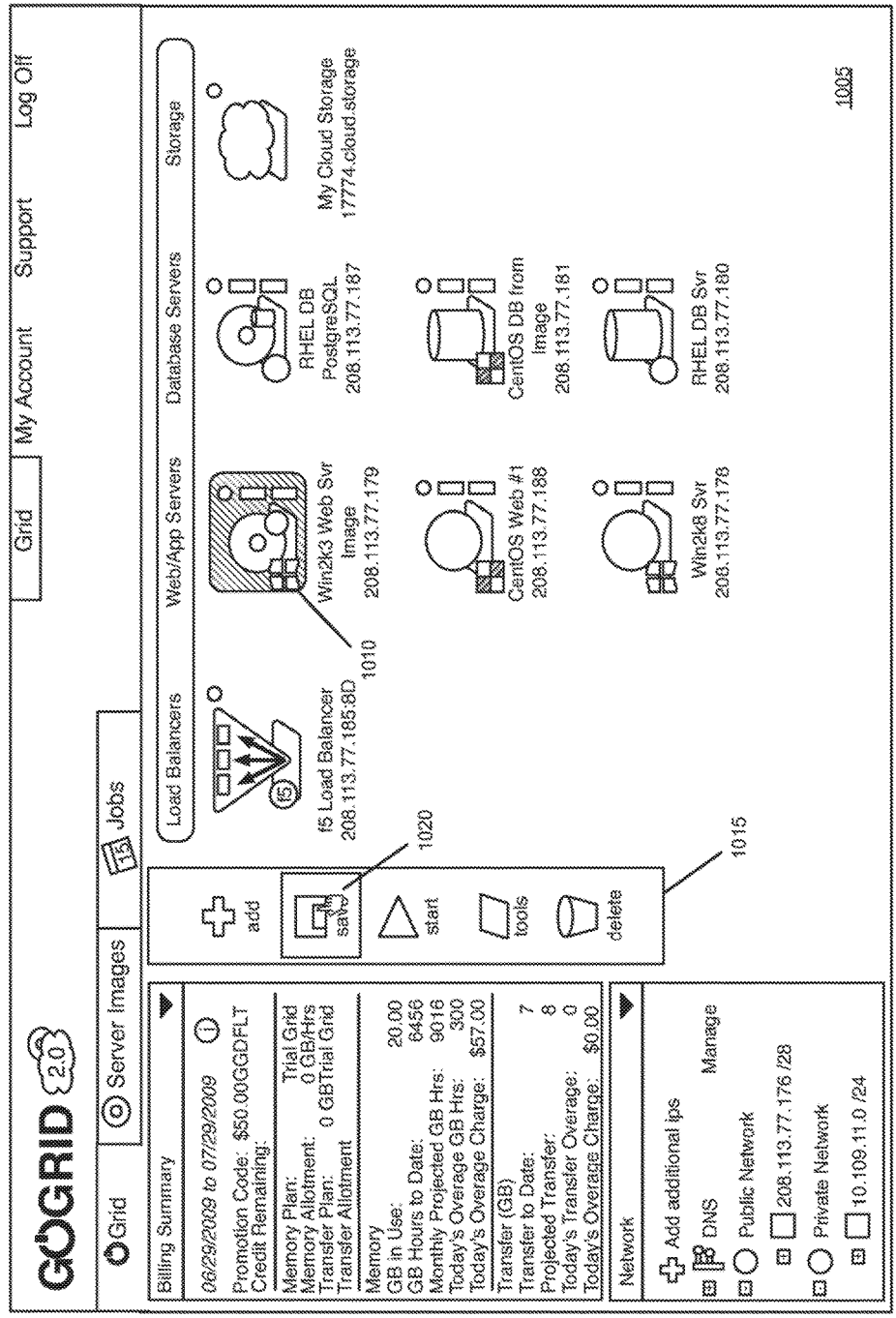
FIGS. 10 and 11 illustrate an example of a user interface that allows a user to save an image of a virtual server.

FIG. 10 illustrates an example of such a user interface 1000 that allows a user to save an image of a virtual server. As illustrated, the user interface 1000 includes a display area 1005 for displaying a user's various operational servers in a hosting and storage system. The display area 1005 includes icons for a load balancer, web/application servers, database servers, and the user's stored data in cloud storage. As shown, a particular web server icon 1010 is currently selected. The user interface also includes a set of options 1015, which a user can use to add a server, save a server, start a server, etc. As shown, the user is currently selecting the save icon 1020 in order to save the selected server 1010.

Figure 11:
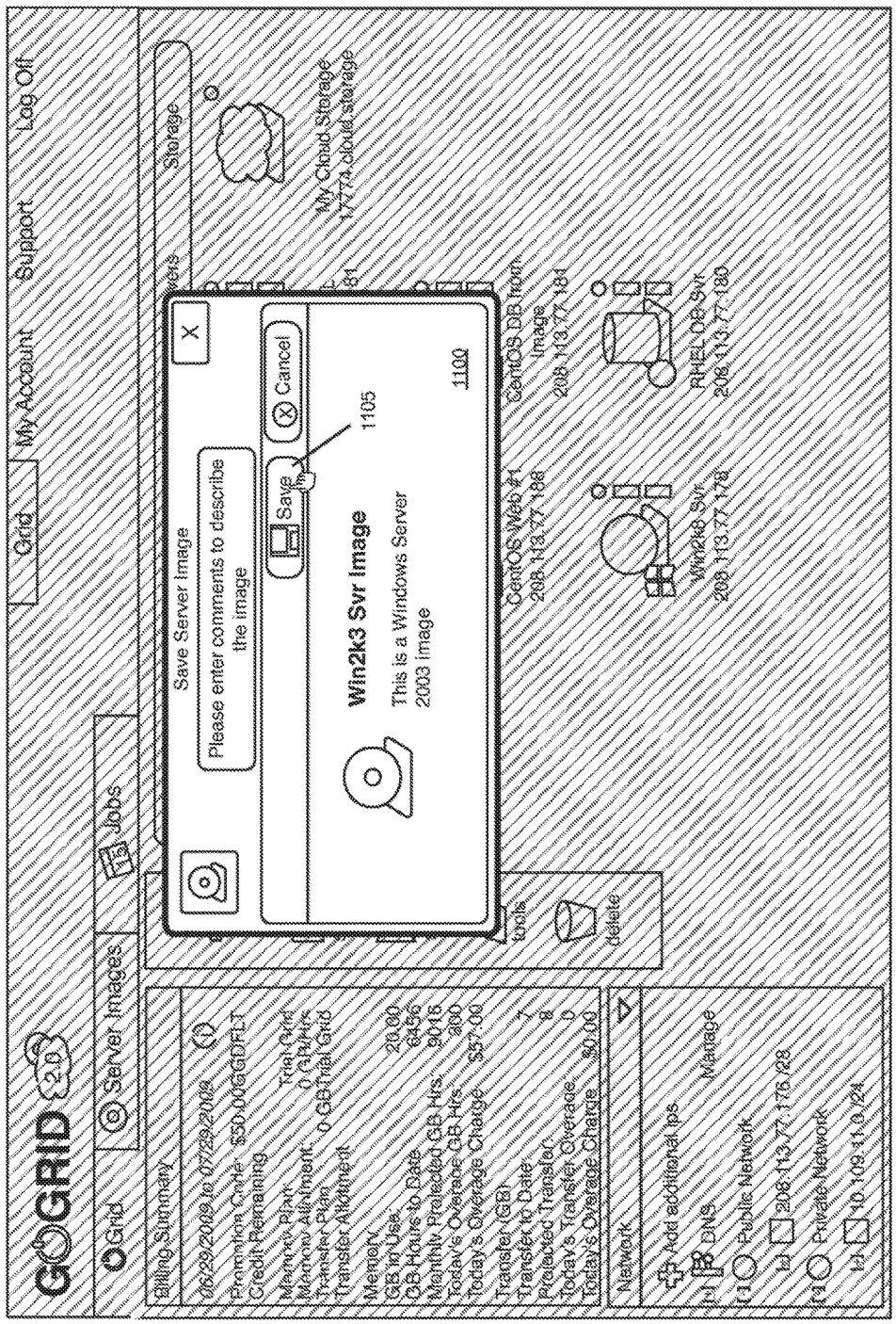

As shown in FIG. 11, selecting the save icon 1020 brings up a dialog box 1100 in which a user can enter a name for the server image that will be created and a description of the server image. Once the save button 1105 is selected by the user, the process 900 begins in some embodiments.

After attaching the UVM to the virtual server, the process logs the node out (at 910) of the virtual server. In some embodiments, the system management module is only logged into the node when absolutely necessary to perform certain operations, such as attaching the UVM to the virtual server being saved. This prevents any problems from low-level disk operations (e.g., a shared memory problem, a hypervisor-related bug, etc.) from crashing the entire node. If the entire node were to crash, it could bring down any virtual machines running on the node, and thus the process of saving a first virtual server of a first user could negatively affect a second virtual server belonging to a second user.

After logging out of the virtual server, the process logs into (at 915) the UVM that is now attached to the virtual server to be saved. This enables commands to be issued to the UVM to extract and transmit the virtual server data. As the UVM is attached to the virtual server, it has access to the disk volume for the virtual server and can easily copy that data.

Next, the process copies (at 920) a unit of data from the virtual server. In some embodiments, the UVM reads a unit of data from the disk volume of the virtual server into the memory of the UVM. The units are different sizes in different embodiments (e.g., 1 Mb, 5 Mb, etc.). As illustrated in stage 840 of FIG. 8, in some embodiments an extractor module of the UVM copies the unit of data into the UVM memory. Stage 840 illustrates a unit of virtual server data 865 being transferred to the extractor module 630.

Process 900 then calculates (at 925) a checksum for the copied unit of virtual server data. This checksum can be any standard checksum in some embodiments (e.g., hash algorithms such as MD5, CRCs, etc.). Different embodiments of the invention use different checksums. The checksums of some embodiments are used to verify the integrity of the data when the server image is deployed at a later date. Because each unit has its own checksum, errors in the image data can be detected before the entire image is loaded on a new disk volume, thereby saving time. As illustrated in stage 850 of FIG. 8, in some embodiments the unit of data is passed from the extractor module 630 to the checksum calculator 635, which then calculates the checksum.

The process next stores (at 930) the unit of data and its accompanying checksum. As described above, to store the data the UVM transmits the data to a permanent storage network (e.g., cloud storage clusters) through a caching network in some embodiments. Other embodiments bypass the caching network and send the virtual server image data directly to the permanent storage network. Yet other embodiments provide other storage mechanisms—for instance, sending the server image data directly to the user so that the user has possession of the image and can deploy the image anywhere they so desire.

FIG. 8 illustrates the example in which the data is transmitted from the UVM 620 to the caching network 690. In some such embodiments, the caching network acts as a conduit through which the data is transported before being stored in the permanent storage network. The operation of the caching network and permanent storage will be described in greater detail below in Section IV. Stage 860 illustrates data transmitter 640 of the UVM 620 transmitting the data unit 865 along with a checksum 870 to caching network 690.

Process 900 determines (at 935) whether any more virtual server data remains to be copied. When more virtual server data remains, the process proceeds to 920 to copy another unit of data. The UVM will copy data units, calculate checksums, and store the data until all of the server data is copied. When all of the data is copied, the process proceeds to 940, described below. FIG. 8 only illustrates the copying, checksum calculation, and transmission of one unit of data. One of ordinary skill in the art will recognize that stages 840-860 will repeat numerous times until all of the server data is captured.

Process 900 next, at the node level, detaches (at 940) the UVM from the virtual server. As the save process is complete (at least on the hardware node side), the system management module no longer needs to be logged into the hardware node at all, and thus can also log out from the node completely. In some embodiments, before the UVM is detached from the virtual server, the disk volume allocated to the virtual server is deallocated and overwritten with random data. This prevents a future user of the disk space from extracting any data from the previous user that could potentially be sensitive and/or confidential.

Figure 12:
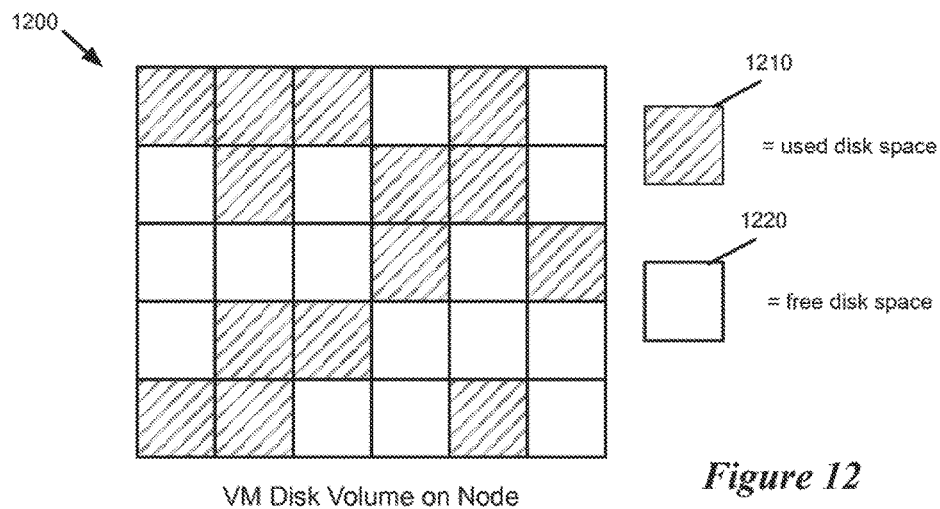
FIG. 12 illustrates a disk volume that is allocated to a virtual server.

In some embodiments, only the bits on the disk volume that are actually in use are extracted during the server saving process. That is, if the virtual server is allocated a 20 Gb disk volume, but only 11 Gb of this disk space is used, then only those 11 Gb will be extracted. FIG. 12 illustrates a disk volume 1200 that is allocated to a virtual server (e.g., virtual machine 610). The black squares indicate used disk space 1210 for the server while the white squares indicate free (unused) disk space 1220 on the disk volume 1200.

Figure 13:
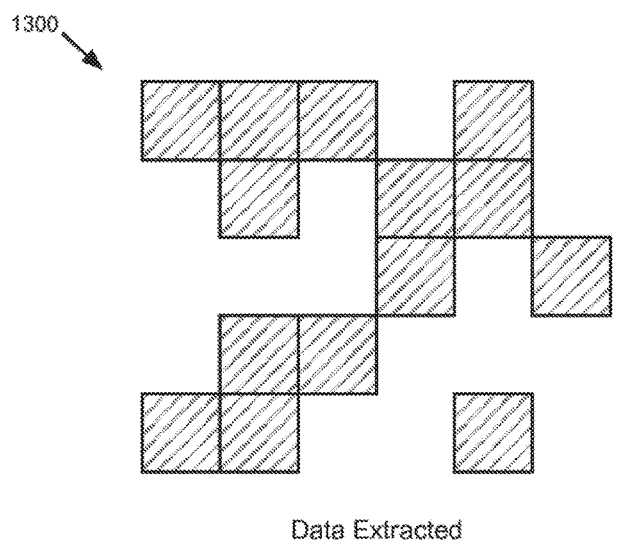
FIG. 13 illustrates the data that is extracted from the disk volume of FIG. 12 by a process such as illustrated in FIG. 9.
Figure 14:
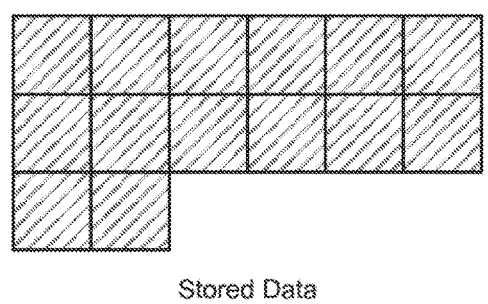
FIG. 14 illustrates stored data for the virtual server that was on the disk volume of FIG. 12.

FIG. 13 illustrates the data that is extracted from disk volume 1200 by a process such as process 900. This extracted data 1300 is the data from the used disk space 1210 on disk volume 1200. The extracted data 1300 is the data that is transmitted to the caching network by the utility management module in some embodiments. FIG. 14 illustrates stored data 1400 for the virtual server that was on disk volume 1200. The stored data 1400 includes all of the extracted data 1300, but it is now taking up less space than before because it is stored together.

In some embodiments, when the server image is stored (e.g., in the permanent storage network), it is stored in a compressed format. In some embodiments, this compression takes place at the UVM (e.g., on a unit-by-unit basis by the transmitter of the UVM). In other embodiments, the compression takes place in the caching network or the permanent storage network. For instance, some embodiments transmit each extracted unit through the caching network to the permanent storage network. Once the entire server image is on the permanent storage network, the server image can be compressed and then stored. Different embodiments use different compression techniques (e.g., zip compression, etc.). The server image is stored as a single file in some embodiments. Such a file can be easily exported, copied, saved to a portable storage such as a flash drive, etc.

III. Deploying a Server Image onto a Hosting Network

Some embodiments provide users the capability to deploy a saved server image on a hardware node of a hosting network such as network 500. Combined with the functionality described in Section II above, this enables users to save an operational virtual server having a particular configuration and then, at a later date (e.g., 6 months later), deploy one or more new virtual servers having the same configuration without having to go through the work of setting up the exact configuration desired.

Figure 15:
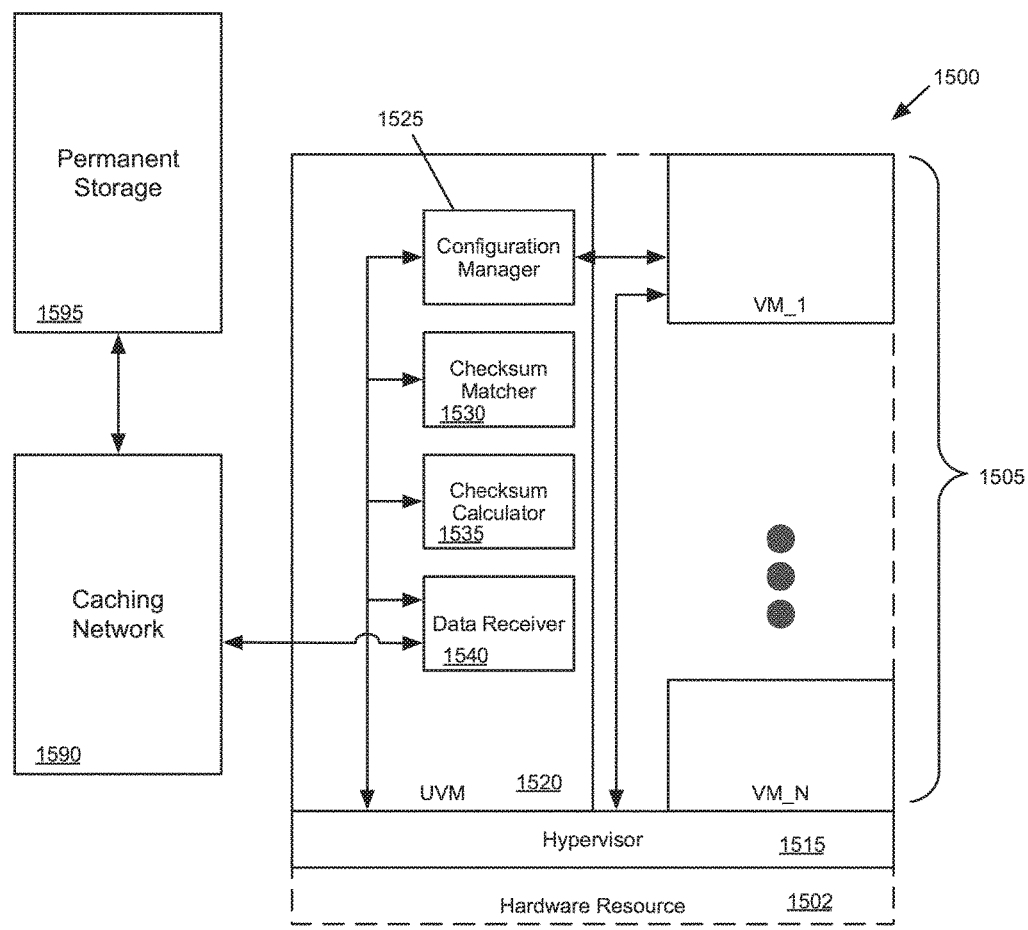
FIG. 15 illustrates the architecture of a node of some embodiments on which several virtual machines 1505 are operating.

FIG. 15 illustrates the architecture of a node 1500 of some embodiments (in a grid such as grid 570) on which several virtual machines 1505 are operating. The node 1500 includes hardware resources 1502 (e.g., disk space, memory, processing, etc.). Also operating on the node 1500 is a hypervisor 1515 and a utility management module 1520.

The hypervisor 1515 manages the access of the virtual machines 1505 on the node 1500 to the underlying hardware resources 1502 of the node. As described above by reference to hypervisor 615, the hypervisor 1515 manages the hardware resources of the node 1500 by partitioning a set of hardware resources to each virtual machine 1505 operating on the particular node. One of ordinary skill in the art will recognize that hypervisor 1515 may include all of the functionality attributed to hypervisor 615. It is possible for a server image of a virtual machine that was operating on a particular node to be later deployed onto the very same node. In some embodiments, though, this would be purely coincidental, based on scheduling decisions made by the system management module of the hosting network.

The utility management module 1520 includes a configuration manager 1525, a checksum matcher 1530, a checksum calculator 1535, and a data receiver 1540. The utility management module 1520 is itself a virtual machine with an operating system that executes software processes running within the UVM's own virtualized set of the hardware resources 1502 of node 1500 in some embodiments. In some embodiments, the utility management module 1520 includes all of the functionality of the utility management module 620 of FIG. 6. Thus, while different modules within the UVM 1520 are shown in FIG. 15, the UVM 1520 may also include an extractor and data transmitter. Similarly, the UVM 620 of some embodiments may include all of the modules illustrated in FIG. 15, including the checksum matcher 1530 and the data receiver 1540.

The configuration manager 1525 of some embodiments controls the operation of the other modules within the UVM 1520. That is, the configuration manager 1525 identifies when a user has requested that a virtual machine be deployed on the node, and identifies the scripts to be performed by the UVM 1520 in order to perform the deployment operation.

The configuration manager 1525 also communicates with the virtual machines 1505 on the node 1500 in some embodiments. For instance, the configuration manager performs formatting and configuration of the virtual machines 1505 in some embodiments. In other embodiments, as described and illustrated in U.S. patent application Ser. No. 12/421,597, filed Apr. 9, 2009 and titled "System and Method for Automated Allocation of Hosting Resources Controlled by Different Hypervisors", which is incorporated herein by reference, the utility management module includes numerous separate modules that communicate with the virtual machines in order to format and configure the virtual machines.

The configuration manager 1525 of some embodiments also performs the deployment of a server image by laying down the bits in the stored server image on an allocated disk volume of node 1500. That is, the configuration manager accesses the disk volume and modifies the bits in the disk volume to match those received by the UVM for the server image.

The data receiver 1540 receives server image data one unit at a time from an external source. As illustrated in FIG. 15, data receiver 1540 communicates with a caching network 1590. Caching network 1590 is also in communication with a permanent storage network 1595, on which server images are stored in some embodiments. In some embodiments, the data receiver 1540 acts passively to receive the image data as the caching network 1590 streams the units of data (i.e., one command is sent asking the caching network for the server image). In other embodiments, the data receiver actively retrieves each unit from the caching network (i.e., commands are sent to the caching network as each unit is processed by the UVM 1520).

In some embodiments, the units of data received from the caching network 1590 each include numerous sub-units, each of which have a checksum. The checksum calculator 1535 and checksum matcher 1530 work together in some embodiments to verify the checksums of incoming units or sub-units of server image data. Each unit or sub-unit has an attached checksum (as described above in Section II), and the checksum calculator recalculates this checksum based on the received data. The checksum matcher 1530 compares the checksum that was received along with the server image data with the checksum calculated for the received data. When the checksums match, the data can be passed to the configuration manager to be laid down on the disk volume. When the checksums do not match, this means that the data was corrupted at some point (e.g., in the caching network), and must be re-retrieved from permanent storage.

Figure 16:
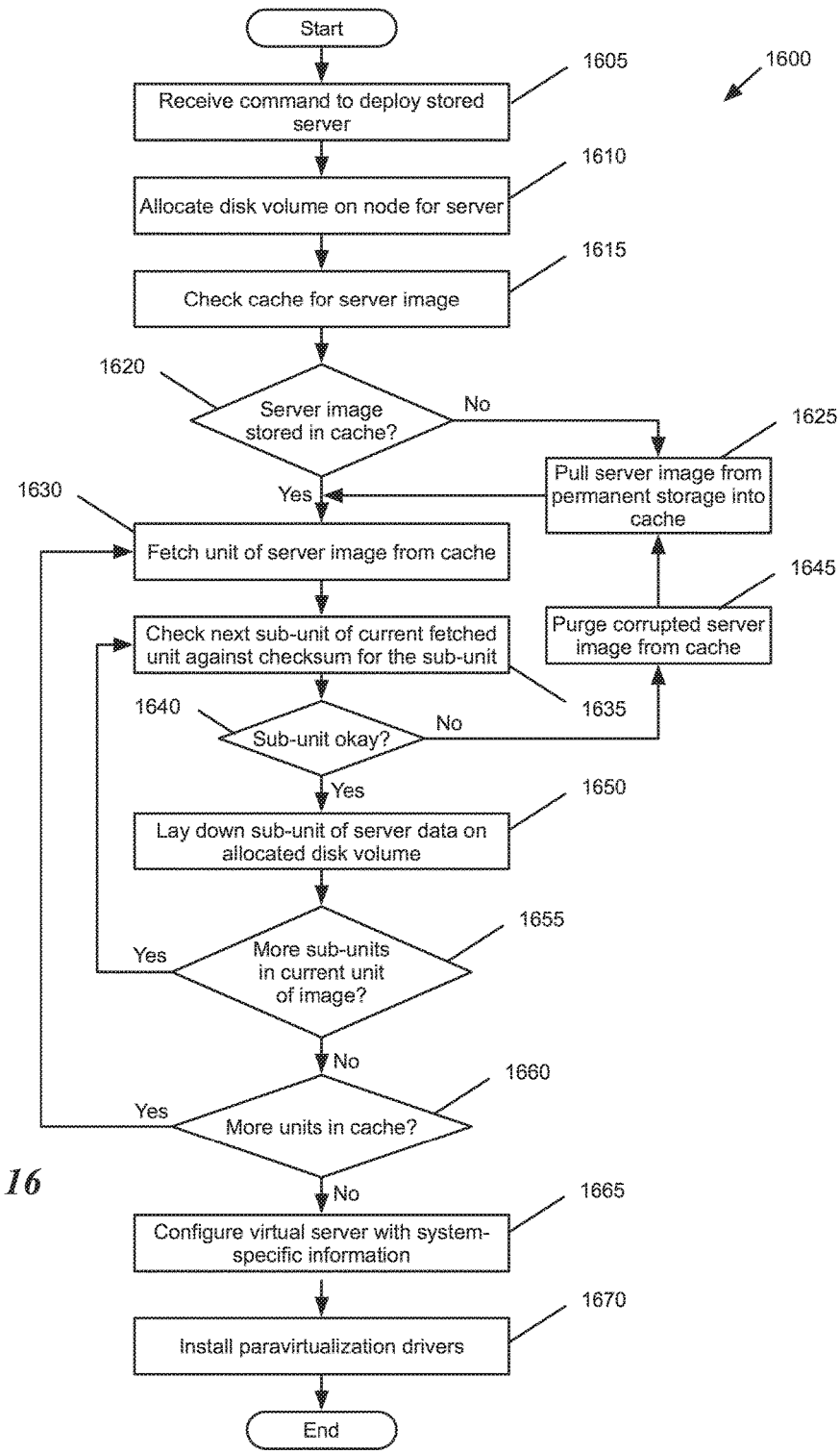
FIG. 16 conceptually illustrates a process for deploying a virtual machine based on a stored server image.

FIG. 16 conceptually illustrates a process 1600 for deploying a virtual machine based on a stored server image. In some embodiments, some or all of process 1600 is performed by a utility management module (e.g., UVM 1520) on a hardware node on which the server image is to be deployed.

Figure 17A:
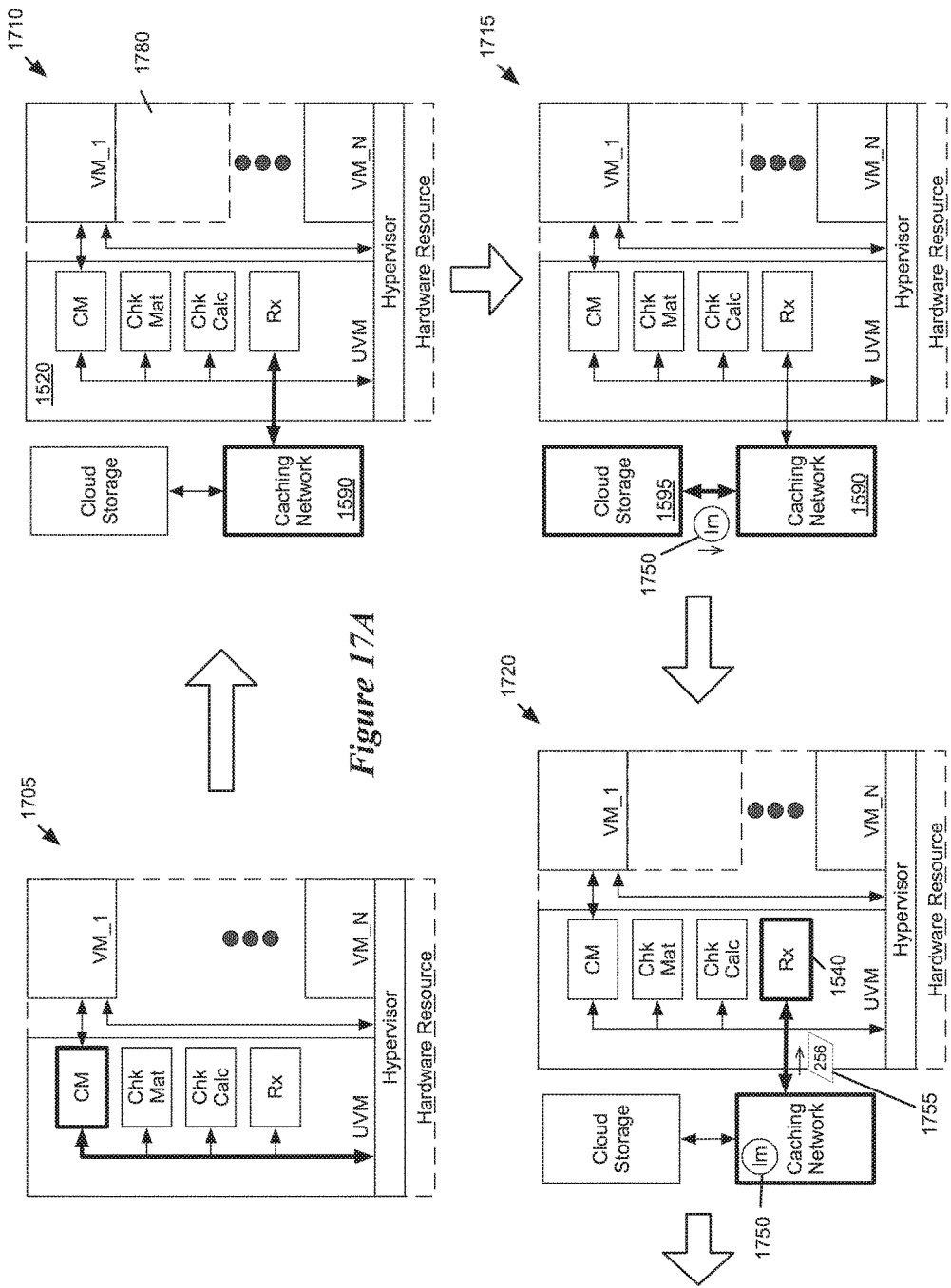
FIGS. 17A-B illustrate the retrieval of a server image from a permanent storage network and the deployment of the server image as a virtual machine on a node.
Figure 17B:
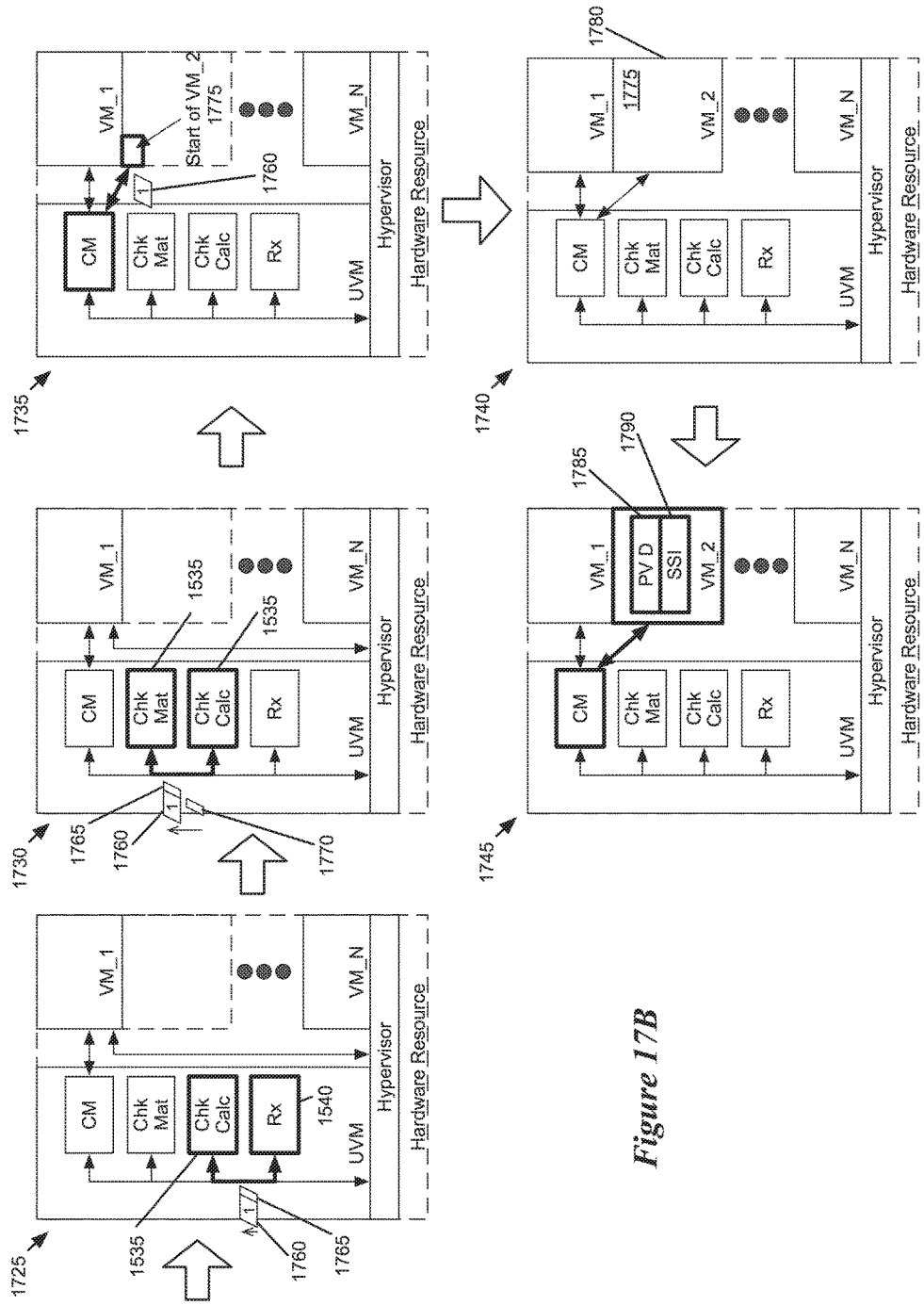

Portions of FIG. 16 will be described by reference to FIGS. 17A and 17B. FIG. 17 illustrates the retrieval of a server image from permanent storage network 1595 and the deployment of the server image as a virtual machine on node 1500. Specifically, FIG. 17A illustrates, in four stages 1705-1720, the receipt of instructions to retrieve and deploy a particular server image, the transmission of instructions to the caching network 1590 asking for the particular server image, the transfer to the caching network 1590 from permanent storage 1595, and the transfer of a unit of data from the caching network 1590 to the UVM 1520. FIG. 17B illustrates the transfer of a sub-unit of data with a checksum to the checksum calculator, the transfer of the sub-unit and received checksum along with a newly calculated checksum to the checksum matcher, the laying down of the sub-unit of data on an allocated disk volume, the completely laid down virtual machine, and the installation of paravirtualization drivers and system-specific information on the newly deployed virtual machine.

As shown in FIG. 16, process 1600 begins by receiving (at 1605) a command to deploy a particular stored server. In some embodiments, this command is received from an external module such as system management module 540. For instance, a system management module, in some embodiments, receives these instructions from front-end architecture such as front-end provisioning manager 520 and RMS module 530, which in turn receive the user instructions through a network based on a user's interactions with a user interface (e.g., graphical user interface, command line, etc.). The scheduler of the system management module then determines on which hardware node the new virtual server should be deployed. The instructions are then passed to the UVM for the particular hardware node so that the UVM can handle the retrieval and deployment of the desired virtual server.

Figure 18:
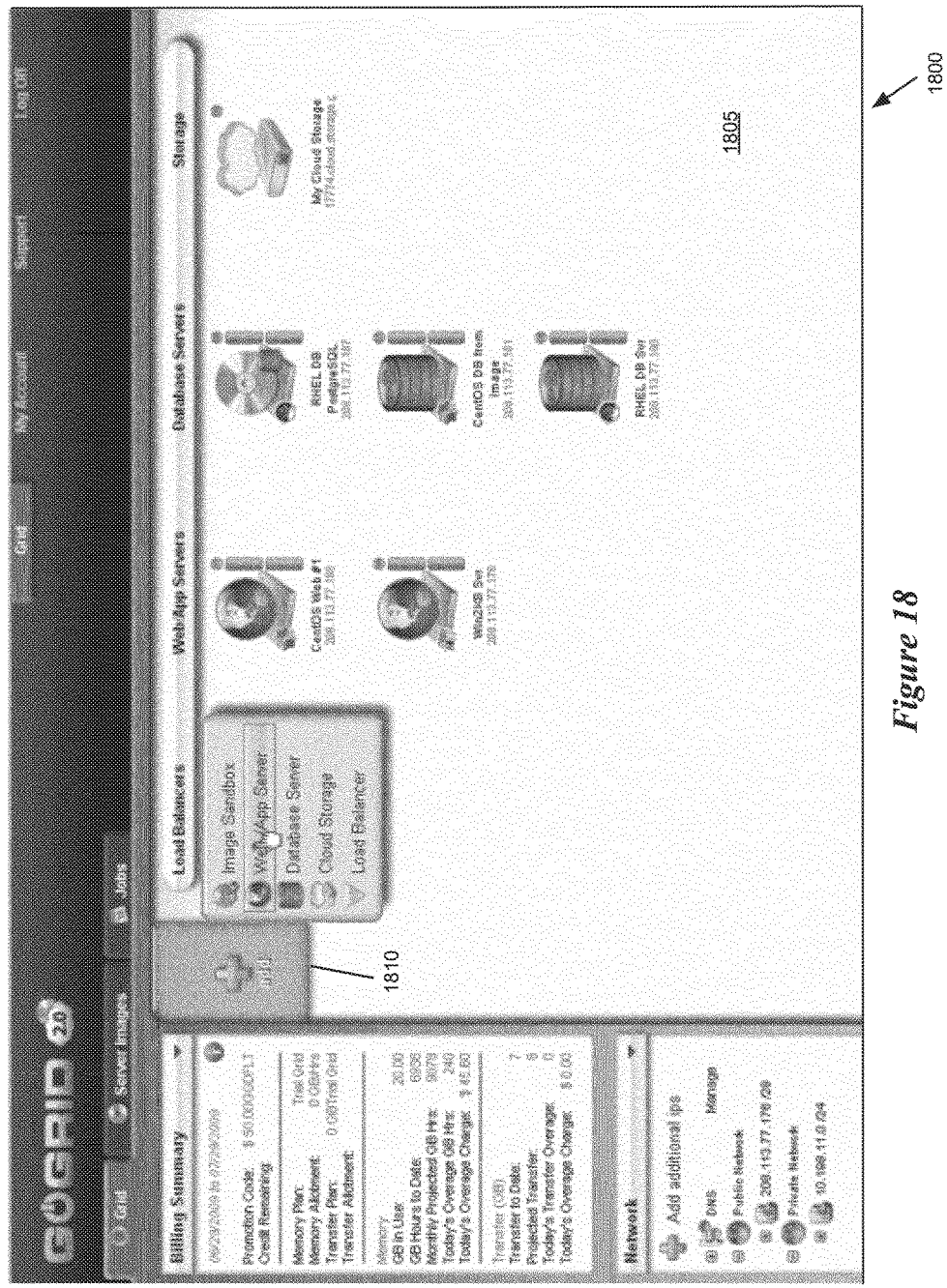
FIGS. 18-20 illustrates an example of a graphical user interface (GUI) that allows a user to deploy a virtual server from a stored server image.

FIG. 18 illustrates an example of such a graphical user interface (GUI) 1800 that allows a user to deploy a virtual server from a stored server image. As with GUI 1000 of FIG. 10, GUI 1800 includes a display area 1805 for displaying a user's various operational servers in a hosting and storage system. The GUI 1800 also includes an "add" selectable item 1810 that allows a user to add a new server, cloud storage space, or load balancer. As shown in this figure, the user has selected the add button 1810 and is choosing to add a new web/application server.

Figure 19:
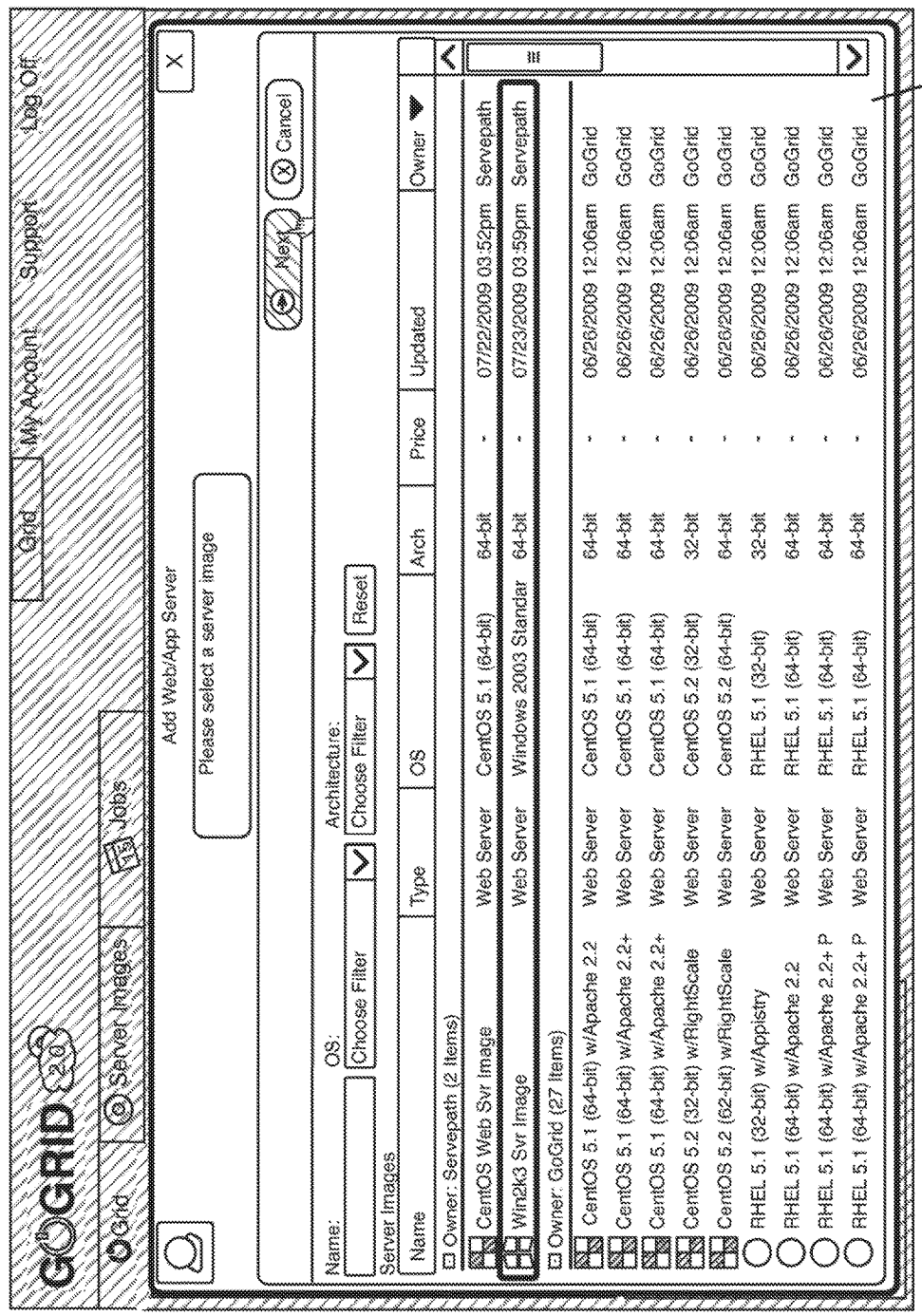
Figure 20:
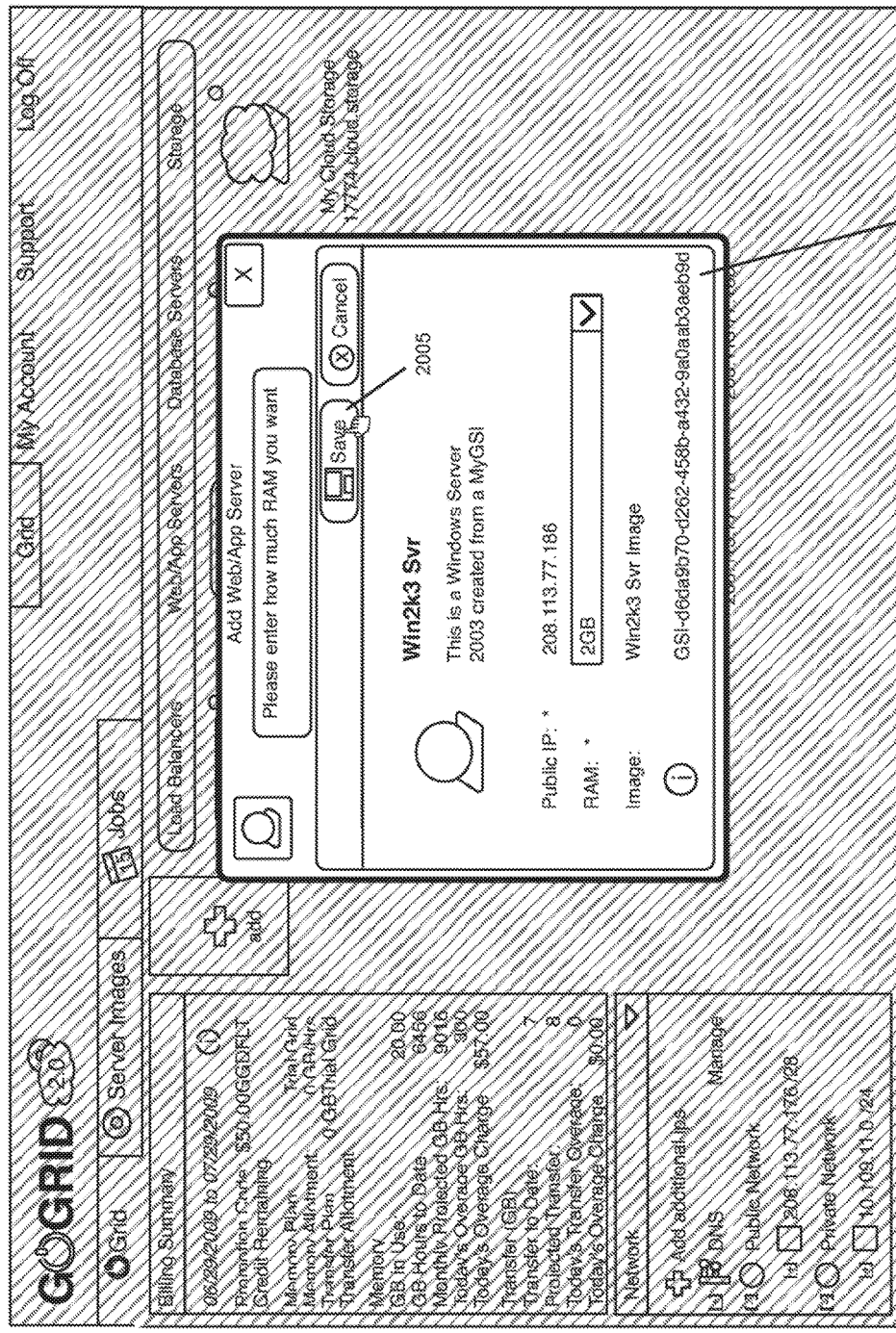

As illustrated in FIG. 19, the user is then presented a list of server images 1900, including images that the user has created from his own virtual servers (e.g., via the processes described above in §II. As shown, the user has selected a server image 1905. FIG. 20 illustrates that the user has selected the server image 1905 and is presented with a configuration dialog box 2000 that enables the user to enter a name, IP address, and other parameters for the virtual server that will be instantiated in the storage and hosting system. When the user selects button 2005, the process 1600 begins in some embodiments to deploy the virtual server in the hosting system.

The process then allocates (at 1610) a disk volume on the node (as well as other hardware resources of the node in some embodiments) for the virtual server. In some embodiments, the configuration manager on the UVM allocates the disk volume on the node by accessing the hardware resources through the hypervisor. Stage 1710 of FIG. 17 illustrates that a disk volume 1780 has been allocated for the virtual server to deployed.

The received instructions regarding the deployment of the server, in some embodiments, identify the size of the virtual server that is to be deployed. In some embodiments, when a virtual server image is saved from a virtual machine having a particular size, virtual machines deployed using that server image can be the particular size or larger. Thus, for example, a server image saved from a virtual machine with 20 Gb of disk space could be deployed onto a 100 Gb disk volume. After deployment, a user would then have the ability add software applications, files, etc. to make use of the extra 80 Gb of disk space.

Next, process 1600 checks (at 1615) the caching network for the desired virtual server. In some embodiments, each server image stored in the permanent network and/or caching network has a unique name. This unique name may include a username of the user who saved the server image. Thus, if two users want to name a saved server "Web_Server_2", there would be a "Web_Server_2_User1" and "Web_Server_2_User2". One of ordinary skill in the art will recognize that this is merely an example of a naming convention for server images, and many different naming conventions are possible. Thus, the UVM sends a request to the caching network for the desired server image using the name of the server image. Stage 1710 of FIG. 17 illustrates the communication between the UVM 1520 and the caching network 1590 as the UVM requests a particular server image.

The process then determines (at 1620) whether the particular server image is already in the caching network. In some embodiments, server images are stored on a cache server in the caching network for a time after they have been deployed. Thus, if the server image has been recently deployed, it need not be re-retrieved from the permanent storage network. The details of retrieving the server image and the behavior of the caching network will be described in detail below in Section IV.

When the desired server image is not presently in the caching network, process 1600 pulls (at 1625) the server image from permanent storage into the cache. In some embodiments, the caching network reports back to the UVM that the desired server is not stored on any of the caching servers, at which point the UVM sends a message through the caching network to the permanent storage network with instructions to send the desired server into the caching network.

In other embodiments, this is handled entirely by the caching network and the permanent storage network. When the UVM sends a request to the caching network for a particular server image, if the server image is not stored in the caching network, then the caching network sends a request to the permanent storage network for the server image. Stage 1715 of FIG. 17 illustrates the transfer of an image 1750 from the permanent storage network 1595 to the caching network 1590. This process and the storage in the caching network will be explained in further detail below in Section IV.

Once the server image is in the caching network, the image can be transferred to the hardware node for deployment. Process 1600 fetches (at 1630) a unit of the server image from the caching network. In some embodiments, the server image is stored on the caching network in units (e.g., 256 Mb units) and one unit is transferred to the UVM at a time. These units are broken into sub-units in some embodiments, and each sub-unit has a checksum for verifying the integrity of the sub-unit. Thus, when a unit of the server image is fetched from the caching network, this unit is loaded into the memory of the UVM, which can then check the checksum of each of the sub-units. Stage 1720 of FIG.

17 illustrates the transfer of a unit 1755 of server image 1750 from caching network 1590 to the data receiver module 1540 of UVM 1520.

Process 1600 thus checks (at 1635) the next sub-unit of the current server image unit against the checksum for the sub-unit. Stage 1725 of FIG. 17 illustrates that the data receiver 1540 transfers a sub-unit 1760 and its checksum 1765 to the checksum calculator 1535. The checksum calculator ignores checksum 1765 and recalculates a checksum for the received data of sub-unit 1760. If the data in sub-unit 1760 has not changed since the checksum 1765 was originally calculated (i.e., at the time of creation of the server image), then the newly calculated checksum and the checksum 1765 should be the same.

Returning to FIG. 16, process 1600 next determines (at 1640) whether the current sub-unit is okay (that is, the process checks the integrity of the data of the sub-unit). Stage 1730 of FIG. 17 illustrates the transfer of sub-unit 1760 and received checksum 1765 along with a newly calculated checksum 1770 from the checksum calculator 1535 to the checksum matcher 1530. The checksum matcher compares the two checksums in order to verify the integrity of sub-unit 1760.

When the checksums do not match, the data in the current sub-unit has been corrupted and the process purges (at 1645) the server image from the cache. The process then returns to 1625 to pull the server from permanent storage to the cache. In some embodiments, server image data may become corrupted in the caching system, or during the transfer process. If the corrupted data is used, the virtual server may not function properly. Accordingly, the process must re-load the server image from the copy in permanent storage, which is far less likely to become corrupted in some embodiments due to the type of storage used in the permanent storage network.

In some embodiments, when the UVM detects that the server image data is corrupt, the UVM sends a message to the caching network to let the caching network know to purge its copy of the server image. Then, either the UVM or the caching network sends a message to the permanent storage to retrieve a new copy of the server image to load onto the hardware node.

When (at 1640) the sub-unit of image data is checked out as okay (that is, the received and newly calculated checksums match), the process lays down (at 1650) the sub-unit of server data on the disk volume allocated for the server. In some embodiments, this entails modifying the bits of the disk volume to match the server image data. Stage 1735 of FIG. 17 illustrates that the sub-unit of image data 1760 is laid down as the start of a virtual machine 1775 on disk volume 1780.

The process then determines (at 1655) whether there are more sub-units left to check in the current unit of server image data loaded on the UVM. When there are more subunits remaining, the process returns to 1635 to check the next sub-unit for integrity and lay that sub-unit down on the allocated disk volume. Otherwise, the process determines (at 1660) whether there are any more units (e.g., the 256 Mb chunks) of server image data remaining in the cache. When more units remain, the process returns to 1630 to fetch the next unit of server image data from the cache.

When no more units remain, the entire server image has been laid down on the disk volume. Stage 1740 of FIG. 17 illustrates that virtual machine 1775 has been fully laid down on disk volume 1780. As described above in Section II, the server images are stored without paravirtualization drivers (the drivers that enable the operating system to work with the hypervisor as a virtual machine) and without system-specific information that varies from operating system to operating system.

Therefore, process 1600 next configures (at 1665) the virtual server with the requisite system-specific information. In some embodiments, the system-specific information varies based on the operating system of the virtual machine. For instance, in some embodiments, when the virtual machine is a server running the Microsoft® Windows® operating system, the system-specific information includes the Windows Security Identifier (SID), network configurations, and desktop and administrator profiles. In some embodiments, when the virtual machine is a server running the Linux® operating system, the system-specific information includes any unique identifiers (e.g., a RHEL registration ID, etc.). Some embodiments also assign an IP address to the virtual machine and/or ensure that there is a proper license for the system being instantiated. Different embodiments will include different information, both the above-listed information as well as other information that is not listed, in the system-specific information that is removed from a virtual server before it is saved as a server image.

Process 1600 also installs (at 1670) the paravirtualization drivers. As mentioned above, these drivers enable the virtual machine to properly interface with the hypervisor. In some embodiments, other drivers are also installed. In fact, some embodiments perform a dynamic driver update, in order to ensure that the newest and most up-to-date drivers are installed on the newly deployed virtual machine. This can apply to both the paravirtualization drivers as well as any other drivers installed on the virtual machine. Stage 1745 of FIG. 17 illustrates that the paravirtualization drivers 1785 and the system-specific information 1790 have been installed on virtual machine 1775. The virtual machine 1775 is now operational in some embodiments.

One of ordinary skill will recognize that in some embodiments operations 1665 and 1670 will not necessarily be performed in the order shown in process 1600. Some embodiments will perform these operations in the opposite order, or will perform both simultaneously. Furthermore, when the operating system of the virtual machine is Microsoft® Windows®, the paravirtualization drivers and system-specific information is not fully installed on the laid-down virtual machine by the UVM. Instead, the information is loaded into an appropriate location on the virtual machine, and then is installed by the virtual machine itself when the virtual machine is booted up. Similarly, when the operating system is Linux®, log and history files are replaced by the operating system at first boot in some embodiments.

IV. Storage and Caching of Server Images

As described above, some embodiments store server images on a permanent storage network such as a cloud storage network with multiple cloud storage clusters. In some embodiments, the permanent storage network is connected, through a caching network, to a hardware grid onto which the server images may be deployed and from which the server images may be saved.

A. Storage Architecture

Figure 21:
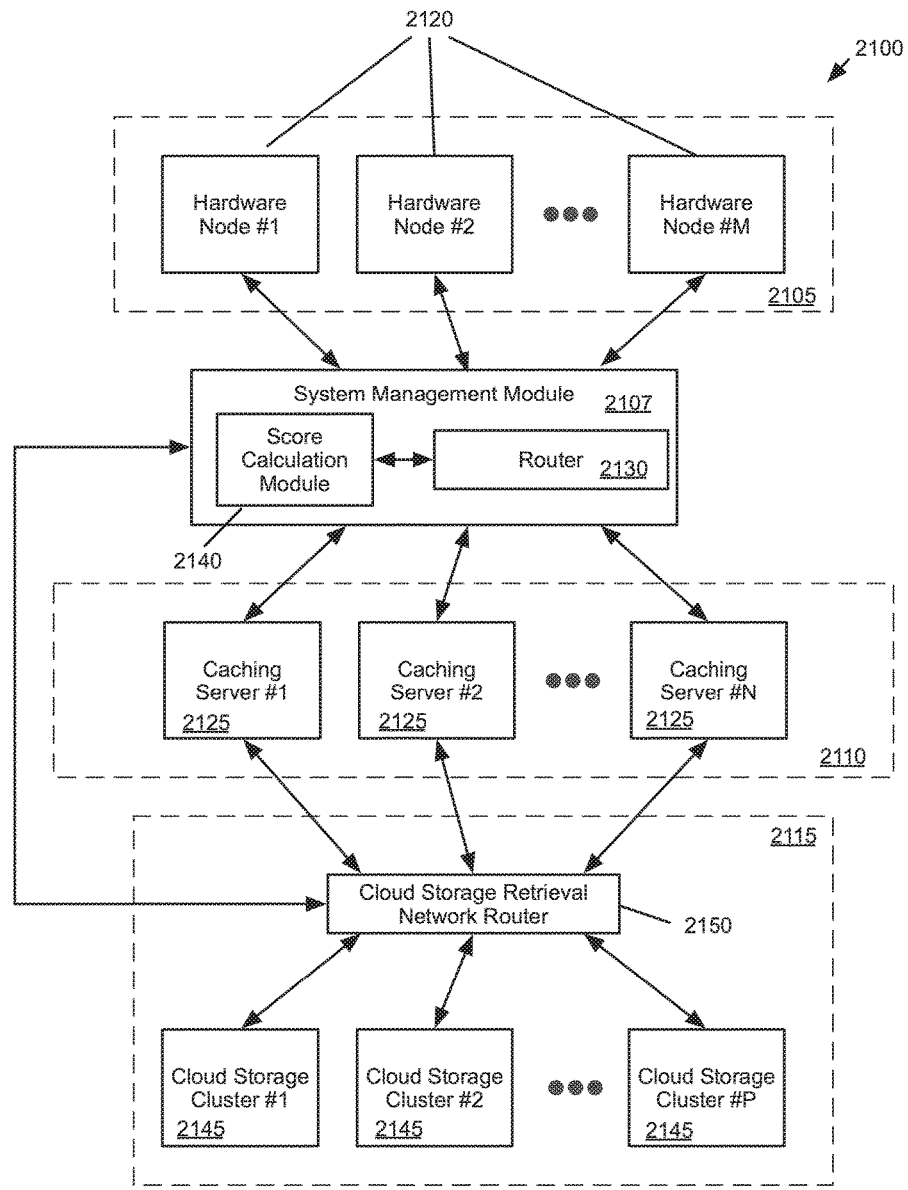
FIG. 21 illustrates a hardware grid, a system management module, a caching network, and a cloud storage network that are part of a hosting and storage system of some embodiments.

FIG. 21 illustrates a hardware grid 2105, a system management module 2107, a caching network 2110, and a cloud storage network 2115 that are part of a hosting and storage system 2100 of some embodiments. For instance, the hosting and storage system could be similar to system 500 illustrated in FIG. 5, or could have a different architecture.

Hardware grid 2105 includes several hardware nodes 2120. Hardware nodes 2120 may all be the same, or may each have different hardware. In some embodiments, all of the hardware nodes have an installed hypervisor (e.g., Xen, VMware, etc.) such that each node can host one or more virtual machines, depending on the size of the virtual machines and the available hardware resources of the node. In some embodiments, specific types of virtual machines (e.g., F5 load balancers) operate on specific hardware.

The caching network 2110 of some embodiments includes several caching servers 2125. The caching servers 2125 may all be the same type of cache server (e.g., a Squid server). While the software of the cache server is similar in some embodiments to that used for web caching servers, the servers do not necessarily function in the same way as a web server.

The system management module 2107 includes a router 2130 and a score calculation module 2140. In some embodiments, the system management module 2107 performs the various functions of the system management module 540 described in the above sections (e.g., communicating with the hardware nodes 2120 and utility management modules on the nodes, etc.). On the other hand, in some embodiments the router 2130 and score calculation module 2140 are located outside of the system management module (e.g., in a dedicated router or set of routers).

Router 2130 is a router that serves to route data between the hardware nodes 2120 and the cache servers 2125. When a server image is saved, the UVM on the hardware node from which the server image is saved sends the server image data to the router 2130, which distributes the data to the appropriate cache server, from which the data can be streamed to the cloud storage network. In some embodiments, when a request for a server image is received, the router identifies a cache server most likely to be storing the server image. The router 2130 uses the score calculation module 2140 to identify such a cache server. The score calculation module 2140 of some embodiments calculates scores for server image/cache server combinations and uses these scores to assign a server image to a cache server. Details of the scoring and cache assignment will be described below. In some embodiments, the score calculation module is on a piece of hardware separate from the router 2130. In other embodiments, the score calculation module 2130 is a module that runs on router 2130.

In the case in which the router 2107 is not part of the system management module (e.g., is a dedicated caching network router), some embodiments do not route the server image data being saved or deployed through the system management module at all. The data is only sent through the router 2130 to the caching servers 2125 in such embodiments.

The cloud storage network 2115 includes several cloud storage clusters 2145, a cloud storage retrieval network router 2150, and a score calculation module 2155. The cloud storage clusters 2145, in some embodiments, are shared electronic storage hardware that can be accessed by the same users as the hardware grid 2105. The cloud storage clusters 2145 provide permanent (in the sense of being more permanent than the cache servers) storage for server images and other files for the users.

Cloud storage retrieval network router 2150 is a router (or, in some embodiments, a set of routers) routes data between the cache servers 2125 and the cloud storage clusters 2145. In some embodiments, when a server image being saved is streamed through the caching network, the router 2150 identifies to which cloud storage cluster 2145 the server image should be directed based on the user that is saving the server image (e.g., by looking up this information on a database stored in the router 2150 or external to the router).

When a request for a particular server image to deploy is received from the caching network, router 2150 identifies the storage location in some embodiments. In other embodiments, router 2150 broadcasts a request for the server image.

Figure 22:
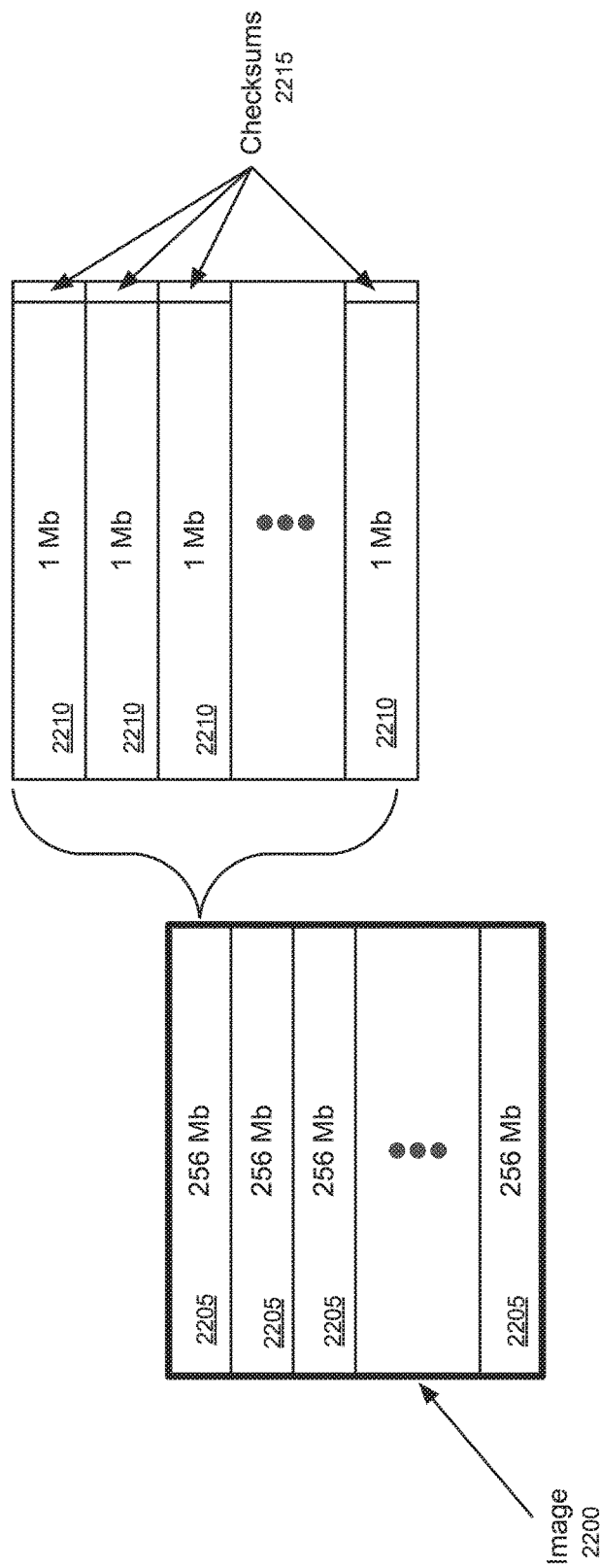
FIG. 22 illustrates a server image as stored in cloud storage.

FIG. 22 illustrates a server image 2200 as stored in the cloud storage. Server image 2200 is stored in cloud storage as a single file (e.g., if compressed using zip compression techniques, a .zip file) in some embodiments. The file includes several units 2205 of a particular size (in this case, 256 Mb). In some embodiments, this are units in the uncompressed (e.g., unzipped) format of the server image file. As shown, each unit 2205 contains several sub-units 2210. Each sub-unit is stored with a checksum 2215 for that sub-unit.

When the server image (e.g., image 2200) is sent from the cloud storage cluster 2145 to the caching network 2110, this also runs through router 2150. In some embodiments, the server image is loaded one unit at a time into the caching network such that the caching network does not have to handle such a larger file (server image files, uncompressed, might be on the order of 10-20 Gb or larger).

When the router 2150 receives a server image file requested by the caching network, in some embodiments the router connects to the system management module 2107 to identify to which cache server the server image file should be sent. In some embodiments, the score calculation module 2140 calculates a score for the server image file based on data sent from the router 2150. In other embodiments, the score was already calculated at the time that the image file was initially requested by the hardware node, so it does not need to be recalculated. In fact, the router 2150 may already have this information in some embodiments, such that no request need be sent to the system management module 2107.

One of ordinary skill in the art will recognize that the architecture of system 2100 illustrated in FIG. 21 is only one example out of many possible architectures for the hosting and storage system of some embodiments. For instance, in some embodiments, the hardware grid can directly connect to the cloud storage network without being required to send data through the caching network. However, in some cases, such a direct connection will be an input/output bottleneck when there are many users all accessing the storage network at once, whereas the caching network allows such a load to be more easily distributed across numerous caching servers. As will be described below, in many cases the image retrieval process will not need to even access the cloud storage network because the needed server image will already be loaded on a caching server. In some embodiments, communication between the cloud storage network and the caching servers is also routed through router 2130, which does all of the score calculation.

B. Operation of Cache Servers

As mentioned above, the cache servers 2125 of caching network 2110 act as a go-between for the hardware grid 2105 on which virtual servers operate and the permanent storage network 2115 on which server images are stored. In some embodiments, the cache servers act as a conduit that basically streams the server images through when a server image is saved from the hardware grid to the permanent storage. However, in the other direction (that is, the deployment of server images from the permanent storage), the cache servers actually act as a cache that holds server images for later deployment onto the hardware nodes.

When a server image is loaded onto a cache server from the permanent storage, the server image is then streamed to the appropriate hardware node. In addition, the server image remains on the cache server after being deployed on the hardware node in some embodiments. Each cache server in the caching network has a memory that stores a first in-first out queue of server images. When a server image is deployed using a particular cache server, the server image is sent to the entry point of the queue for that cache server. The queue will have a list of previously deployed server images that it is storing, and based on the memory available in the queue, one or more of the server images will be pushed from the exit point of the queue.

When a hardware node requests a server image that is already in the queue on the cache server, the cache server provides this server image to the hardware node (or, more specifically, to the utility management module on the hardware node). The server image is also bumped back to the entry point of the queue. In this manner, popularly deployed server images will remain in the queue, thus eliminating the need to retrieve these images from the permanent storage unless the server image data becomes corrupted.

Figure 23:
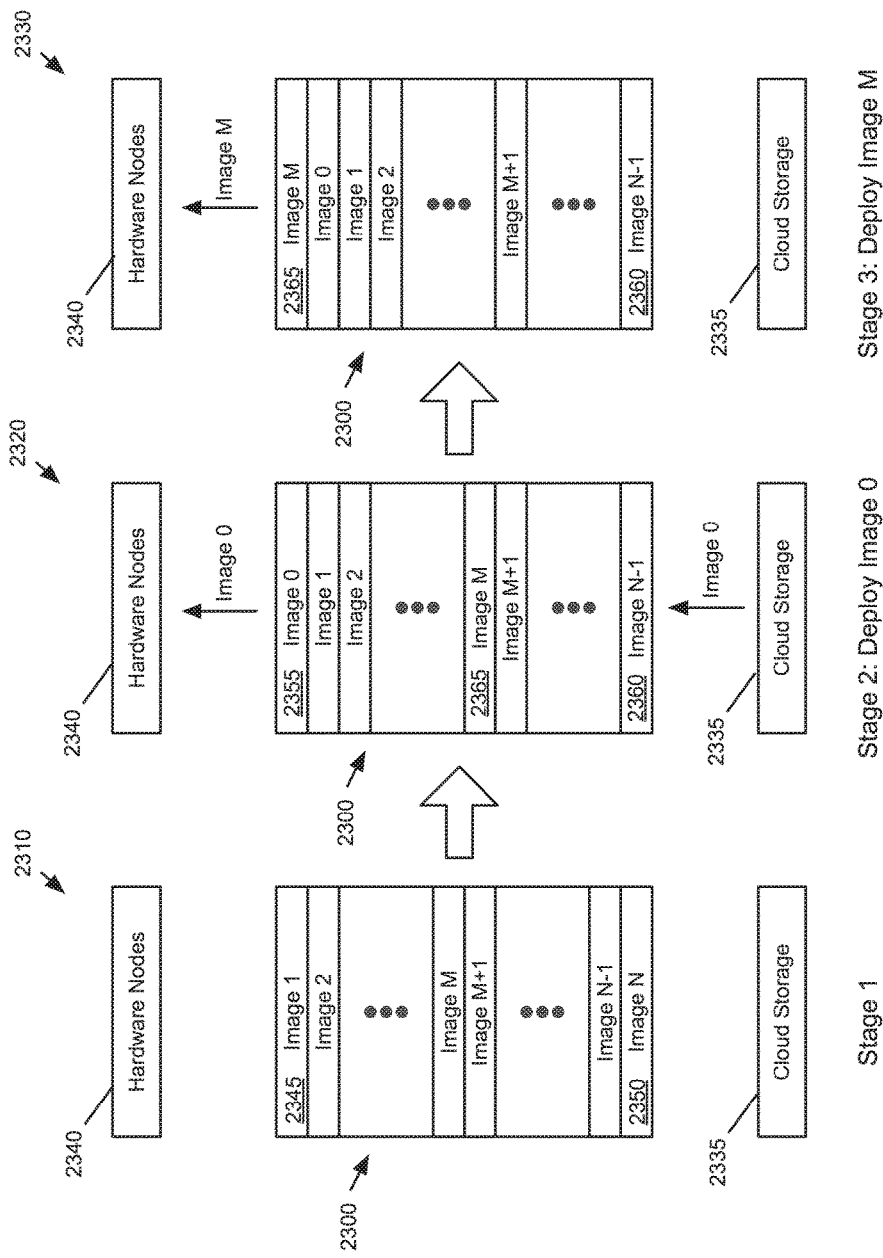
FIG. 23 conceptually illustrates the queue of a cache server of some embodiments at three stages.

FIG. 23 illustrates such cache operation. FIG. 23 conceptually illustrates the queue of a cache server 2300 of some embodiments at three stages 2310-2330. FIG. 23 also illustrates cloud storage network 2335 and hardware grid 2340. Stage 2310 illustrates that the queue of cache server 2300 stores numerous server images, with "Image 1" 2345 (the most recently deployed image) at the entry point of the queue and "Image N" 2350 at the exit point of the queue. At this stage, there is no server image being presently deployed.

Stage 2320 illustrates the result of deploying an "Image 0" 2355 from cloud storage 2335 to hardware grid 2340. Image 2355 is cached on the cache server 2300 and therefore placed in the server's queue. As shown, "Image 0" 2355 is now at the entry point of the queue. Furthermore, "Image N" 2350 has been pushed out of the queue and "Image N-1" 2360 is now at the exit point. Due to the addition of "Image 0" 2355 to the queue, there is no longer room for "Image N" 2350. Unlike a standard queue data structure, server images are not popped from the queue when they are used, but instead when there is no longer room in memory on the cache server. Thus, if a future request for "Image N" 2350 comes into the caching network, the image will need to be retrieved from permanent storage.

While the addition of "Image 0" 2355 to the queue pushes one server image ("Image N" 2350) out of the queue, there will not always be a one-to-one correspondence between server images entering and exiting the queue in some embodiments. The addition of a server image to the queue of a cache server may not push any server images off of the queue at all in the case that there is more memory available on the cache server than the size of the added server image. On the other hand, the addition of a server image to the queue might push multiple server images off of the queue if the added server image is larger than the server image at the exit point of the queue.

Stage 2330 illustrates the result of deploying "Image M" 2365 which is already in the queue of cache server 2300. Because server image 2365 is already stored in the memory of cache server 2300, there is no need to retrieve the image from cloud storage 2335. Instead, "Image M" 2365 is fetched directly from cache server 2300 and is moved back to the entry point of the queue. Because no new memory is used, "Image N-1" 2360 is not pushed out the exit point of the queue.

FIG. 23 illustrates the operation of a single cache server. As mentioned above, the caching network of some embodiments uses numerous such cache servers. In some embodiments, a server image stored in the permanent storage network will be loaded onto only one of these cache servers when deployed. Some embodiments use affinity scoring to identify a preferential cache server for a particular image.

Affinity scoring is performed by a module on the path between the permanent storage and the caching network (e.g., at router 2150 of FIG. 21). When a server image is retrieved from the permanent storage network, the score calculator calculates a score for the server image and each cache server in the cache network. Thus, if there are thirty cache servers, thirty scores are calculated for the retrieved server image in some embodiments. The server image is then preferentially routed to the cache server with the highest score. If this cache server is offline or busy, the server image will be routed to the cache server with the second highest score. This continues until an available cache server is identified.

Figure 24:
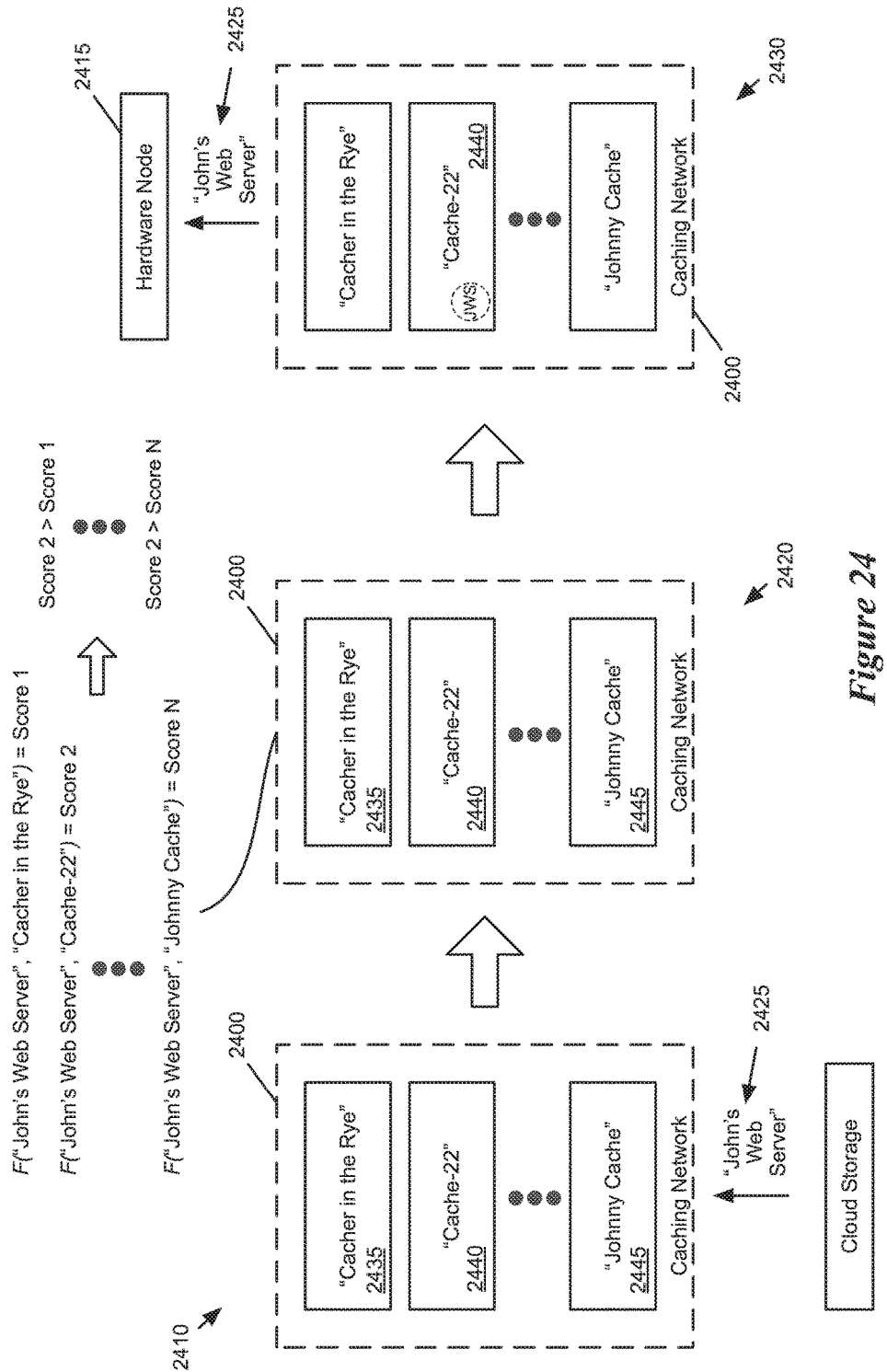
FIG. 24 illustrates the operation of a score calculator for calculating affinity scores for an image being loaded onto a caching network of some embodiments.

FIG. 24 illustrates the operation of a score calculator for calculating affinity scores for an image being loaded onto a caching network 2400 of some embodiments. Specifically, FIG. 24 illustrates three stages: a first stage 2410 as the image is loaded from cloud storage 2405, a second stage 2420 as affinity scores are calculated for the image and the various cache servers on network 2400, and a third stage 2430 as the image is loaded into a particular cache server and streamed to a hardware node 2415.

Stage 2410 illustrates that an image 2425 with the name "John's Web Server" is retrieved from cloud storage 2405 by caching network 2400. The image 2425 could be retrieved in response to a request from a utility management module on a hardware node in a grid of hardware resources. The caching network 2400 has numerous cache servers, three of which are illustrated in the figure. The three cache servers have the names "Cacher in the Rye" 2435, "Cache-22" 2440, and "Johnny Cache" 2445.

Stage 2420 illustrates the calculation of affinity scores for image 2425. One affinity score is calculated for each cache server on caching network 2400. The scores are calculated by applying a function F to the name of image 2425 and the servers 2435-2445. Thus, a score F("John's Web Server", "Cacher in the Rye") is calculated for cache server 2435, a score F("John's Web Server", "Cache-22") is calculated for cache server 2440, and a score F("John's Web Server", "Johnny Cache") is calculated for the cache server 2445. One of ordinary skill will recognize that F("John's Web Server", X) is calculated for each of the other cache servers X as well.

Some embodiments use a hash function of the two names for the function F. In some embodiments, the calculated hash corresponds to an index in an array. The index represents one of the cache servers. Various other functions that use the server image name and cache server name as inputs are used in various different embodiments. Other descriptors of the server image and the cache server may be used as inputs by some embodiments as well—e.g., the size of the server image, a hardware address of the cache server, etc.

As shown in stage 2420, F("John's Web Server", "Cache-22") results in the highest affinity score. Accordingly, at stage 2430, server image 2425 is loaded onto cache server 2440 ("Cache-22"). From cache server 2440, the image 2425 is streamed to hardware node 2415 for deployment, as described above in Section II. In some embodiments, the server image will not necessarily be loaded onto the cache server with the highest score. For instance, if a particular cache server is in the process of receiving a first server image, or is currently offline or otherwise busy, then in some embodiments a second server image will not be loaded onto the particular cache server at the same time. Instead, the router would send the server image to the cache server with the second-highest affinity score. When the server image is loaded onto a cache server, some embodiments insert the server image at the entry point of a queue for the cache server, as described above by reference to FIG. 23.

A similar affinity scoring process is used when a utility management module sends a request for a server image to the caching network. As described above in Section III, some embodiments first attempt to find the server image on the caching network before retrieving the server image from permanent storage. Some embodiments check each of the cache servers before sending a request to the permanent storage network for the server image. Some embodiments check only a particular number of cache servers (e.g., the first cache server, the first five servers, etc.).

In order to more quickly find a requested server image on the caching network, some embodiments calculate affinity scores for the server image paired with each cache server on the network. In some embodiments, the scores calculated upon a request for a server image are the same scores described above that are calculated in order to determine onto which cache server a server image retrieved from the storage network should be loaded. In fact, some embodiments do not recalculate the scores when loading a server image onto the cache server because the score was recently calculated in the process of attempting to retrieve the server image from the cache server without having to access the storage network. The cache server with the highest score for the retrieved server image is the most likely cache server to which the server image will be loaded, and therefore is also the most likely cache server on which the server image will be found when requested by a hardware node.

Figure 25:
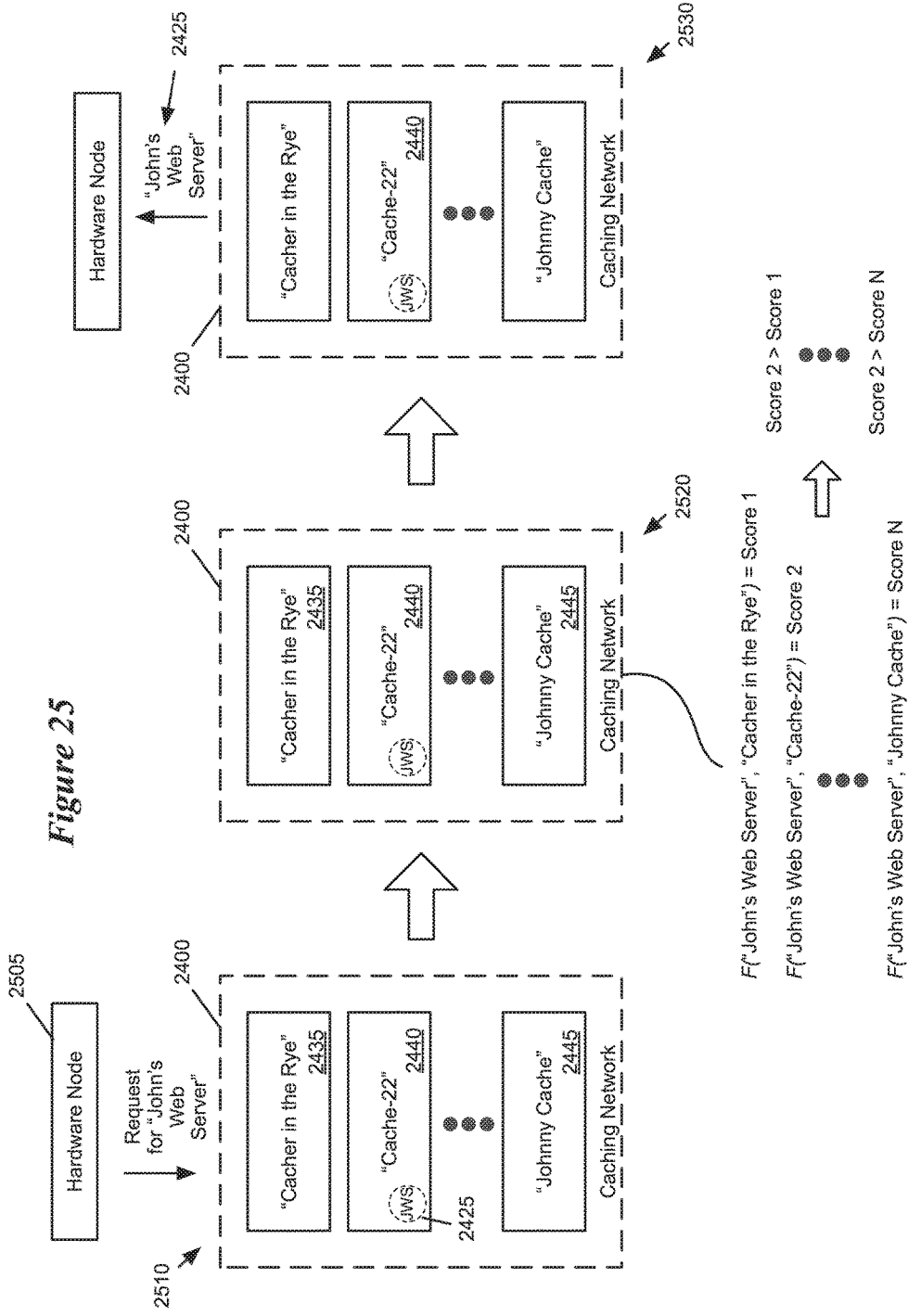
FIG. 25 illustrates a request for a particular server image.

FIG. 25 illustrates such a request for the server image "John's Web Server" 2425. Specifically, FIG. 25 illustrates three stages: a first stage 2510 when the request for server image 2425 is received by caching network 2400, a second stage 2520 as affinity scores are calculated to identify the most likely cache servers on which to find server image 2425, and a third stage 2530 at which the server image is streamed to the hardware node 2505.

As shown, at stage 2510 a request is sent by hardware node 2505 to caching network 2400. As before, caching network 2400 has numerous cache servers, including the three with names "Cacher in the Rye" 2435, "Cache-22" 2440, and "Johnny Cache" 2445. Server image "John's Web Server" 2425 is currently in the memory of cache server "Cache-22" 2440, as described above by reference to FIG. 24. In some embodiments, server image 2425 would have moved down in the queue of cache server 2440 as other images are loaded into and/or deployed to hardware from cache server 2440.

Although server image 2425 is in the queue of cache server 2440, the router that receives the request from hardware node 2505 for server image 2425 does not know this information initially in some embodiments. Thus, this router (or a module external to the router) calculates affinity scores for the server image 2425 paired with each cache server on caching network 2400. The scores are calculated by applying a function F to the name of the requested server image and the cache servers 2435-2445. Thus, a score F("John's Web Server", "Cacher in the Rye") is calculated for cache server 2435, a score F("John's Web Server", "Cache-22") is calculated for cache server 2440, and a score F("John's Web Server", "Johnny Cache") is calculated for the cache server 2445. One of ordinary skill will recognize that F("John's Web Server", X) is calculated for each of the other cache servers X as well.

Some embodiments use a hash function of the two names for the function F. Various other functions that use the server image name and cache server name as inputs are used in various different embodiments. Other descriptors of the server image and the cache server may be used by some embodiments as well—e.g., the size of the server image, a hardware address of the cache server, etc.

As was the case in stage 2420 of FIG. 24, F("John's Web Server", "Cache-22") results in the highest affinity score. Accordingly, cache server "Cache-22" 2440 will be the first cache server on network 2400 checked for the presence of server image 2425. In this case, server image 2425 is in fact on this cache server, and therefore no more cache servers need be checked. In some embodiments, when the requested image is not on the cache server with the highest affinity score, the cache server with the second highest score will be checked. Until the requested server image is found on one of the cache servers or all cache servers are examined, the cache servers are checked in order of affinity score in some embodiments.

Stage 2530 illustrates that the server image 2425 is streamed to hardware node 2505 for deployment from cache server "Cache-22" 2440. In some embodiments, as described above by reference to FIG. 23, this moves the server image 2425 back to the entry point of the queue for cache server 2440.

If any data errors in the server image 2425 are detected by the utility management module on hardware node 2505, some embodiments inform the caching network 2400 such that server image 2425 will be purged from the queue of cache server 2440. The caching network would then re-retrieve the server image from permanent storage, performing a process similar to that shown in FIG. 24. The process would not necessarily be the same, as in some cases a different cache server with a lower affinity score might be chosen.

V. System Templates

The previous sections described saving and deploying single server images. In some embodiments, users have the option of saving groups of servers as a whole. Such a group, or configuration, of servers might include one or more load balancers, web servers, database servers, etc. Referring to the hosting system of FIG. 5, the various servers in the configuration might be operating on multiple different hardware nodes in hardware grid 570.

Figure 26:
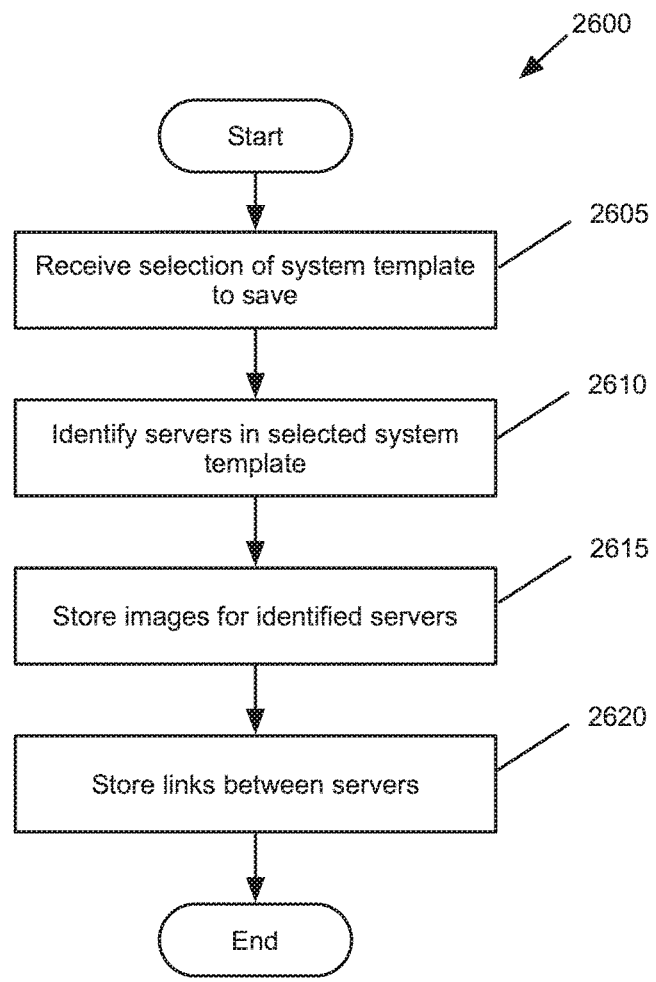
FIG. 26 conceptually illustrates a process of some embodiments for saving a system template.

In some embodiments, the process for saving and/or deploying a system template draws on the processes for saving and/or deploying individual servers as described in Sections II-IV. FIG. 26 conceptually illustrates a process 2600 of some embodiments for saving a system template.

Figure 27:
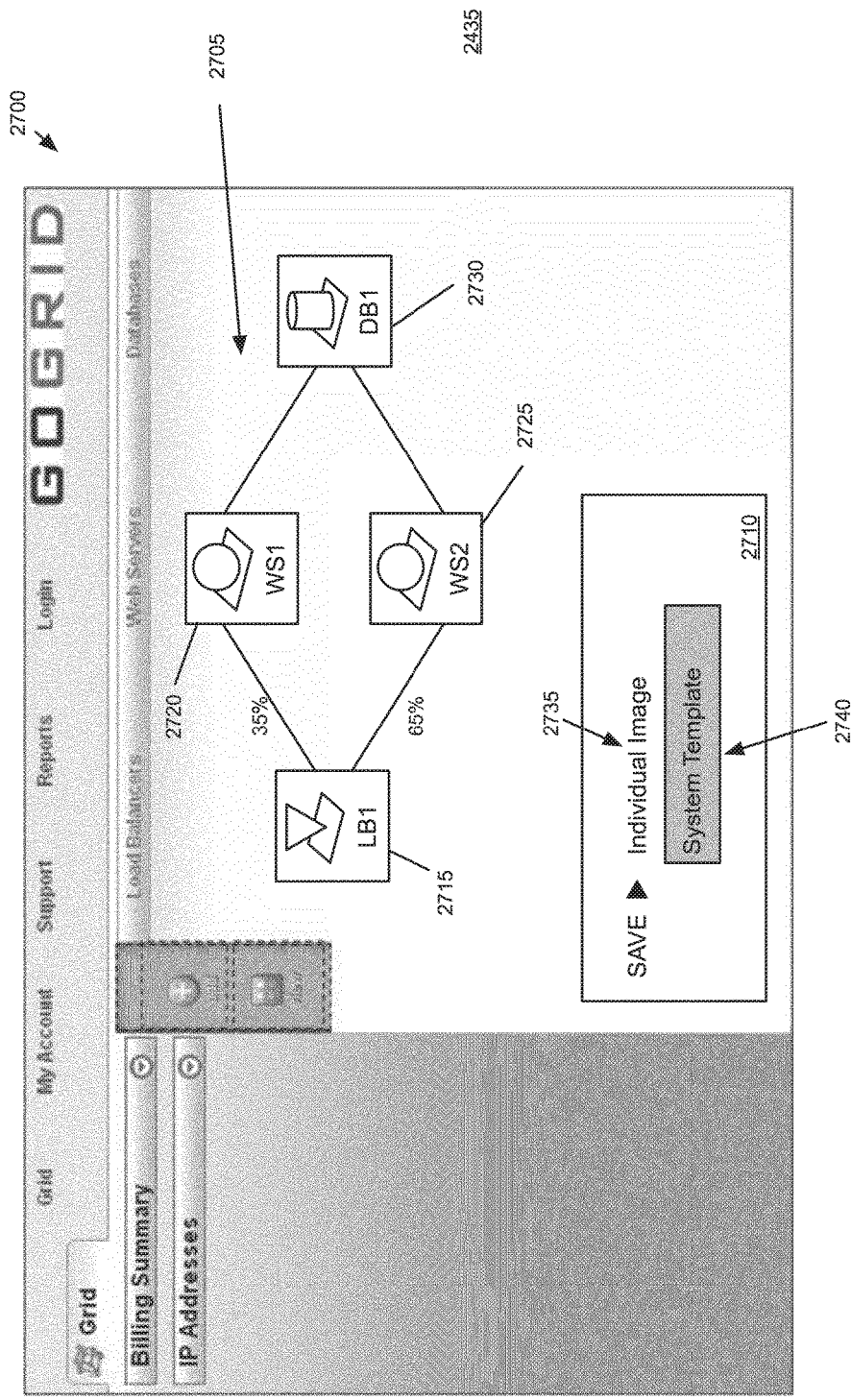
FIG. 27 illustrates a graphical user interface (GUI) of some embodiments that enables a user to save a system template.

As shown, process 2600 begins by receiving (at 2605) a selection of a system template to save. This selection is received from a user through a user interface in some embodiments. FIG. 27 illustrates a graphical user interface (GUI) 2700 of some embodiments that enables a user to save a system template. GUI 2700 includes a configuration display 2705 and a save option display area 2710.

Configuration display 2705 includes graphical representations of four servers in a configuration controlled by a particular user. The configuration display 2705 includes graphical representations for a load balancer 2715, two web servers 2720 and 2725, and a database server 2730. Each of the graphical representations may be selected by the user in order to access properties of the selected server. For instance, selecting the load balancer 2715 would enable the user to modify properties of the represented load balancer such as the breakdown in traffic between the two web servers 2720 and 2725 (currently shown as 35% to web server 2720 and 65% to web server 2725). Selecting one of the web servers 2720 or 2725 would enable the user to modify the properties of the represented web server such as the memory, allocated disk space, installed software, etc.

Save option display area 2710 includes two selectable save options. These selectable save options include an option 2735 for saving an individual image and an option 2740 for saving a system template, or server configuration. Selecting the individual image option 2735 will enable the user to save an image of one of the servers in configuration display 2705 (i.e., servers 2720-2730) as described above in Section II. Selecting the system template save option 2740 initiates process 2600 in some embodiments, saving the system configuration displayed in configuration display 2705.

Returning to FIG. 26, process 2600 next identifies (at 2610) the servers in the selected system template. The received system template specifies which servers are to be saved. When this information is received at a system management module (e.g., module 540), the system management module identifies the location in the hardware grid (e.g., grid 570) of each of the different servers in the system template. As mentioned, these servers will not necessarily be all operating on the same physical node, but will be instead be spread throughout the grid of hardware nodes.

The process then stores (at 2615) images of the identified servers and a configuration file for any load balancers, as images of load balancers are not stored in some embodiments. In some embodiments, each hardware node (and the utility management module operating on the hardware node) on which one of the identified servers is operating performs process 900 in order to save the virtual server. In some embodiments, each of the virtual servers has already performed process 700 to prepare itself for being saved. The pre-processing is performed in response to separate user instructions in some embodiments, as described in reference to FIG. 7 above. In other embodiments, when instructions are received to store a system template, the pre-processing module is launched automatically on each of the virtual servers to be stored. The load balancer configuration file stores information about the load balancer that should be instantiated with the system template. In some embodiments, this information includes the type of load balancer (e.g., F5), the persistence of the load balancer (e.g., sticky sessions, cookie persistence, etc.), the load balancing method (e.g., round robin, least utilized, etc.)

Figure 28:
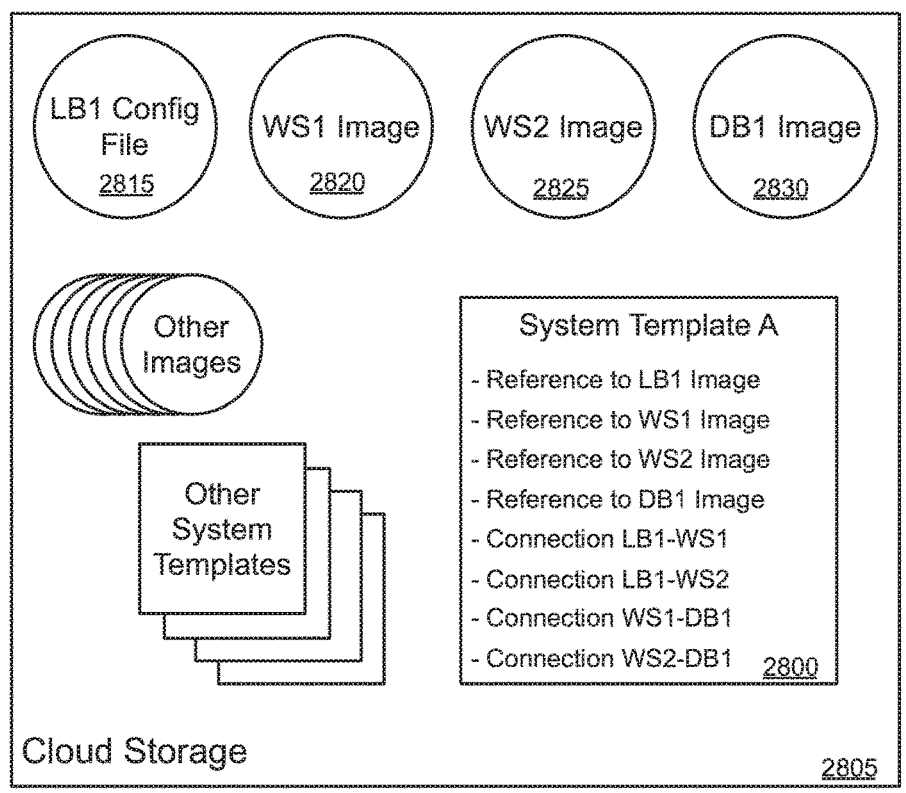
FIG. 28 conceptually illustrates storage of a system template for the configuration of FIG. 27.

Next, the process also stores (at 2620) the links between the servers. The links are the information that enables the easy restoration at a later time of the entire server configuration in the same configuration as it was operating before. FIG. 28 conceptually illustrates storage of the system template 2800 for configuration 2725. System template 2800 is stored on a cloud storage cluster 2805 in some embodiments.

As illustrated, server images 2820-2830 for each of the servers 2720-2730 are stored on cloud storage cluster 2805, in addition to numerous other images. In some embodiments, server images 2820-2830 are stored in the same format as they would be if they were saved individually. That is, the server images are stored with checksums every unit (e.g., 1 Mb) and are compressed files. The configuration file 2815 for load balancer 2715 is also stored on the storage cluster 2805.

System template 2800 is a file that defines how the server images are connected; that is, system template 2800 defines the configuration of the server images. System template 2800 includes eight entries. The first four entries specify the various server images that make up the system template. The second four entries specify the connections between the virtual machine instantiations of these server images. The entries in system template 2800 specify connections between the load balancer and the two web servers and connections between the two web servers and the database server. Some embodiments include other information as well, such as the percentages of traffic being sent from the load balancer to each of the web servers, information about configuration file values for the various servers, etc.

The system templates are different types of files in different embodiments. In some embodiments, system templates are stored as XML files or other in other markup languages. In such embodiments, the reference to a web server image might be a tag "<webserver>" followed by an entry specifying the web server name, storage location, etc., and an end tag "</webserver>". References to other server images would be stored similarly. Connections would then be stored as a "<connection>" tag followed by an entry specifying two servers to connect and any properties of the connection and then an end tag "</connection>". One of ordinary skill will understand that these are merely examples of possible tags for a system template, and that other tags, forms of markup language, or storage formats could be used in different embodiments to define a server configuration such as system template 2800.

While the system template 2800 and its associated server images and configuration files 2815-2830 are stored on a single cloud storage cluster, in some embodiments the server images may be stored on a different storage cluster from the system template or even on different storage clusters from each other.

Figure 29:
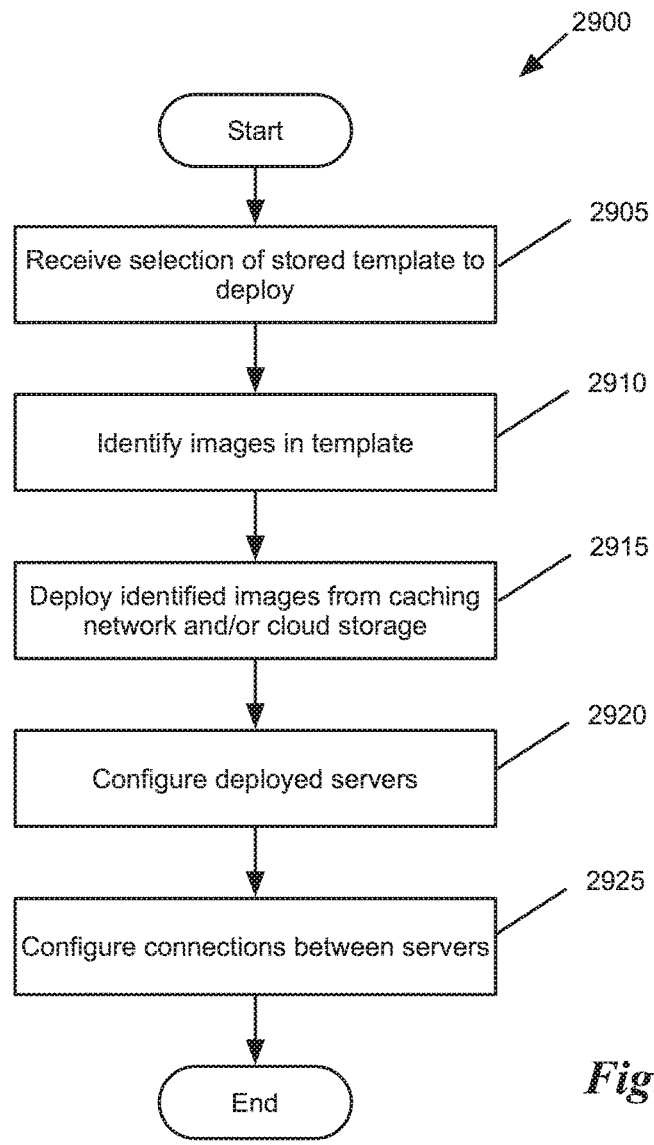
FIG. 29 conceptually illustrates a process of some embodiments for deploying a system template.

Much like individual server images, once system templates are saved they can then be deployed. To deploy a system template, some embodiments deploy each of the server images referenced in the template and then set up the configuration of the server images. FIG. 29 conceptually illustrates a process 2900 of some embodiments for deploying such a system template. In some embodiments, process 2900 is performed on a storage and hosting system such as system 500 of FIG. 5.

As shown, the process begins by receiving (at 2905) a selection of a stored template to deploy. This selection is received from a user through a user interface in some embodiments. Much like the graphical user interface of FIG. 27 that enables a user to save a system template, some embodiments present the user with a graphical user interface that lists their saved templates and allows the user to choose any of them for deployment. Some embodiments also list public templates. Public templates are created by other users and shared for public use, in some cases for a fee. The fee may go to either the user who created the template, the owners of the hosting and storage system, or both.

Once the system template selection is received from the user, the process identifies (at 2910) the server images referenced in the system template. In some embodiments, this is performed by a module such as system management module 540. When the system template is stored as a markup language file, a parser (e.g., an XML parser) on the system management module reads the markup language file to identify the server images.

This may also involve identifying a hardware node for each server image specified by the system template. Different hardware nodes may be identified for the various server images specified by the system template. That is, the server images may not all be deployed on the same hardware node. In some embodiments, specific hardware is used for load balancer virtual machines, and therefore when the system template specifies a load balancer in addition to other servers it is not possible for all of the server images to be deployed on the same hardware node. However, multiple web servers may be deployed on one hardware node. In the case in which multiple server farms at different geographic locations are used in the hosting and storage system, some embodiments preferentially assign all of the server images to the same geographic location.

Process 2900 then deploys (at 2915) the identified server images. In some embodiments, process 1600 is performed for each of the identified server images by the utility management module on the hardware node identified for the server image. That is, the utility management module allocates hardware for the server image, retrieves the server image, verifies the integrity of the server image data, and lays down the data on the disk volume. Process 2900 also configures (at 2920) the deployed servers. That is, the system-specific information is configured on the virtual machines and the paravirtualization drivers are installed as described above in Section III.

Next, the process configures (at 2925) connections between the installed servers. In the example of system template 2800, the connections between the load balancer and the two web servers would be configured, as well as the connections between the two web servers and the database server. The IP addresses of the virtual servers are known to the system management module in some embodiments, thereby making it easy for this information to be sent to the necessary servers (e.g., giving the IP addresses of the web servers to the load balancer).

As mentioned, in some embodiments a user has the ability to choose from a number of system templates. These system templates may be server configurations saved by the user themselves or by other users that have made their system templates public. Some embodiments present the user with a list of their system templates and an option for each of the templates to make that template public. Similarly, a user's server images may be made public in some embodiments. For each server image a user has saved, an option is presented in the GUI that allows the user to make the server image public.

Different embodiments handle the public server images and system templates differently. In some embodiments, the user that saves the server image or system template assigns a cost for another user to deploy the server image or system template. Other embodiments use a fixed cost or make the public server images and system templates available for free. The payment for the server image or system template (separate from any costs of deploying and operating the virtual machines on the hosting system) is either given to the user that designed the server image or system template and made it public, the owners of the hosting and storage system, or is split between the two.

Some embodiments present a user with an option to select public server images or system templates in the GUI. Referring to FIGS. 18-34, when a user selects a GUI item for adding an image, some embodiments present an item in the GUI that the user can select to view public server images and/or system templates. When this option is selected, in addition to the user's own server images and/or system templates, the public server images and system templates will be made available. The user can search through the individual server images by size, operating system, server type, applications, etc. Similarly, the user can search through the system templates based on parameters such as the number of each type of server, the parameters of the individual servers (size, operating system, etc.), and other differentiators.

VI. Server Images in Other Environments

In some embodiments, a server image saved from a virtual machine in a hosting system (as described above in Section II) may be used as a dedicated physical machine in the hosting system or as a physical or virtual machine outside the hosting system. For example, a server image could be ported to a second, different hosting system, to a user's personal computer without virtualization, etc.

Because the server image is simply a file, that file may be downloaded to a user's personal data storage (e.g., a hard drive, removable flash memory, etc.). Some embodiments provide the user with an export option in the GUI for the user's own server images, though not for any public server images that are available to the user. The export option enables the user to receive the server image file, either via e-mail, download to the device with which the user has logged into the hosting and storage system, or other electronic file transfer. Further options can include placing the server image on a removable medium such as a CD or DVD and mailing the medium to the user.

In some embodiments, once the user has possession of the server image, the server image may be used on any computer, including those outside the hosting system in which it was created. For instance, the user could have an account on a different hosting system, with a structure that could be either similar to or different from hosting and storage system 500. If the second hosting system provides the functionalities described above in Section III for deploying a virtual machine from a server image, then the user would be able to deploy a virtual machine on the second hosting system based on the server image saved from the first hosting system.

For the second hosting system to be able to deploy the server image as a virtual machine, the system would require the ability to decompress and read the file created by the first hosting system. The second hosting system would need to be able to identify the checksums, recalculate the checksums, and identify the necessary installation processes such as configuring the system-specific information, installing the paravirtualization drivers, etc. Some embodiments of the hosting system that creates the server image, however, use a proprietary compression algorithm and/or checksum format that prevents the user of a server image outside of the hosting system.

As mentioned, in some embodiments a user can use the server image file to install a server on a physical device (e.g., a personal computer) without virtualization. To do this, the server will need to be adapted to run directly on the hardware of the device rather than as a virtual machine through a hypervisor. As the server image of some embodiments has no reference to a hypervisor, adapting the server to run directly on device hardware may involve installing drivers designed for such "bare metal" installations rather than paravirtualization drivers.

Figure 30:
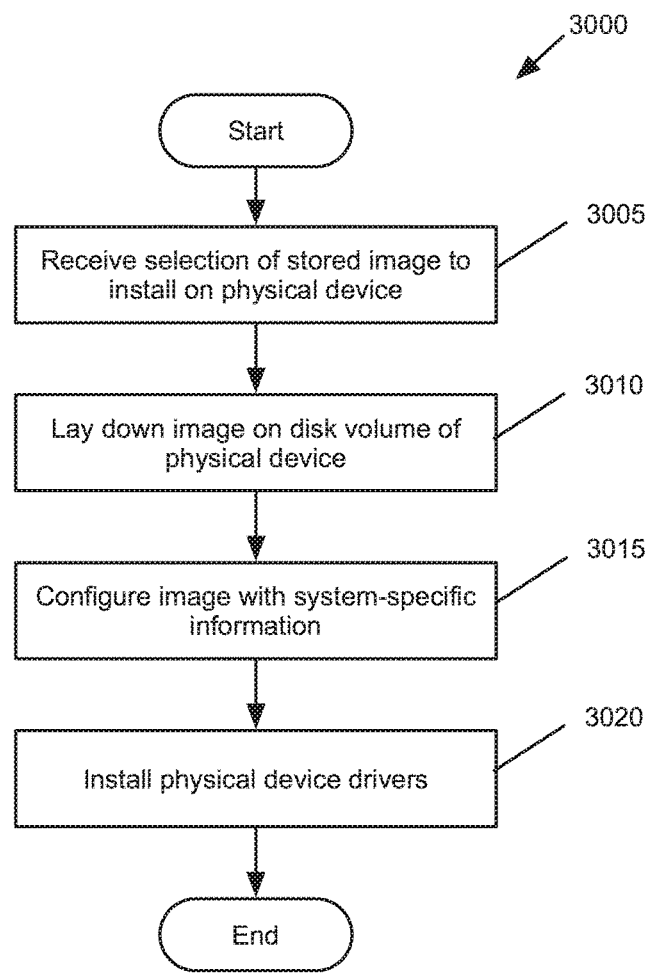
FIG. 30 conceptually illustrates a process of some embodiments for installing a server on a physical device without virtualization.

FIG. 30 conceptually illustrates a process 3000 of some embodiments for installing a server on a physical device without virtualization. In some embodiments, process 3000 is performed by a module or application on a device external to the physical device on which the server is installed. Furthermore, the process can be performed in the context of a hosting and storage system similar to that illustrated in FIG. 5. The server image would be deployed directly on a hardware node without a hypervisor or utility management module. Because there is no utility management module to perform the deployment operations when the image is being loaded as a physical machine with no hypervisor, in some embodiments the system management module performs the deployment operations that would normally be performed by the utility management module.

As shown, process 3000 begins by receiving (at 3005) a selection of a stored server image to install on the physical device. This may be received through a user of a first device selecting a server image through a graphical user interface of a first device (e.g., selecting a file stored on a removable flash drive, a CD, etc.) that is connected to the physical device and then selecting the physical device as a location to deploy the server image.

Next, the process lays down (at 3010) the server image on the disk volume of the physical device. As there is no virtualization, the disk volume is the entire hard drive of the physical device in some embodiments. In some embodiments, the first device includes an application that performs the functions of a utility management module for installing the server image. This application attaches to the disk volume of the physical device and lays down the bits of the server image on the disk volume. In some embodiments, the application also performs integrity-checking by verifying the checksums that are part of the server image file. When the server image data is corrupted, some embodiments will not install the server image unless an original copy of the image can be retrieved.

Once the server image data is installed on the physical device, process 3000 configures (at 3015) the installed image with system-specific information. In some embodiments, this is the same system-specific information as would be configured were the image installed as a virtual machine in a hosting system. For instance, in some embodiments, when the virtual machine is a server running the Microsoft® Windows® operating system, the system-specific information includes the Windows Security Identifier (SID), network configurations, and desktop and administrator profiles. In some embodiments, when the virtual machine is a server running the Linux® operating system, the system-specific information includes any unique identifiers (e.g., a RHEL registration ID, etc.), log files, and history files. Different embodiments will include different information, both the above-listed information as well as other information that is not listed, in the system-specific information.

The process also installs (at 3020) physical device drivers on the laid-down image. As opposed to paravirtualization drivers, the physical device drivers are designed for the operating system to interface directly with the hardware, without a hypervisor in between. Because the operating system of the image is the only one running on the device, no hardware resources need to be shared with any other operating system. One of ordinary skill in the art will recognize that in some embodiments operations 3015 and 3020 will not necessarily be performed in the order shown in process 3000. Some embodiments will perform these operations in the opposite order, or will perform both simultaneously Some embodiments also enable a user to save a system running directly on a physical device as a server image that can be deployed as a virtual machine in a hosting and storage system such as that shown in FIG. 5. In fact, FIG. 31 conceptually illustrates that a server image 3100 can be used to easily transfer a system configuration 3105 between a physical machine 3110 (e.g., a user's personal computing device, a hardware node in a hardware grid, etc.) and a virtual machine 3115 operating on a hardware node 3120 (e.g., a hardware node in a hardware grid).

As illustrated, system configuration 3105 runs on the hardware 3125 of physical machine 3110 using device drivers 3130. In some embodiments, device drivers 3130 are part of the kernel of the machine 3110. Using a process or processes similar to portions of processes 700 and 900, the system configuration 3105 can be stored as server image 3100. A device attached to physical machine 3110 can be used to remove the device drivers 3130 and any system-specific information from configuration 3105, and then store the system configuration 3105 as server image 3105. This device can also calculate and attach checksums for each unit (e.g., 1 Mb) of the system configuration 3105 as well as compress the server image 3100 in some embodiments. The device may be another physical machine with an application that performs the extraction and compression of the system configuration, may be a virtual machine, or may be a module that is part of a hosting and storage system (e.g., the system management module). As such, when extracted, server image 3100 may be stored on the physical machine that performed the extraction, on a different machine, or in a hosting and storage system as described above in Section IV.

The server image 3100 can then be deployed as a virtual machine on hardware node 3120. As illustrated, node 3120 includes hardware resources 3135, hypervisor 3140, and utility management module 3145. The node 3120 may be the same as node 600 or node 1500, with multiple virtual machines including UVM 3145 sharing hardware resources 3135 through hypervisor 3140. Through a process such as shown in FIG. 16, the server image 3100 is laid down on node 3120. The virtual machine 3115 has the same system configuration 3105 as did physical machine 3110. However, paravirtualization drivers 3150 are swapped in for the device drivers 3130 during the deployment process.

Figure 31:
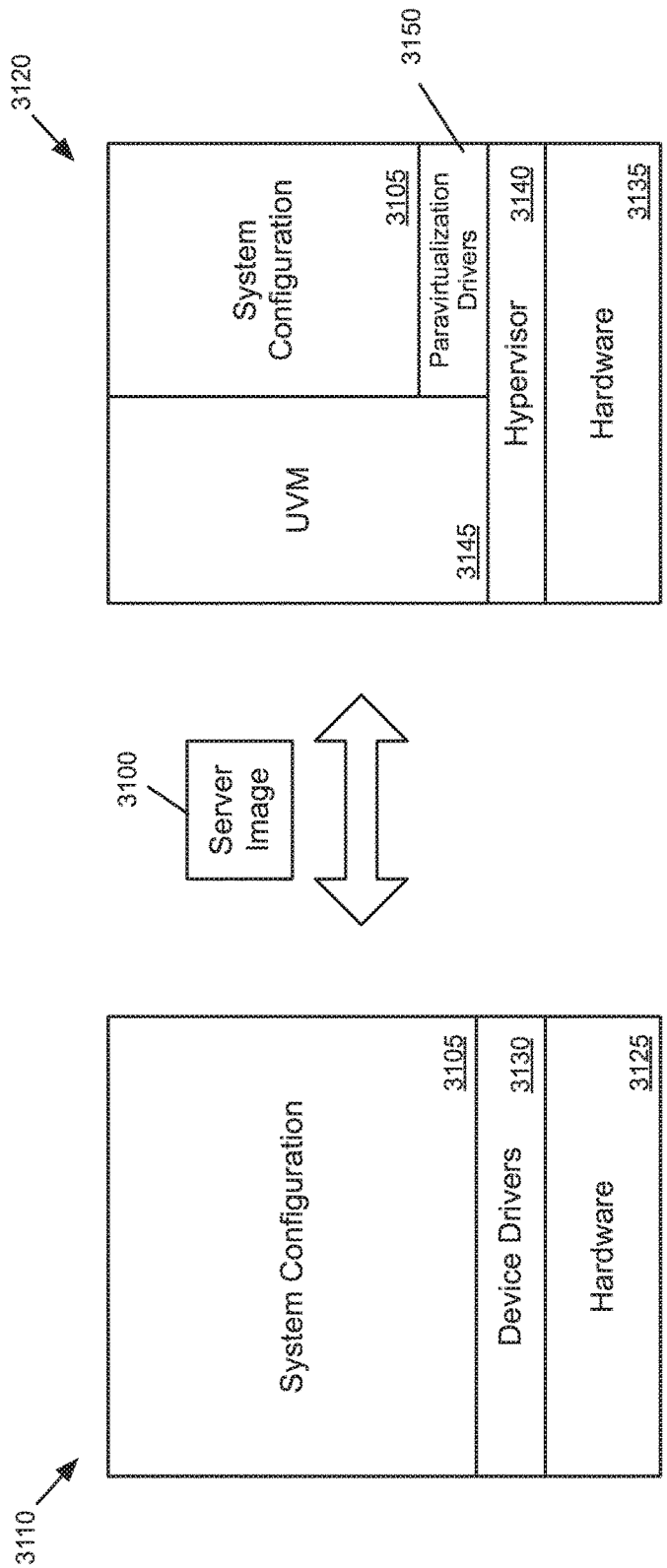
FIG. 31 conceptually illustrates that a server image can be used to easily transfer a system configuration between a physical machine and a virtual machine operating on a hardware node (e.g., a hardware node in a hardware grid).

Similarly, as described above by reference to process 3000 of FIG. 30 and illustrated in FIG. 31, a system configuration of a virtual machine can be saved as a server image and then installed on a physical device. System configuration 3105 can be saved off of hardware node 3120 via processes 700 and 900. The server image 3100 can then be used to install system configuration 3105 on physical machine 3110. In this case the paravirtualization drivers 3150 are swapped out for device drivers 3130, allowing the system configuration 3105 to interact directly with the hardware 3125 of physical machine 3110.

In addition to moving a system configuration from a physical machine to a virtual machine, a virtual machine to a physical machine, or from a virtual machine in one hosting system to another, the server images described above may also be used to move a system configuration from one physical machine to another. This requires a first device that attaches to a first physical machine is capable of extracting the configuration and storing the server image and a second device that attaches to the second physical machine is capable of laying down and deploying the system configuration on the second physical machine. Transferring a system configuration from a first physical machine to a second physical machine enables a computer user who purchases a better machine, but likes the setup of their current machine, to easily set up the same configuration (operating system, applications, etc.) on the newer, better machine.

VII. Pre-Configured Disk Volumes and Virtual Machines

When a user requests to have a virtual server deployed in a hosting and storage system such as that of FIG. 5, a number of operations must be performed before the virtual server is actually operational for use. The system management module assigns the virtual server to a particular hardware node, then a disk volume is built on the hardware node, and then the virtual server may be deployed. The virtual server may be deployed from a server image, as described in detail in Section III, or may be deployed without such a server image as described in U.S. patent application Ser. No. 12/421,597, filed Apr. 9, 2009 and titled "System and Method for Automated Allocation of Hosting Resources Controlled by Different Hypervisors", which is incorporated herein by reference.

Each of these processes takes time, such that there is a delay from the time the user submits a request through the GUI to deploy a server to the time that the server is actually operational. Some embodiments, though, perform one or more of these operations in advance, such that when the user requests for a server to be deployed, the server is operational more quickly. For example, some embodiments maintain a baseline level of pre-built disk volumes within the hardware grid of the hosting system. Furthermore, some embodiments also maintain a number of pre-configured virtual machines for popular servers.

Figure 32:
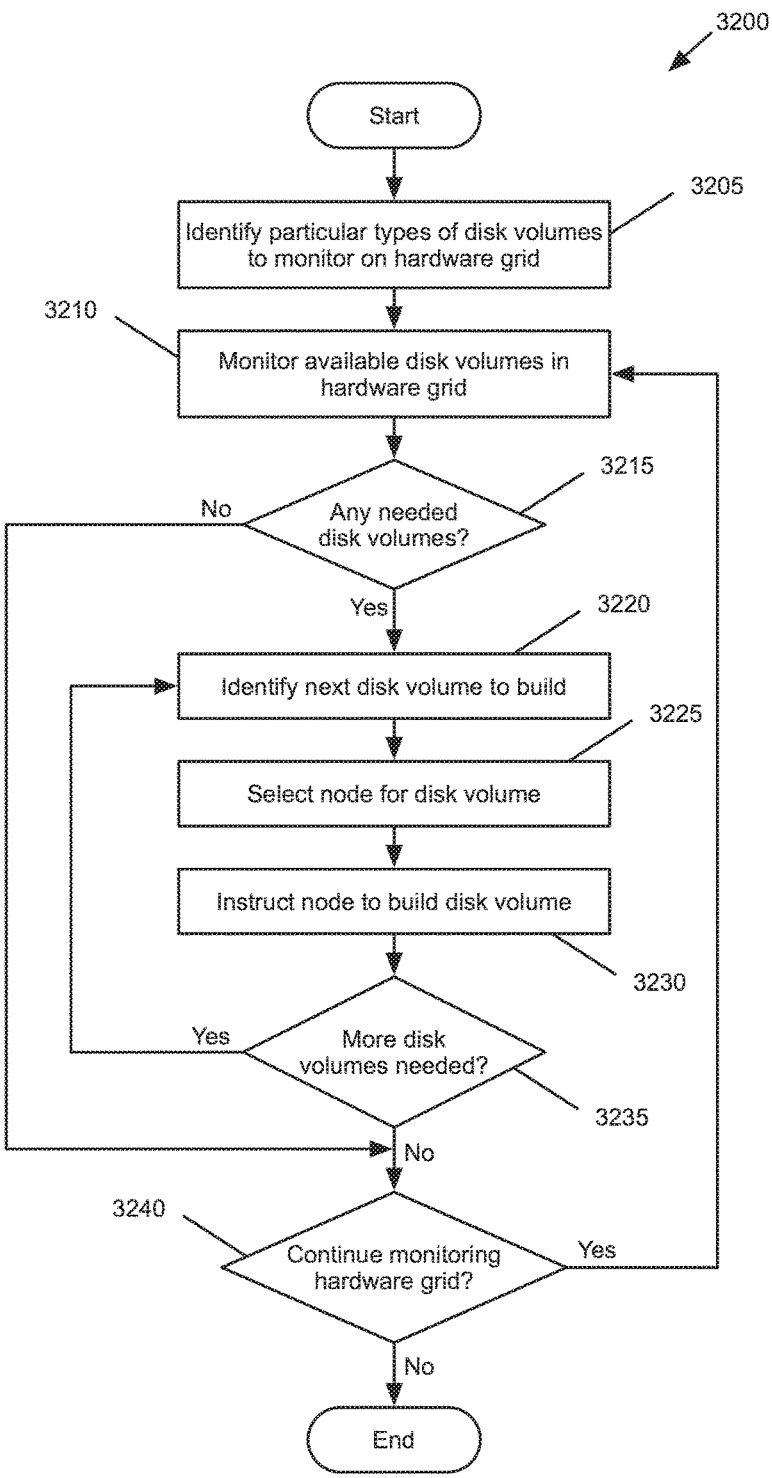
FIG. 32 conceptually illustrates a process of some embodiments for monitoring a hosting system and pre-building disk volumes on nodes within the hosting system.

FIG. 32 conceptually illustrates a process 3200 of some embodiments for monitoring a hosting system and pre-building disk volumes on nodes within the hosting system. In some embodiments, process 3200 is performed by a system management module such as module 540 of FIG. 5. In other embodiments, a separate module in the hosting system monitors the hardware grid and identifies disk volumes to be pre-built on hardware nodes.

As shown, process 3200 begins by identifying (at 3205) particular types of disk volumes to monitor on the hardware grid. The different types of disk volumes to monitor might be specified by an administrator of the hosting system, determined based on an algorithm identifying the most popular types of disk volume used in the hosting system, or in some other fashion. The different types of disk volumes are different sizes (e.g., 20 Gb, 50 Gb, 100 Gb, etc.) in some embodiments. Some hosting systems offer numerous sizes for virtual servers, and when a particular size is identified as especially popular size (either by an administrator or a monitoring module), the particular size might be identified by monitoring. The different types of disk volumes might also be disk volumes on different hardware. For instance, some hosting systems use different hardware for different types of virtual servers (e.g., load balancers, web servers, database servers, etc.), and only pre-build disk volumes for some of these types of virtual servers.

Next, the process monitors (at 3210) the available disk volumes in the hardware grid. In some embodiments, the monitoring module (either the system management module or a separate module) regularly polls the hardware nodes to identify whether the nodes have any pre-built disk volumes. In other embodiments, the monitoring module keeps track of each of the pre-built disk volumes based on instructions that have been sent to the nodes. The monitoring module keeps track of how many disk volumes have been built and whether virtual machines have been deployed on the disk volumes. This information may be stored in a database such as back-end database 550 of hosting system 500 or may be stored in memory accessed by the monitoring module in some embodiments. The process may monitor the available disk volumes continuously or at regular intervals.

Process 3200 then determines (at 3215) whether there are any disk volumes that need to be built. This determination is made based on the monitoring performed at 3210. When the number of pre-built disk volumes of a particular type (e.g., size) on the hardware grid falls below a particular threshold, the process determines that one or more disk volumes are needed. When no new disk volumes are needed, the process proceeds to 3240, which is described below.

Otherwise, the process determines that at least one new disk volume should be built, and identifies (at 3220) the next disk volume to build. When there are numerous disk volumes to be built on the hardware grid, some embodiments determine the order in which they should be built randomly. Other embodiments identify which type (e.g., size) of disk volume is most lacking in the grid and have that type built first.

Next, process 3200 selects (at 3225) a hardware node for the identified disk volume. In some embodiments, this selection is performed by the system management module 570 or a separate scheduling module, as described above in Section I. The optimization algorithm is not as complex as for scheduling a virtual server deployment in some embodiments, because for the virtual server its interactions with other virtual servers must be taken into account in determining a hardware node, especially when there are multiple server farms in different locations. On the other hand, a pre-built disk volume does not interact with anything. When there are multiple server farms in different locations, though, some embodiments do take into account which of the different locations is lacking in pre-built volumes of the identified type.

Once the hardware node is identified, the process instructs (at 3230) the selected hardware node to build the identified disk volume. This is sent as an instruction directly to the node in some embodiments. Other embodiments send the instruction to the utility management module on the node or to the hypervisor on the node to have the disk volume built. In some embodiments, the utility management module accesses the hardware resources of the node through the hypervisor in order to build the disk volume.

Once the instructions have been sent to the node to allocate the disk volume, the process determines (at 3235) whether any more disk volumes need to be built at the moment. When more disk volumes have been identified, the process returns to 3220 to identify the next disk volume that should be built. Otherwise, the process determines (at 3240) whether to continue monitoring the hardware grid. Some embodiments continue monitoring the grid at all times, unless the hosting system is shut off. When the process determines to continue monitoring the grid, it returns to 3210, described above. Once the grid no longer need be monitored, the process ends.

Figure 33:
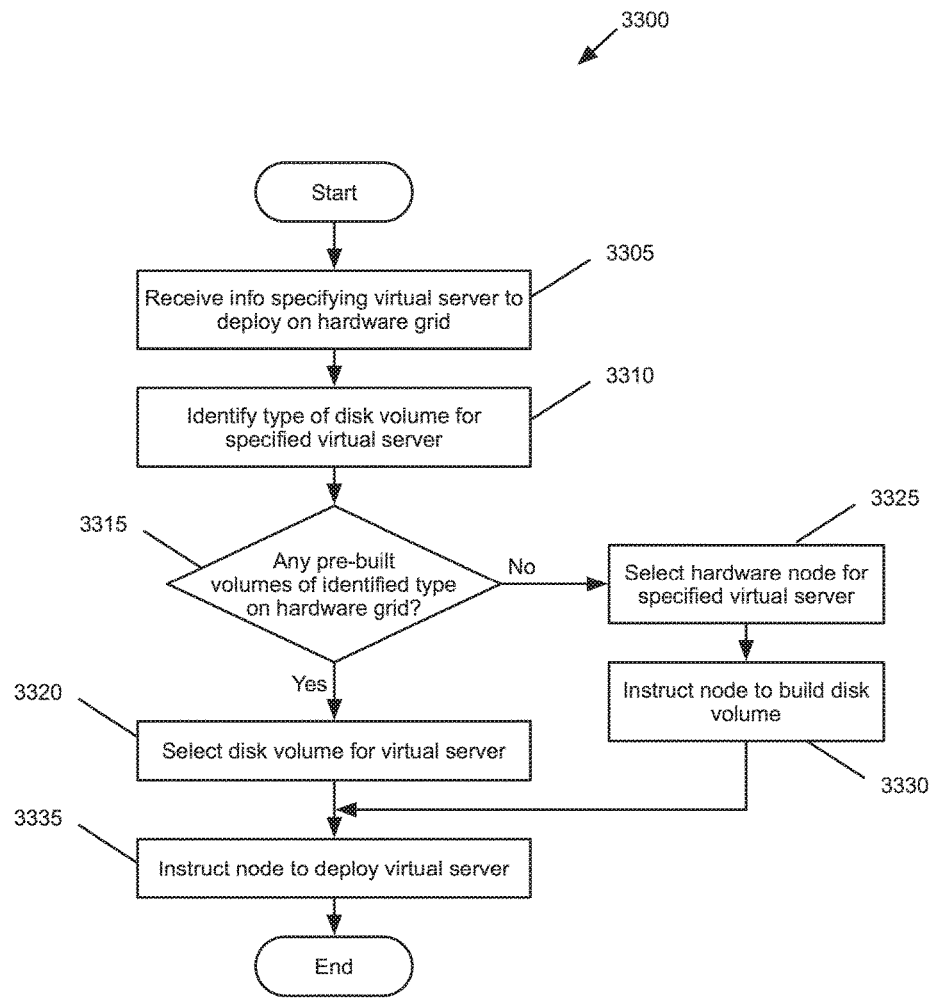
FIG. 33 conceptually illustrates a process of some embodiments for deploying a virtual server in a hardware grid that uses pre-built disk volumes.

As mentioned above, pre-building disk volumes helps cut down on the time required to deploy a virtual machine, whether from a saved pre-configured server image as described in Section III or a blank image. FIG. 33 conceptually illustrates a process 3300 of some embodiments for deploying a virtual server in a hardware grid that uses pre-built disk volumes. Like process 3200, process 3300 is performed by a system management module in some embodiments.

As shown, the process begins by receiving (at 3305) information specifying a virtual server to deploy on the hardware grid. In some embodiments, this information is received from a user interacting with a user interface. The user instructions to deploy a virtual server are sent through the user interface to front-end architecture such as provisioning manager 520 and RMS module 530 of FIG. 5. In turn, the RMS module passes the instructions to the system management module 540 so that the system management module can handle the deployment.

Next, the process identifies (at 3310) the type of the disk volume needed for the specified virtual server. In some embodiments, this is simply the size of the disk volume specified by the user for the virtual server (e.g., 20 Gb, 50 Gb, etc.). In other embodiments, however, the type of disk volume may also include a particular type of hardware that is dependent on either the type of virtual sever (load balancer, web server, database server, etc.) or the specified operating system (Windows®, Linux®, etc.).

Process 3300 then determines (at 3315) whether there are any disk volumes of the identified type pre-built on the hardware grid already. In some embodiments, the process polls the various hardware nodes to look for pre-built disk volumes. In other embodiments, as described above, the back-end storage 550 or a comparable storage stores a running list of all of the pre-built disk volumes. In such embodiments, the process consults this list to identify whether the needed volume already exists in the hardware grid.

When the needed disk volume already exists, the process selects (at 3320) a disk volume for the specified virtual server. When multiple pre-built disk volumes are available for a particular virtual server, some embodiments perform an optimization process to identify the optimal node on which to deploy the specified virtual server. This optimization process is similar to the process used to determine on which node to deploy a virtual server when disk volumes are not pre-built. However, in the case of pre-built disk volumes, there will be less possible nodes to choose from as most likely not every single node in the grid will have the desired type of disk volume pre-built.

On the other hand, when there are no pre-built disk volumes of the needed type in the hardware grid, the process selects (at 3325) a hardware node for the specified virtual server. Some embodiments perform an optimization process as mentioned in Section I and described in further detail in U.S. patent application Ser. No. 12/421,597, filed Apr. 9, 2009 and titled "System and Method for Automated Allocation of Hosting Resources Controlled by Different Hypervisors", which is incorporated herein by reference.

Once the hardware node is selected, the process instructs (at 3330) the node to build the desired disk volume. This is sent as an instruction directly to the node in some embodiments. Other embodiments send the instruction to the utility management module on the node or to the hypervisor on the node to have the disk volume built. In some embodiments, the utility management module accesses the hardware resources of the node through the hypervisor in order to build the disk volume.

Next, the process instructs (at 1235) the node to deploy the virtual server. In some embodiments, this instruction is sent to the utility management module. The utility management module then retrieves a pre-configured saved server image from the caching network or permanent storage if the specified virtual server is to be deployed from such a server image. The process then ends.

In addition to pre-building disk volumes, some embodiments pre-deploy popular virtual servers in the hardware grid. This saves even more time than the pre-built disk volumes, because when a user selects a virtual server for deployment the virtual server need only be configured for the user's IP address and other such configuration settings. The disk volume need not be built and the operating system and other applications need not be installed.

Figure 34:
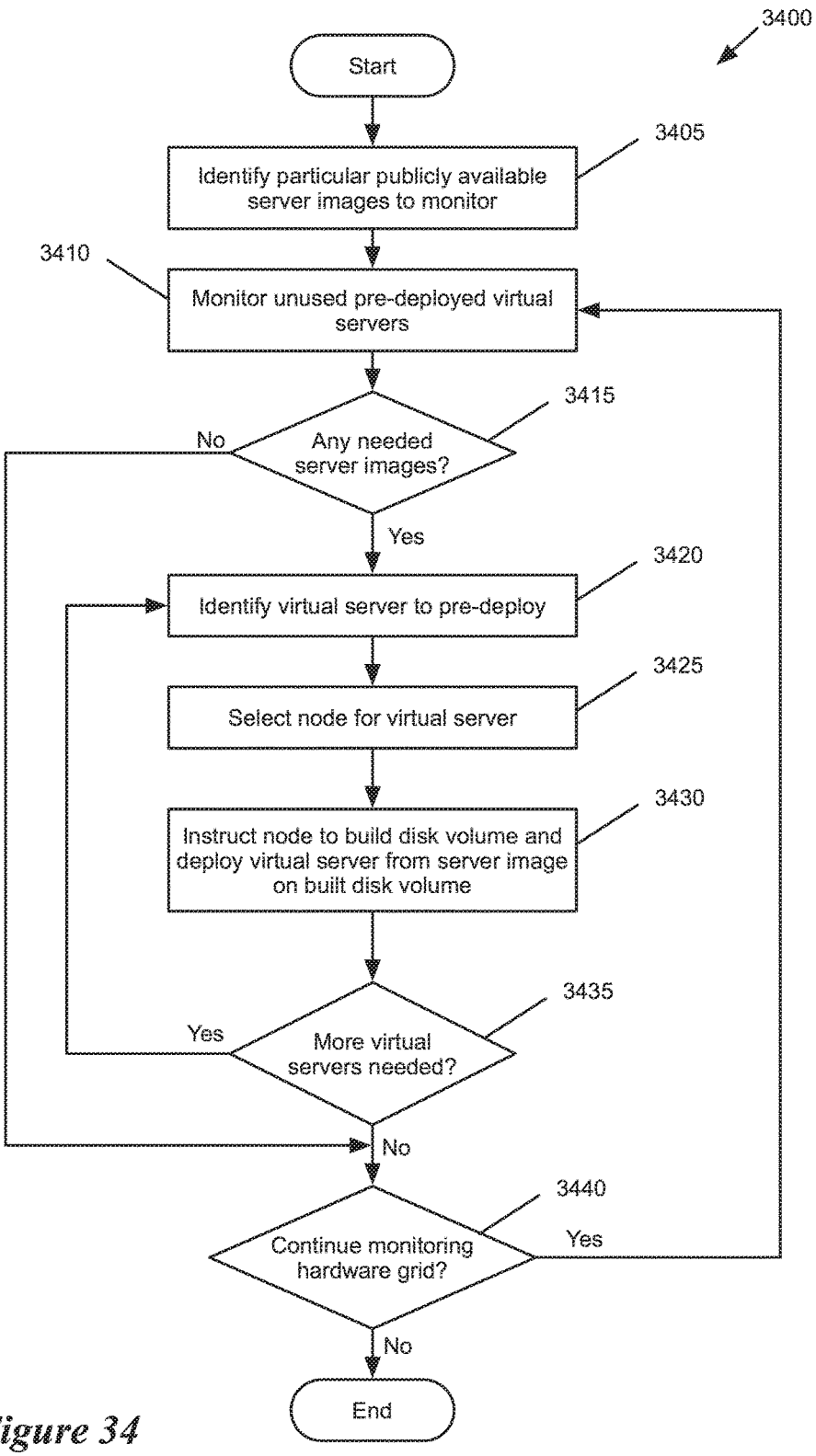
FIG. 34 conceptually illustrates a process of some embodiments for pre-installing virtual servers on a hardware grid.

FIG. 34 conceptually illustrates a process 3400 of some embodiments for pre-installing virtual servers on a hardware grid. As with process 3200, process 3400 may be performed by a system management module or by a separate monitoring module of a hosting system such as is illustrated in FIG. 5.

As shown, process 3400 begins by identifying (at 3405) particular publicly available server images to monitor. The different server images to monitor might be specified by an administrator of the hosting system, determined by a module that identifies the most commonly used server images in the hosting system, or in some other fashion. In some embodiments, the different server images will include web servers, database servers, load balancers, etc.

Next, the process monitors (at 3410) the unused pre-deployed server images in the hardware grid. In some embodiments, the monitoring module (either the system management module or a separate module) regularly polls the hardware nodes to identify whether the nodes have any deployed but unused virtual servers. In other embodiments, the monitoring module keeps track of each of the deployed unused virtual servers based on instructions that have been sent to the nodes. The monitoring module keeps track of how many virtual servers have been deployed and whether those virtual servers were assigned to a user. This information may be stored in a database such as back-end database 550 of hosting system 500 or may be stored in memory accessed by the monitoring module in some embodiments. The process may monitor the available deployed virtual servers continuously or at regular intervals.

Process 3400 then determines (at 3415) whether there are any virtual servers that need to be deployed on the hardware grid from server images. This determination is made based on the monitoring performed at 3410. When the number of unused deployed virtual servers from a particular server image falls below a particular threshold, the process determines that one or more virtual servers need to be deployed from the server image. When no new virtual servers are needed, the process proceeds to 3440, which is described below.

Otherwise, the process determines that at least one virtual server should be deployed, and identifies (at 3420) the next server image that should be deployed as a virtual server. When there are numerous server images that need to be deployed, some embodiments determine the order in which they should be deployed randomly. Other embodiments identify which server image is most lacking in the grid and deploy that image first.

Next, process 3400 selects (at 3425) a hardware node for the identified disk volume. In some embodiments, this selection is performed by the system management module 570 or a separate scheduling module, as described above in Section I. The optimization algorithm is not as complex as for scheduling a virtual server deployment for a particular user in some embodiments, because for a virtual server configured for a particular user, its interactions with other virtual servers must be taken into account in determining a hardware node, especially when there are multiple server farms in different locations. On the other hand, a pre-deployed virtual server does not interact with anything, as it is not yet up and running. When there are multiple server farms in different locations, though, some embodiments do take into account which of the different locations is lacking in pre-deployed virtual servers for the particular server image.

Once the hardware node is identified, the process instructs (at 3430) the node to build a disk volume and deploy the virtual server form the server image on the built disk volume. In some embodiments, this is simply an instruction to deploy the virtual server along with information about the virtual server. From the disk size information, the node will then build the disk volume. In some embodiments, these instructions are sent directly to the node. Other embodiments sent the instructions to the utility management module on the node or to the hypervisor on the node. In some embodiments, once instructed, the utility management module performs most of process 1600 to build the disk volume, retrieve the specified server image, and deploy the server image on the disk volume.

Once the instructions have been sent to the node to retrieve and deploy the server image, the process determines (at 3435) whether any more virtual servers need to be deployed at the moment. When more virtual servers need to be deployed, the process returns to 3420 to identify the next server image for deployment. Otherwise, the process determines (at 3440) whether to continue monitoring the hardware grid. Some embodiments continue monitoring the grid at all times, unless the hosting system is shut off. When the process determines to continue monitoring the grid, it returns to 3410, described above. Once the grid no longer need be monitored, the process ends.

Figure 35:
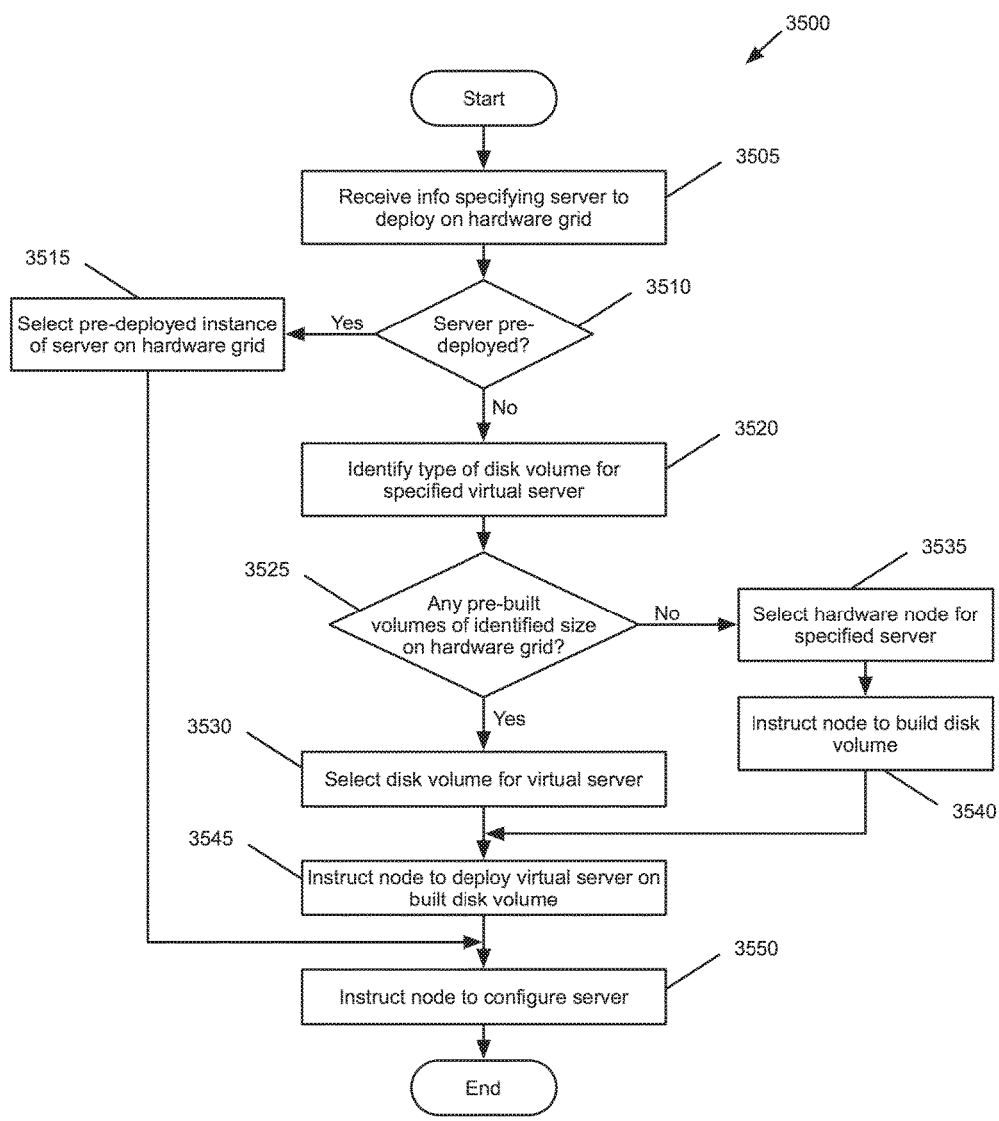
FIG. 35 conceptually illustrates a process of some embodiments for deploying a virtual server in a hardware grid that uses pre-deployed servers and pre-built disk volumes.

As mentioned, pre-deploying the server images as virtual servers that are not yet configured for a particular user helps cut down on the time required to deploy a virtual server when a user requests the server. FIG. 35 conceptually illustrates a process 3500 of some embodiments for deploying a virtual server in a hardware grid that uses pre-deployed servers and pre-built disk volumes. Some embodiments will use pre-built disk volumes for virtual servers that are not deployed from previously saved server images. Like process 3400, process 3500 is performed by a system management module in some embodiments.

As shown, the process begins by receiving (at 3505) information specifying a virtual server to deploy on the hardware grid. In some embodiments, this information is received from a user interacting with a user interface. The user instructions deploy a virtual server are sent through the user interface to front-end architecture such as provisioning manager 520 and RMS module 530 of FIG. 5. In turn, the RMS module passes the instructions to the system management module 540 so that the system management module can handle the deployment.

Next, the process determines (at 3510) whether the desired virtual server already exists pre-deployed in the hardware grid. In some embodiments, virtual servers are only pre-deployed when the user requests a virtual server from a publicly available pre-configured server image. When the user has not specified a publicly available server image for deployment, then the desired virtual server will not already exist in the hardware grid. In some cases, not all publicly available server images will be pre-deployed. When the requested virtual server is one that might be pre-deployed in the grid, some embodiments poll the various hardware nodes to look for the pre-deployed server. In other embodiments, as described above, the back-end storage 550 or a comparable storage stores a running list of all of the pre-deployed virtual servers. In such embodiments, the process consults this list to identify whether the needed server already exists in the hardware grid.

When the requested virtual server is pre-deployed in the hardware grid, the process selects (at 3515) one of the pre-deployed instances of the requested virtual server. When there is more than one instance, some embodiments perform an optimization process based on the currently-used resources, the other virtual servers with which the presently requested virtual server will interact, etc. The process then selects the optimal instance of the virtual server for configuration for the requesting user. The process then proceeds to 3550, described below.

When the requested server is not already deployed, the process identifies (at 3520) the type of the disk volume needed for the specified virtual server. In some embodiments, this is simply the size of the disk volume specified by the user for the virtual server (e.g., 20 Gb, 50 Gb, etc.). In other embodiments, however, the type of disk volume may also include a particular type of hardware that is dependent on either the type of virtual sever (load balancer, web server, database server, etc.) or the specified operating system (Windows®, Linux®, etc.).

Process 3500 then determines (at 3525) whether there are any disk volumes of the identified type pre-built on the hardware grid already. In some embodiments, the process polls the various hardware nodes to look for pre-built disk volumes. In other embodiments, as described above, the back-end storage 550 or a comparable storage stores a running list of all of the pre-built disk volumes. In such embodiments, the process consults this list to identify whether the needed volume already exists in the hardware grid.

When the needed disk volume already exists, the process selects (at 3530) a disk volume for the specified virtual server. When multiple pre-built disk volumes are available for a particular virtual server, some embodiments perform an optimization process to identify the optimal node on which to deploy the specified virtual server. This optimization process is similar to the process used to determine on which node to deploy a virtual server when disk volumes are not pre-built. However, in the case of pre-built disk volumes, there will be less possible nodes to choose from as most likely not every single node in the grid will have the desired type of disk volume pre-built.

On the other hand, when there are no pre-built disk volumes of the needed type in the hardware grid, the process selects (at 3535) a hardware node for the specified virtual server. Some embodiments perform an optimization process as mentioned in Section I and described in further detail in U.S. patent application Ser. No. 12/421,597, filed Apr. 9, 2009 and titled "System and Method for Automated Allocation of Hosting Resources Controlled by Different Hypervisors", which is incorporated herein by reference.

Once the hardware node is selected, the process instructs (at 3540) the node to build the desired disk volume. This is sent as an instruction directly to the node in some embodiments. Other embodiments send the instruction to the utility management module on the node or to the hypervisor on the node to have the disk volume built. In some embodiments, the utility management module accesses the hardware resources of the node through the hypervisor in order to build the disk volume.

Next, the process instructs (at 3545) the node on which the disk volume is now built to deploy the virtual server on the built disk volume. When the requested virtual server is deployed from a server image, portions of process 1600 are performed by the utility management module to retrieve the requested server image from storage and deploy the server image on the disk volume.

The process then instructs the node to configure the virtual server for the user. In some embodiments, this includes installing updated paravirtualization drivers and system-specific information. The system-specific information, as described above, may vary depending on the operating system of the virtual server. For instance, in some embodiments, when the virtual machine is a server running the Microsoft® Windows® operating system, the system-specific information includes the Windows Security Identifier (SID), network configurations, and desktop and administrator profiles. In some embodiments, when the virtual machine is a server running the Linux® operating system, the system-specific information includes any unique identifiers (e.g., a RHEL registration ID, etc.), log files, and history files. Different embodiments will include different information, both the above-listed information as well as other information that is not listed, in the system-specific information that is removed from a virtual server before it is saved as a server image.

Though operations 3540, 3545, and 3550 are illustrated as different operations in FIG. 35, some embodiments only send one set of instructions to the node. When no disk volume is built, the instructions indicate for the utility management module to build the disk volume, retrieve the server image, deploy the server image, and configure the server for use. When the disk volume is built but there is no server pre-deployed, the instructions indicate for the utility management module to retrieve the server image, deploy it on the disk volume, and configure the server for use. When the server is pre-deployed, the instructions just indicate for the utility management module to configure the virtual server for use.

While pre-building disk volumes and pre-deploying virtual servers will generally help speed up the deployment process, in some situations the resources allocated to such a prebuilt volume or pre-deployed server will be needed for another server. For instance, a 20 Gb disk volume or pre-deployed server might be taking up resources that are needed for a 100 Gb server because a system management module determined that the node on which the 20 Gb disk volume is allocated is the optimal location for the 100 Gb virtual server. Some embodiments will thus remove such pre-built volumes when the resources are needed for a new server. The disk volume is de-allocated and if a server image had been pre-deployed on the disk volume then random data is written to the disk. The disk resources are now available for use by the new server.

VIII. Computer System

Many of the above-described processes and modules are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc.

In this specification, the term "software" is meant in its broadest sense. It can include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 36:
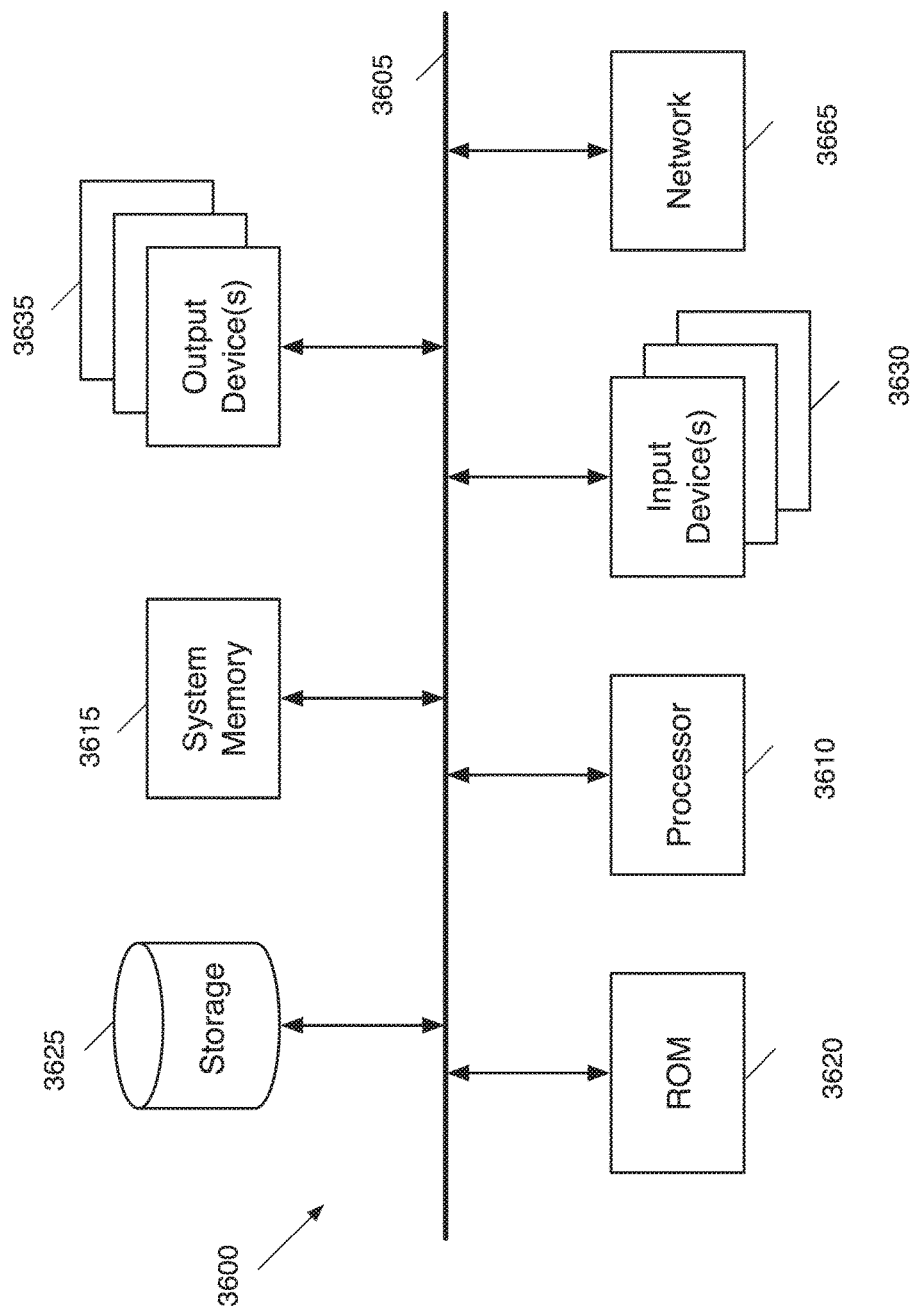
FIG. 36 illustrates a computer system with which some embodiments of the invention are implemented.

FIG. 36 illustrates a computer system with which some embodiments of the invention are implemented. Such a computer system includes various types of computer readable mediums and interfaces for various other types of computer readable mediums that implement the various processes and modules described above (e.g., hypervisor management module and utility management modules). Computer system 3600 includes a bus 3605, a processor 3610, a system memory 3615, a read-only memory 3620, a permanent storage device 3625, input devices 3630, and output devices 3635.

The bus 3605 collectively represents all system, peripheral, and chipset buses that communicatively connect the numerous internal devices of the computer system 3600. For instance, the bus 3605 communicatively connects the processor 3610 with the read-only memory 3620, the system memory 3615, and the permanent storage device 3625. From these various memory units, the processor 3610 retrieves instructions to execute and data to process in order to execute the processes of the invention. The processor 3610 is a processing device such as electronic circuitry.

The read-only-memory (ROM) 3620 stores static data and instructions that are needed by the processor 3610 and other modules of the computer system. The permanent storage device 3625, on the other hand, is a read-and-write memory device. This device is a non-volatile memory unit that stores instructions and data even when the computer system 3600 is off. Some embodiments of the invention use a mass-storage device (such as a magnetic or optical disk and its corresponding disk drive) as the permanent storage device 3625.

Other embodiments use a removable storage device (such as a floppy disk, flash drive, or ZIP® disk, and its corresponding disk drive) as the permanent storage device. Like the permanent storage device 3625, the system memory 3615 is a read-and-write memory device. However, unlike storage device 3625, the system memory is a volatile read-and-write memory, such a random access memory (RAM). The system memory stores some of the instructions and data that the processor needs at runtime. In some embodiments, the invention's processes are stored in the system memory 3615, the permanent storage device 3625, and/or the read-only memory 3620.

The bus 3605 also connects to the input and output devices 3630 and 3635. The input devices enable the user to communicate information and select commands to the computer system. The input devices 3630 include alphanumeric keyboards and pointing devices (also called "cursor control devices"). The input devices 3630 also include audio input devices (e.g., microphones, MIDI musical instruments, etc.). The output devices 3635 display images generated by the computer system. For instance, these devices display a GUI. The output devices include printers and display devices, such as cathode ray tubes (CRT) or liquid crystal displays (LCD).

Finally, as shown in FIG. 36, bus 3605 also couples computer 3600 to a network 3665 through a network adapter (not shown). In this manner, the computer can be a part of a network of computers (such as a local area network ("LAN"), a wide area network ("WAN"), or an Intranet, or a network of networks, such as the internet. For example, the computer 3600 may be coupled to a web server (network 3665) so that a web browser executing on the computer 3600 can interact with the web server as a user interacts with a GUI that operates in the web browser.

Any or all components of computer system 3600 may be used in conjunction with the invention. Though type 1 or type 2 hypervisors are shown in some of the various figures, it should be apparent to one of ordinary skill in the art that any type of hypervisor may operate with the various components of some embodiments, such as the system management module and the utility management module.

As mentioned above, the computer system 3100 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A hosting and storage system for hosting a plurality of virtual machine configurations and for storing images of the plurality virtual machine configurations, the system comprising:
    a plurality of nodes, wherein a first node of the plurality of nodes comprises resources for hosting a first virtual machine of the plurality of virtual machines; and
    a first utility management module operating using a first set of resources of the first node, wherein the first utility management module is configured to:
        receive first data that specifies a first computer system for operation as the first virtual machine on the first node along with a plurality of first checksums corresponding to the first data;
        verify the first data by calculating a plurality of second checksums and comparing the plurality of second checksums to the plurality of first checksums;
        copy the received first data to a first disk volume of the first node when the first data is verified; and
        configure the first computer system for operation as the first virtual machine.

2. The hosting and storage system of claim 1, further comprising a caching network for streaming the first data and the plurality of first checksums to the utility management module.

3. The hosting and storage system of claim 2, further comprising a permanent storage configured to receive and store the first data and the plurality of first checksums from the caching network.

4. The hosting and storage system of claim 3, wherein the first data and the plurality of first checksums are stored in the permanent storage as a single image file.

5. The hosting and storage system of claim 4, wherein the single image file is a compressed file.

6. The hosting and storage system of claim 4, wherein the single image file is retrieved in equally sized units by the caching network.

7. The hosting and storage system of claim 1, further comprising a system management module configured to determine on which of the plurality of nodes a specified virtual machine is deployed.

8. The hosting and storage system of claim 7, wherein the system management module is further configured to instruct the first utility management module to retrieve the first data and deploy the first computer system for operation as the first virtual machine.

9. The hosting and storage system of claim 7, wherein the system management module is further configured to:
    retrieve second data representing a second computer system from a storage, the second data previously generated from a second virtual machine hosted on a second node of the plurality of nodes;
    identify a physical device to directly host a non-virtualized instantiation of the second computer system, wherein the physical device is external to the hosting and storage system;
    copy the retrieved second data onto a second disk volume of the physical device to deploy the second computer system; and
    configure the second computer system for operation directly on hardware resources of the physical device.

10. The hosting and storage system of claim 9, wherein the second virtual machine is coupled to a hypervisor on the second node and the second computer system directly interfaces with hardware resources of the physical device.

11. The hosting and storage system of claim 10, wherein the second data that specifies the second computer system is part of a single image file that also includes a plurality of second third checksums for the second data.

12. The hosting and storage system of claim 11, wherein the plurality of third checksums are generated by a second utility management module operating on the second node.

13. The hosting and storage system of claim 12, wherein the second utility management module on the second node is further configured to generate the second data from the second virtual machine after system-specific information of the second virtual machine is removed from the second virtual machine.

14. The hosting and storage system of claim 13, wherein the system-specific information comprises at least one of a system identifier, a log file, a history file, an IP address, a network configuration, an administrator profile, or a registration ID.

15. The hosting and storage system of claim 12, wherein the second utility management module on the second node is further configured to generate the second data from the second virtual machine after a device driver of the second virtual machine is removed from the second virtual machine.

16. The hosting and storage system of claim 15, wherein the second device driver comprises a paravirtualization driver.

17. The hosting and storage system of claim 9, wherein the configuring the second computer system comprises installing a device driver for interfacing directly with hardware resources of the physical device.

18. The hosting and storage system of claim 9, wherein the second data comprise a server image of the second virtual machine.

19. The hosting and storage system of claim 1, wherein the first utility management module is further configured to install a paravirtualization driver on the first computer system.

20. A method comprising:
   using a first set of resources of a first node of a plurality of nodes to host a first virtual machine of a plurality of virtual machines;
   receiving first data that specifies a first computer system for operation as the first virtual machine on the first node along with a plurality of first checksums corresponding to the first data;
   verifying the first data by calculating a plurality of second checksums and comparing the plurality of second checksums to the plurality of first checksums;
   coping the received first data to a first disk volume of the first node when the first data is verified; and
   configuring the first computer system for operation as the first virtual machine.

21. A non-transitory computer-readable storage medium storing instructions that, when executed by a processor in an electronic device, cause the electronic device to perform operations, the operations comprising:
   using a first set of resources of a first node of a plurality of nodes to host a first virtual machine of a plurality of virtual machines;
   receiving first data that specifies a first computer system for operation as the first virtual machine on the first node along with a plurality of first checksums corresponding to the first data;
   verifying the first data by calculating a plurality of second checksums and comparing the plurality of second checksums to the plurality of first checksums;
   coping the received first data to a first disk volume of the first node when the first data is verified; and
   configuring the first computer system for operation as the first virtual machine.

* * * * *